United States Patent
Lee et al.

(10) Patent No.: US 12,228,975 B2
(45) Date of Patent: Feb. 18, 2025

(54) DISPLAY DEVICE

(71) Applicant: LG ELECTRONICS INC., Seoul (KR)

(72) Inventors: Jaehun Lee, Seoul (KR); Kangyeung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/602,953

(22) Filed: Mar. 12, 2024

(65) Prior Publication Data

US 2024/0219971 A1    Jul. 4, 2024

Related U.S. Application Data

(63) Continuation of application No. 17/860,448, filed on Jul. 8, 2022, now Pat. No. 12,026,018.

(30) Foreign Application Priority Data

Jul. 21, 2021  (KR) .................. 10-2021-0095813
Jan. 20, 2022  (KR) .................. 10-2022-0008832
Jan. 28, 2022  (WO) ............... PCT/KR2022/001623

(51) Int. Cl.
*G06F 1/16*     (2006.01)

(52) U.S. Cl.
CPC ............ *G06F 1/166* (2013.01); *G06F 1/1654* (2013.01)

(58) Field of Classification Search
CPC .......................... G06F 1/1601; G06F 1/1654
(Continued)

(56) References Cited

U.S. PATENT DOCUMENTS

RE36,978 E  * 12/2000  Moscovitch ....... F16M 11/2021
                                                        248/921
6,554,238 B1 *  4/2003  Hibberd ............... F16M 11/041
                                                        248/278.1
(Continued)

FOREIGN PATENT DOCUMENTS

CN    209672001 U    11/2019
CN    111566401 A     8/2020
(Continued)

OTHER PUBLICATIONS

LG Electronics., "New wireless private screen LG StanbyME unveiled," Live LG Online, Jul. 15, 2021, (5 pages total) https://live.lge.co.kr/lgstanbyme.

(Continued)

*Primary Examiner* — Adrian S Wilson
(74) *Attorney, Agent, or Firm* — Birch, Stewart, Kolasch & Birch, LLP

(57) ABSTRACT

A display device including a display panel, a frame disposed at a rear of the display panel, a fixing member disposed at a rear of the frame and coupled to the frame, the fixing member including upper openings and lower openings, a connector including upper protruding portions that are inserted into the upper openings and including lower protruding portions aligned with the lower openings such that the lower protruding portions press against the exposed engaging portions, and a locking unit coupled to a rear surface of the frame, the locking unit including engaging portions passing through the lower openings and elastic members extending and pressing the engaging portions, wherein the lower protruding portions are engaged with and press against the engaging portions exposed through the lower openings, and the upper protruding portions are engaged with the fixing member, wherein the locking unit includes a coupling body coupled to the rear surface of the (Continued)

frame and supporting a first end of the elastic member, the coupling body including guide pins protruding rearward from a rear surface of the coupling body, and a support body disposed at a rear of the coupling body, and including the engaging portions contacting a second end of the elastic member, the support body including guide holes guiding the placement of the support body onto the guide pins, and wherein a width of a corresponding guide hole is greater than an outer diameter of a corresponding guide pin.

7 Claims, 51 Drawing Sheets

(58) Field of Classification Search
USPC .................................................. 361/679.29
See application file for complete search history.

(56) References Cited

U.S. PATENT DOCUMENTS

| | | | |
|---|---|---|---|
| 6,857,610 B1* | 2/2005 | Conner | F16M 13/022 |
| | | | 248/291.1 |
| 7,264,212 B2* | 9/2007 | Hung | F16M 11/10 |
| | | | D14/452 |
| 7,646,593 B2 | 1/2010 | Smejkalova | |
| 8,083,193 B2* | 12/2011 | Matsui | F16M 11/041 |
| | | | 248/222.51 |
| 8,228,668 B2 | 7/2012 | Asamarai et al. | |
| 8,576,554 B2 | 11/2013 | Quijano | |
| 9,039,016 B2 | 5/2015 | Abernethy et al. | |
| 9,775,431 B2 | 10/2017 | Abernethy et al. | |
| 9,855,023 B2 | 1/2018 | Messina et al. | |
| 9,876,984 B2 | 1/2018 | Massey | |
| 9,933,106 B2 | 4/2018 | Stark | |
| 10,299,759 B2 | 5/2019 | Messina et al. | |
| 10,844,996 B2 | 11/2020 | Hasegawa et al. | |
| 11,131,332 B2 | 9/2021 | Huang et al. | |
| D965,000 S | 9/2022 | Monsalve et al. | |
| 11,486,537 B2* | 11/2022 | Glickstein | F16M 11/26 |
| 11,630,483 B2 | 4/2023 | Chang et al. | |
| 12,026,018 B2* | 7/2024 | Lee | F16M 11/42 |
| 2002/0011544 A1* | 1/2002 | Bosson | F16M 11/041 |
| | | | 248/274.1 |
| 2004/0011932 A1* | 1/2004 | Duff | F16M 11/10 |
| | | | 361/679.21 |
| 2004/0079858 A1 | 4/2004 | Rudolf | |
| 2005/0062238 A1 | 3/2005 | Broadfield et al. | |
| 2006/0186295 A1* | 8/2006 | Dittmer | F16M 11/14 |
| | | | 248/284.1 |
| 2007/0040084 A1* | 2/2007 | Sturman | F16M 11/041 |
| | | | 248/280.11 |
| 2007/0097610 A1 | 5/2007 | Lee | |
| 2008/0026892 A1 | 1/2008 | Asamarai et al. | |
| 2009/0179133 A1 | 7/2009 | Gan et al. | |
| 2009/0314912 A1 | 12/2009 | Whitley et al. | |
| 2010/0050383 A1 | 3/2010 | Wang et al. | |
| 2010/0084527 A1 | 4/2010 | Lau et al. | |
| 2010/0193647 A1 | 8/2010 | Huang et al. | |
| 2012/0230668 A1 | 9/2012 | Vogt | |
| 2014/0185222 A1 | 7/2014 | Hung et al. | |
| 2014/0226281 A1 | 8/2014 | Emami | |
| 2015/0369418 A1 | 12/2015 | Wong et al. | |
| 2016/0319986 A1 | 11/2016 | Hörndler | |
| 2019/0212785 A1* | 7/2019 | Choi | F16M 11/10 |
| 2021/0382522 A1 | 12/2021 | Chang et al. | |
| 2022/0010921 A1 | 1/2022 | Lee et al. | |

FOREIGN PATENT DOCUMENTS

| | | |
|---|---|---|
| JP | 9-130866 A | 5/1997 |
| JP | 2017-161714 A | 9/2017 |
| KR | 20-0279180 Y1 | 6/2002 |
| KR | 2003-0053990 A | 7/2003 |
| KR | 10-2004-0003757 A | 1/2004 |
| KR | 10-2006-0097961 A | 9/2006 |
| KR | 10-0777032 A | 11/2007 |
| KR | 10-0844408 B1 | 7/2008 |
| KR | 10-2009-0016129 A | 2/2009 |
| KR | 20-0448533 Y1 | 4/2010 |
| KR | 10-2012-0108395 A | 10/2012 |
| KR | 10-2021-0032175 A | 3/2021 |
| WO | 2019/167590 A1 | 9/2019 |

OTHER PUBLICATIONS

Single Life, "Interior home appliances LG Stand by Me! Experience new usability beyond touch screen monitors," Naver Blog, Jul. 15, 2021, (7 pages total) : https://blog.naver.com/gkrwja88/222432792488.

* cited by examiner

DISPLAY DEVICE

CROSS-REFERENCE TO RELATED APPLICATIONS

This application is a Continuation of application Ser. No. 17/860,448 filed on Jul. 8, 2022, which claims priority under 35 U.S.C. § 119(a) to Korean Provisional Application No. 10-2021-0095813, filed on Jul. 21, 2021, Korean Provisional Application No. 10-2022-0008832, filed on Jan. 20, 2022, and International Application No. PCT/KR2022/001623, filed on Jan. 28, 2022, the contents of which are incorporated herein by reference in their entirety.

BACKGROUND OF THE INVENTION

1. Field of the Invention

The present disclosure relates to a display device.

2. Description of the Related Art

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among them, an LCD panel includes a TFT substrate and a color substrate that is opposite to each other with a liquid crystal layer interposed therebetween, and may display an image by using light provided from a backlight unit. In addition, an OLED panel may display an image by depositing an organic material layer that can emit light by itself on a substrate on which a transparent electrode is formed.

Recently, a lot of research has been made on a structure for freely adjusting the angle or position of a display panel.

SUMMARY OF THE INVENTION

One object of embodiments of the present disclosure is to solve the above and other problems.

Another object of embodiments of the present disclosure is to provide a display device having a stand of a display panel.

Another object of embodiments of the present disclosure is to provide a structure that can freely adjust the angle or position of a head having a display panel.

Another object of embodiments of the present disclosure is to provide a structure capable of implementing various motion operations of a display panel, such as a pivot motion, a tilt motion, a swivel motion, and an elevating motion, independently of each other.

Another object of embodiments of the present disclosure is to provide a mechanism for automatically adjusting the motion of a head in a user-friendly manner.

Another object of embodiments of the present disclosure is to provide a structure capable of firmly coupling a cradle for placing a terminal such as a smartphone to a head.

Another object of embodiments of the present disclosure is to provide a structure capable of wirelessly charging a terminal such as a smartphone placed on a cradle.

In accordance with an aspect of the present disclosure, a display device may include: a base; a head spaced apart from the base and including a display panel; a pole extending from the base in a direction in which the head is spaced apart from the base; an articulated connector coupled to the head; an elevating module movably coupled to the pole in a length direction of the pole; and an arm extending in a direction intersecting the head and the pole, the arm having one side connected to the articulated connector and the other side connected to the elevating module.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
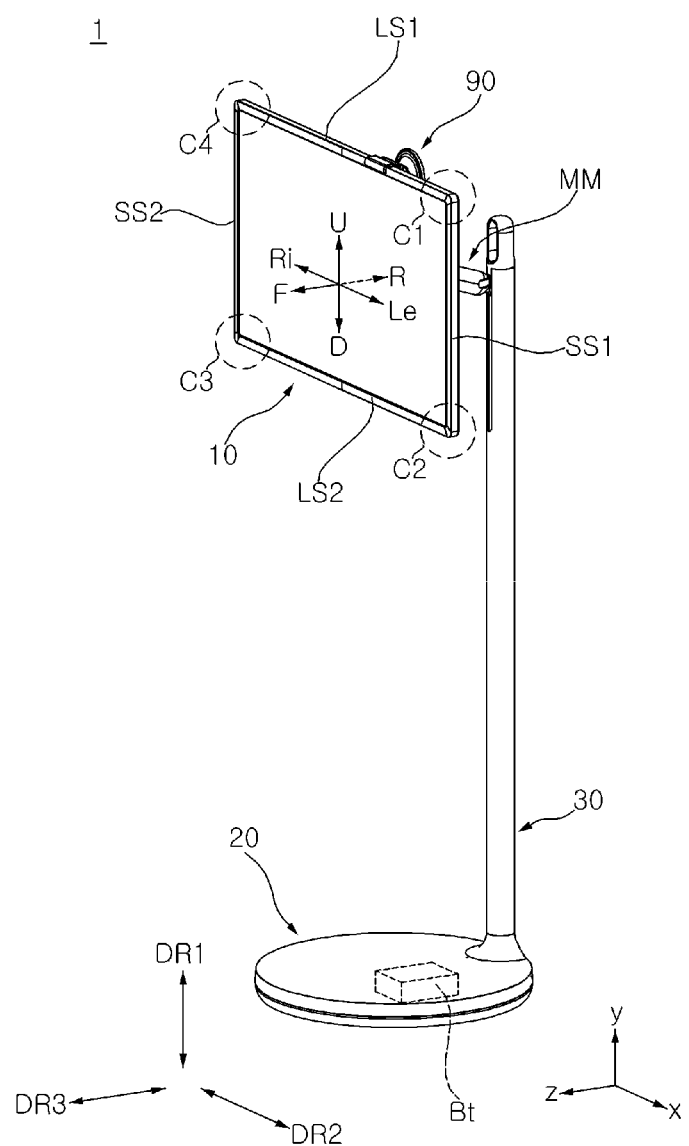
FIGS. 1 to 51 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

The direction indications of up (U), down (D), left (Le), right (Ri), front (F), and rear (R) shown in the drawings are only for convenience of description, and the technical concept disclosed in the present specification is not limited thereto.

Referring to FIG. 1, a display device 1 may include a head 10. The head 10 can display an image. The head 10 may be referred to as a display 10 or a display unit 10.

The head 10 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1 and LS2 are longer than the lengths of the first and second short sides SS1 and SS2, but a case in which the lengths of the first and second long sides LS1 and LS2 are approximately equal to the lengths of the first and second short sides SS1 and SS2 may be possible.

A direction parallel to the short sides SS1 and SS2 of the head 10 may be referred to as a first direction DR1 or an up-down direction. A direction parallel to the long sides LS1, LS2, and long Side of the head 10 may be referred to as a second direction DR2 or a left-right direction. A direction perpendicular to the long sides LS1 and LS2 and the short sides SS1 and SS2 of the head 10 may be referred to as a third direction DR3 or a front-rear direction.

A direction in which the head 10 displays an image may be referred to as a front direction (F, z), and a direction opposite to this may be referred to as a rear direction R. The side of the first short side SS1 may be referred to as a left side (Le, x). The side of the second short side SS2 may be referred to as a right side Ri. The side of the first long side LS1 may be referred to as an upper side (U, y). The side of the second long side LS2 may be referred to as a lower side D.

The first long side LS1, the second long side LS2, the first short side SS1, and the second short side SS2 may be referred to as an edge of the head 10. In addition, a point where the first long side LS1, the second long side LS2, the first short side SS1, and the second short side SS2 meet each other may be referred to as a corner.

A point where the first short side SS1 and the first long side LS1 meet may be a first corner C1. A point where the first short side SS1 and the second long side LS2 meet may be a second corner C2. A point where the second short side SS2 and the second long side LS2 meet may be a third corner C3. A point where the second short side SS2 and the first long side LS1 meet may be a fourth corner C4.

Figure 2:
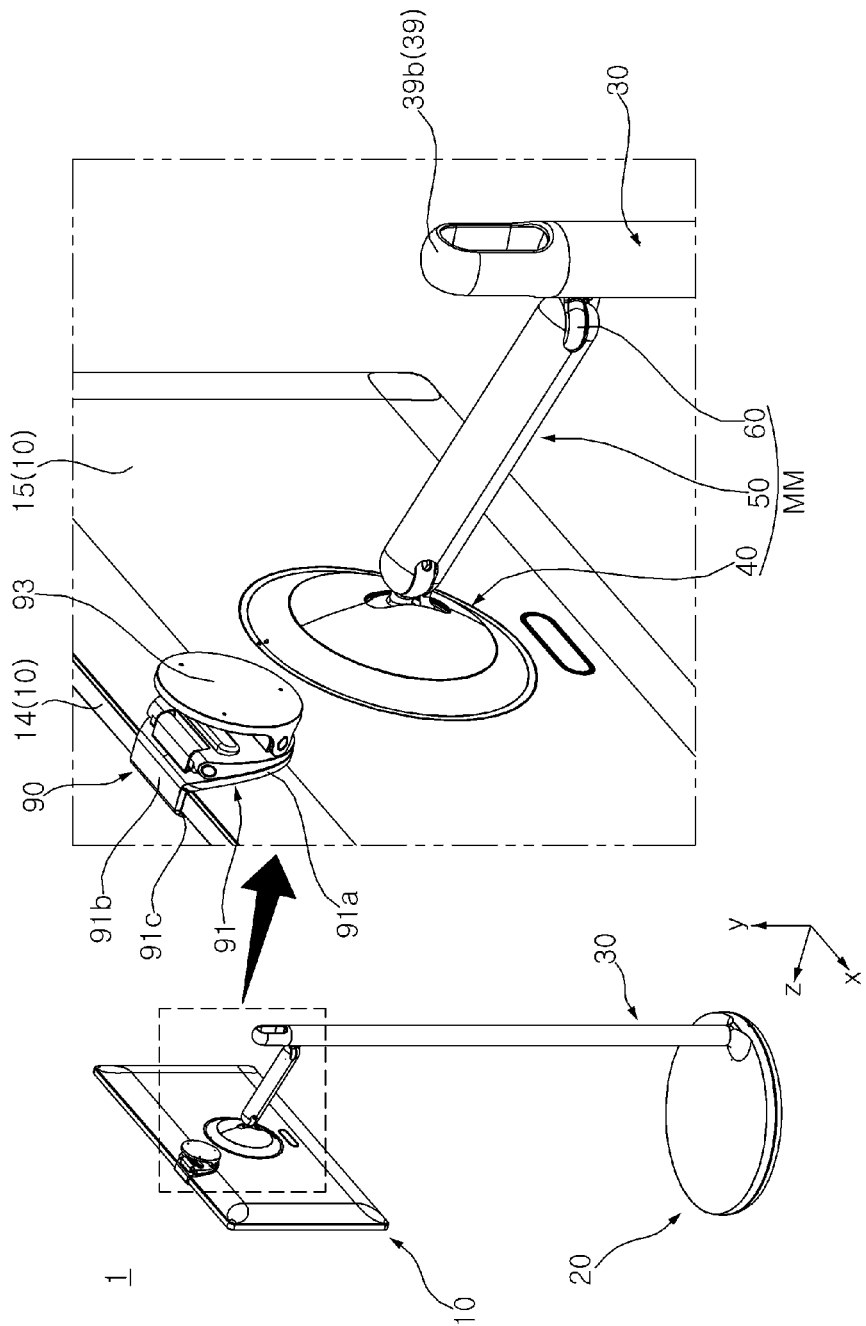

Referring to FIGS. 1 and 2, the display device 1 may include a base 20, a pole 30, and a motion module MM.

The base 20 may have a flat cylinder shape as a whole. The base 20 may be placed on the ground. For example, a plurality of moving wheels 20w (see FIG. 34) may be mounted on the lower surface of the base 20. Accordingly, a user can smoothly move the base 20 on the ground. The base 20 may be referred to as a moving base.

The pole 30 may extend long in the vertical direction. The lower end of the pole 30 may be coupled to the base 20. The pole 30 may be adjacent to the periphery of the upper surface of the base 20. A handle 39 may be coupled to the upper end of the pole 30. The pole 30 and the above-described base 20 may be collectively referred to as a stand.

The motion module MM may extend in a direction intersecting the pole 30. One side of the motion module MM may be coupled to a rear side of the head 10. The other side of the motion module MM may be adjacent to the upper end of the pole 30, and may be coupled to the pole 30. An articulated connector 40 may be coupled to the rear side of the head 10, an elevating module 60 may be coupled to the pole 30, and an arm 50 may connect the articulated connector 40 and the elevating module 60.

Accordingly, the head 10 may be supported by the motion module MM, the pole 30, and the base 20, and may be spaced upward from the ground.

Figure 3:
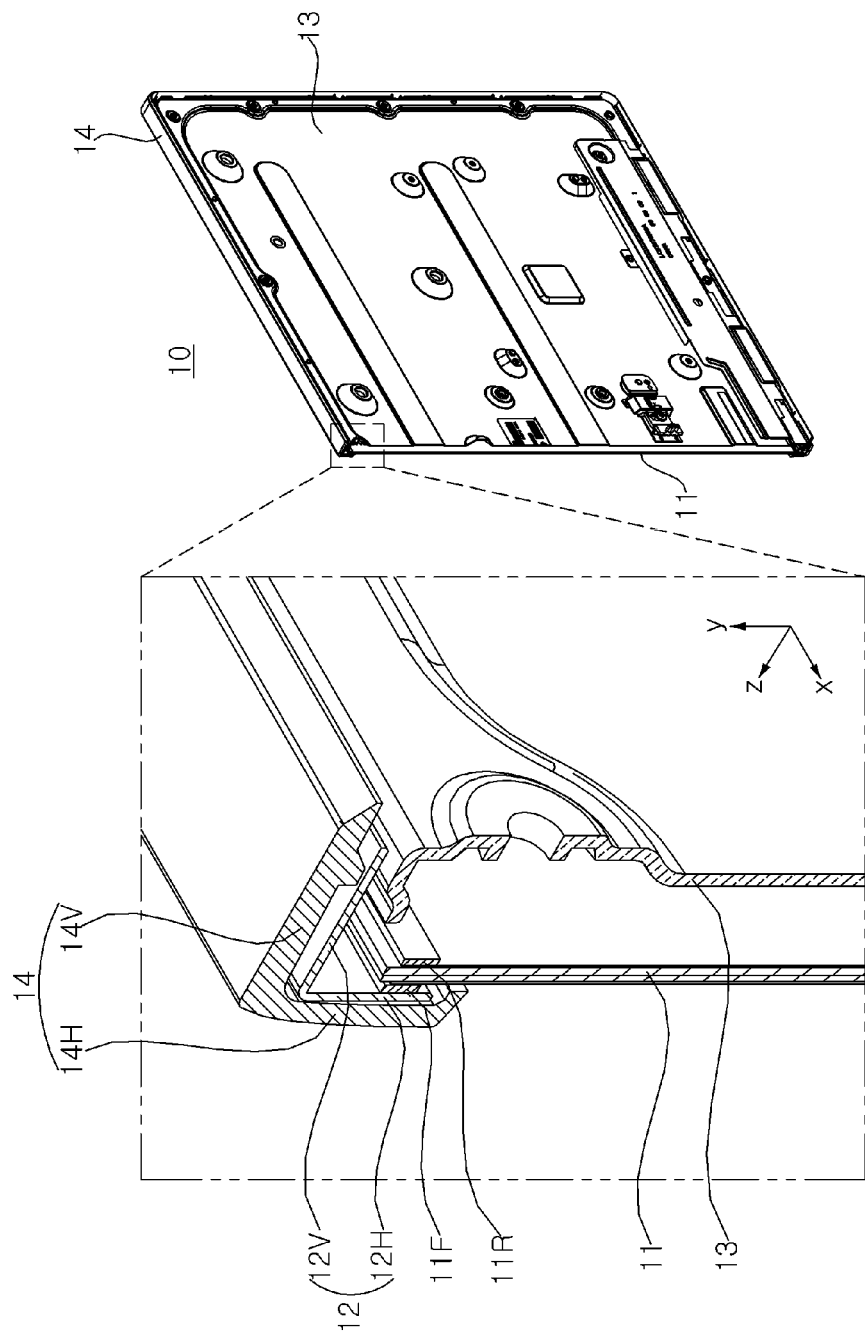
Figure 4:
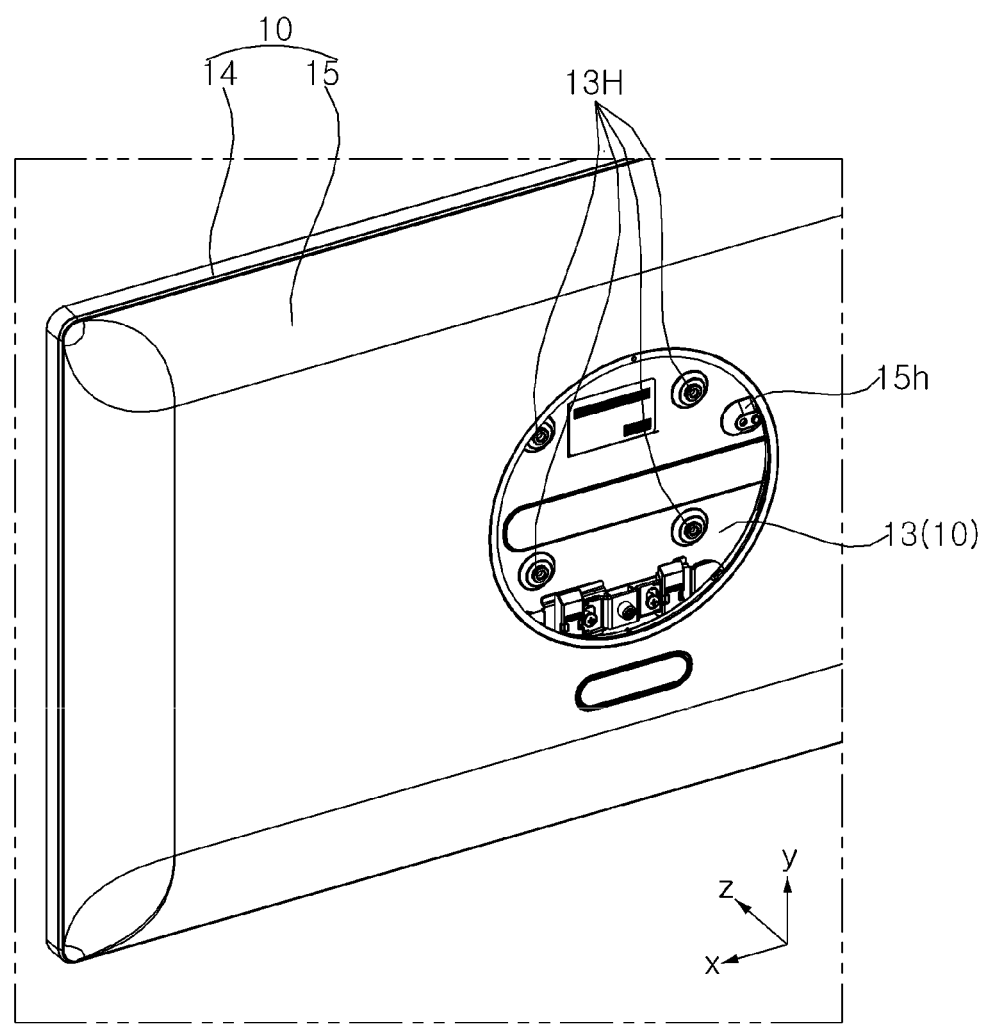

Referring to FIGS. 3 and 4, the head 10 may include a display panel 11, a middle cabinet 12, a frame 13, an end frame 14, and a back cover 15.

The display panel 11 may form the front surface of the head 10. For example, the display panel 11 may be an OLED panel, an LCD panel, or an LED panel. The display panel 11 may divide an image into a plurality of pixels and output an image by matching color, brightness, and saturation for each pixel. The display panel 11 may be divided into an active area in which an image is displayed and a de-active area in which an image is not displayed. The display panel 11 may generate light corresponding to a color of red, green, or blue according to a control signal.

The middle cabinet 12 may extend along the periphery of the display panel 11. A horizontal portion 12H may be positioned in the front direction of the display panel 11. A vertical portion 12V may intersect the horizontal portion 12H, and may cover the side surface of the display panel 11. A front pad 11F may be positioned between the horizontal portion 12H and the display panel 11, and may be coupled to the horizontal portion 12H. A rear pad 11R may be opposite to the front pad 11F with respect to the display panel 11. For example, the middle cabinet 12 may include a metal or plastic material. The middle cabinet 12 may be referred to as a side frame or a guide panel.

The frame 13 may be positioned in the rear direction of the display panel 11. Electronic components such as a printed circuit board (PCB) may be coupled to the rear surface of the frame 13. For example, the frame 13 may include a metal material. The frame 13 may be referred to as a plate or a module cover.

A fixing portion 13H may protrude rearward from the rear surface of the frame 13. The fixing portion 13H may be a pemnut. A distance between the fixing portions 13H may comply with a Video Electronics Standards Association (VESA) standard.

The end frame 14 may form a periphery of the head 10. The horizontal portion 14H may be positioned in the front direction of the horizontal portion 12H of the middle cabinet 12. The vertical portion 14V may cover a side surface of the vertical portion 12V of the middle cabinet 12. For example, the end frame 14 may include a metal or plastic material. Meanwhile, in some embodiment, the end frame 14 may be omitted, and in this case, the middle cabinet 12 may form the periphery of the head 10.

The back cover 15 may form a rear surface of the head 10. The back cover 15 may be positioned in the rear direction of the frame 13 and may be coupled to the frame 13. A portion of the frame 13 including the aforementioned fixing portion 13H may be exposed to the outside through a hole 15h formed in the center of the back cover 15. For example, the back cover 15 may include a metal or plastic material. For example, a jersey made of a fabric material may be detachably coupled to the rear surface of the back cover 15.

Figure 5:
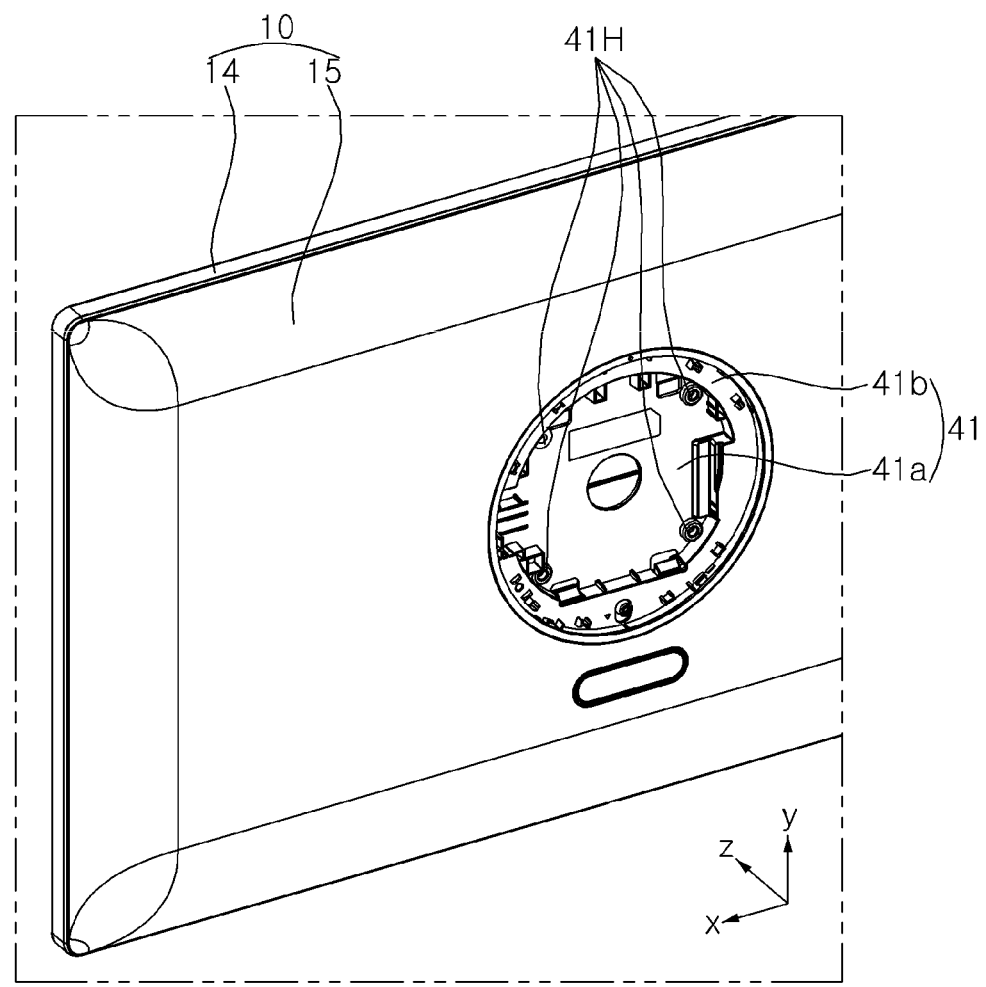

Referring to FIGS. 4 and 5, a fixing member 41 may be positioned in the hole 15h of the back cover 15, and may be positioned in the rear direction of the frame 13.

A fixing plate 41a may have a circular plate shape as a whole, and may include a fixing hole 41H aligned with the fixing portion 13H. A spacing between the fixing holes 41H may comply with the VESA standard. A fixing ring 41b may be positioned between the outer circumference of the fixing plate 41a and a portion defining the hole 15h of the back cover 15, and may be coupled or fixed thereto. A fastening member such as a screw may be fastened to the fixing portion 13H through the fixing hole 41H. Accordingly, the fixing member 41 may be coupled to or fixed to the frame 13.

Figure 6:
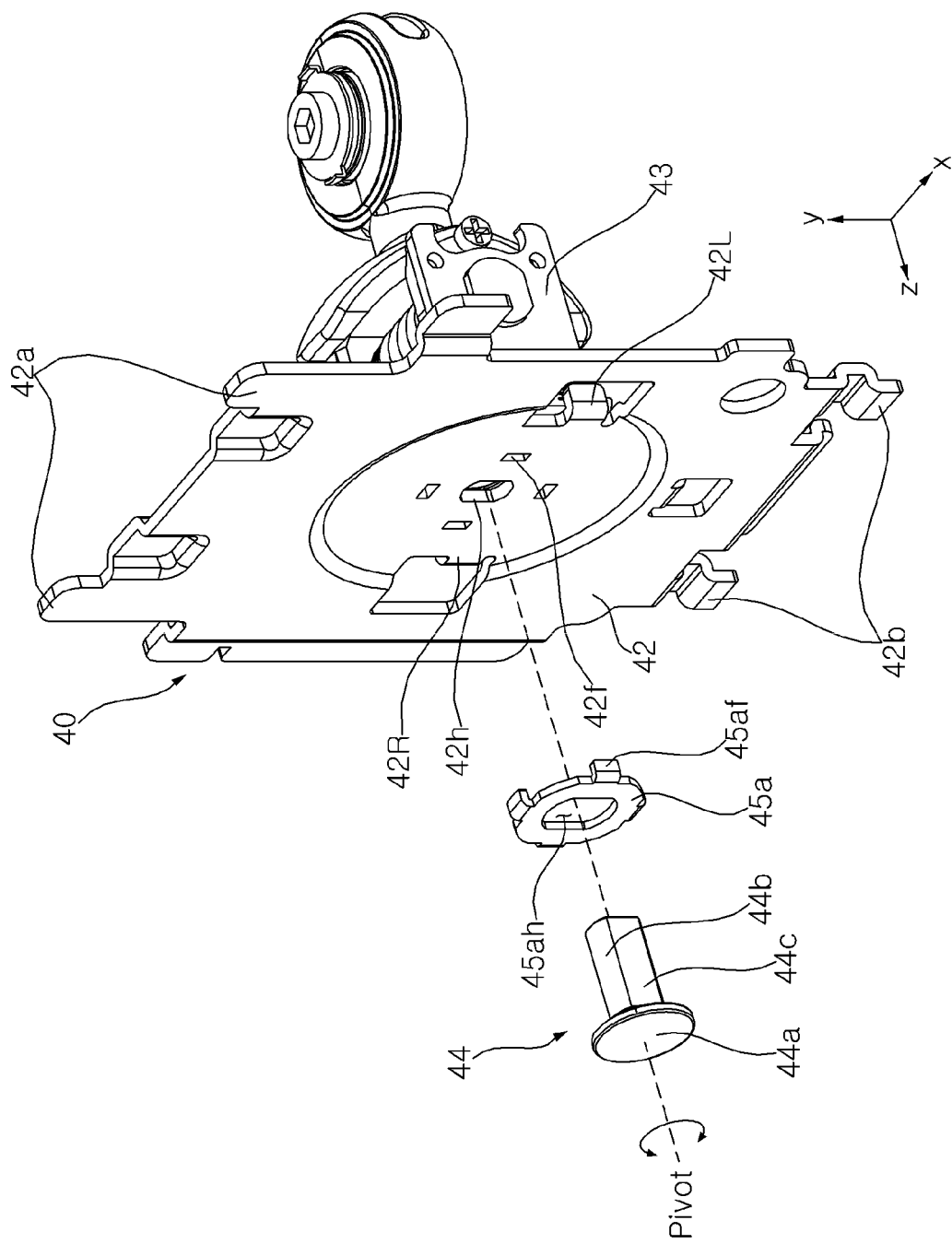

Referring to FIGS. 5 and 6, the articulated connector 40 may include the aforementioned fixing member 41. A front bracket 42 may be positioned in the rear direction of the fixing member 41, and may have a plate shape as a whole. A pair of first protrusions 42a may protrude upward from the upper side of the front bracket 42, and may be spaced apart from each other in the left-right direction. A pair of second protrusions 42b may protrude downward from the lower side of the front bracket 42, and may be spaced apart from each other in the left-right direction. The pair of first protrusions 42a and the pair of second protrusions 42b may be inserted and coupled to holes (not shown) formed in the fixing plate 41a. Accordingly, the front bracket 42 may be detachably coupled to the fixing plate 41a (see FIG. 11).

A pivot shaft 44 may extend in the front-rear direction. The diameter of a head 44a of the pivot shaft 44 may be greater than the diameter of a body 44b. The body 44b may have a cylindrical shape in which a part of a side surface is cut-out. A pair of cut-outs 44c and cut-outs may be formed on the side surface of the body 44b, and may be opposite to each other. The hole 42h of the front bracket 42 may be formed in the center of the front bracket 42, and may be penetrated by the body 44b. The shape of the hole 42h of the front bracket 42 may be the same as the shape of the longitudinal cross-section of the body 44b. Accordingly, the pivot shaft 44 and the front bracket 42 may rotate together with respect to the axial direction of the pivot shaft 44. That is, the pivot shaft 44 may provide a pivot axis.

A front grab 45a may be positioned between the head 44a and the front surface of the front bracket 42. The hole 45ah of the front grab 45a may be aligned with the hole 42h of the front bracket 42, and may have the same shape as the hole 42h. The body 44b may penetrate the holes 45ah and 42h. Protrusions 45af may protrude rearward from around the periphery of the front grab 45a, may be spaced apart from each other at intervals of 90 degrees, and may be inserted and coupled to a groove or hole 42f of the front bracket 42. Accordingly, the coupling between the pivot shaft 44 and the front bracket 42 may be further strengthened by the front grab 45a.

Figure 7:
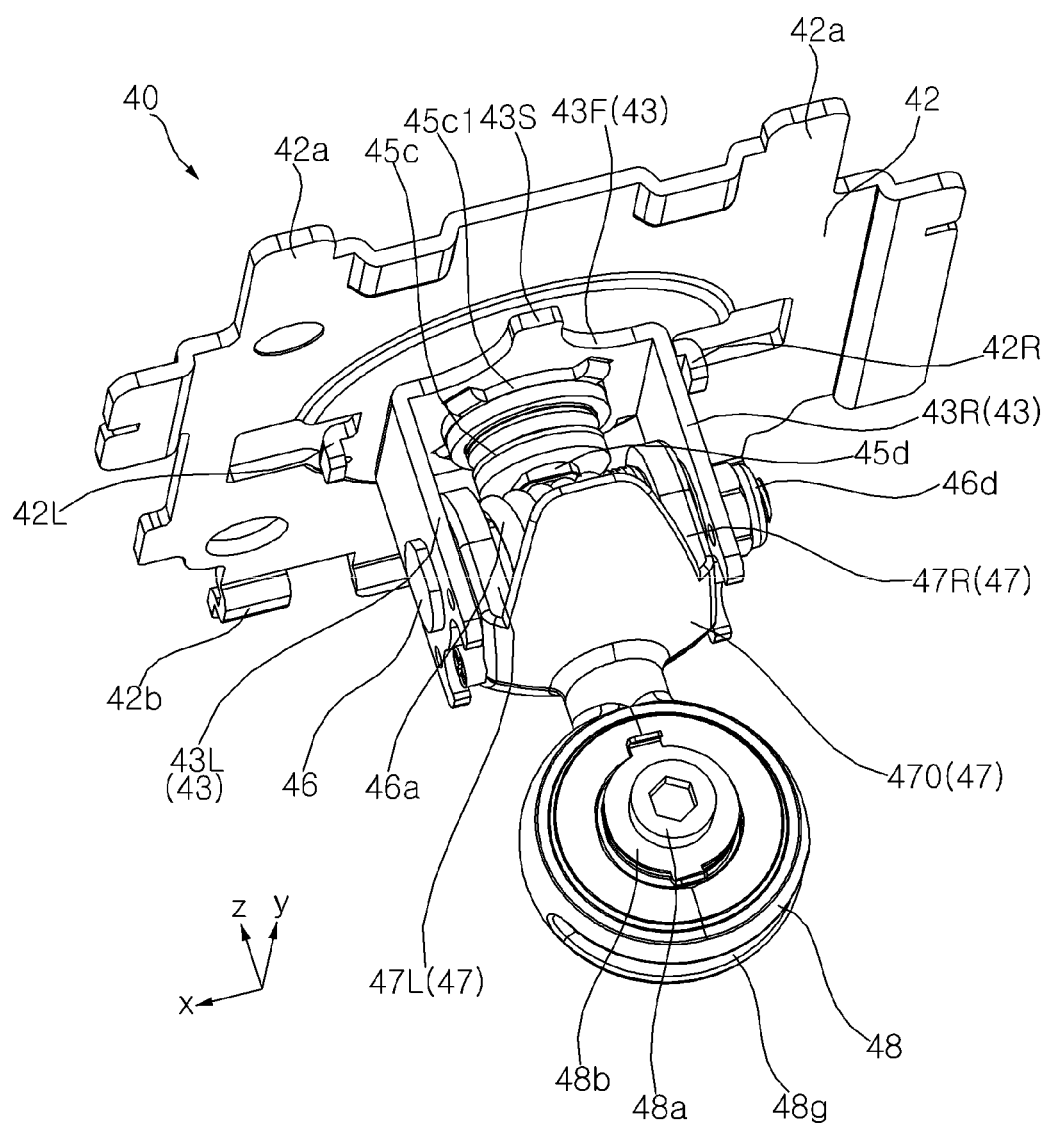
Figure 8:
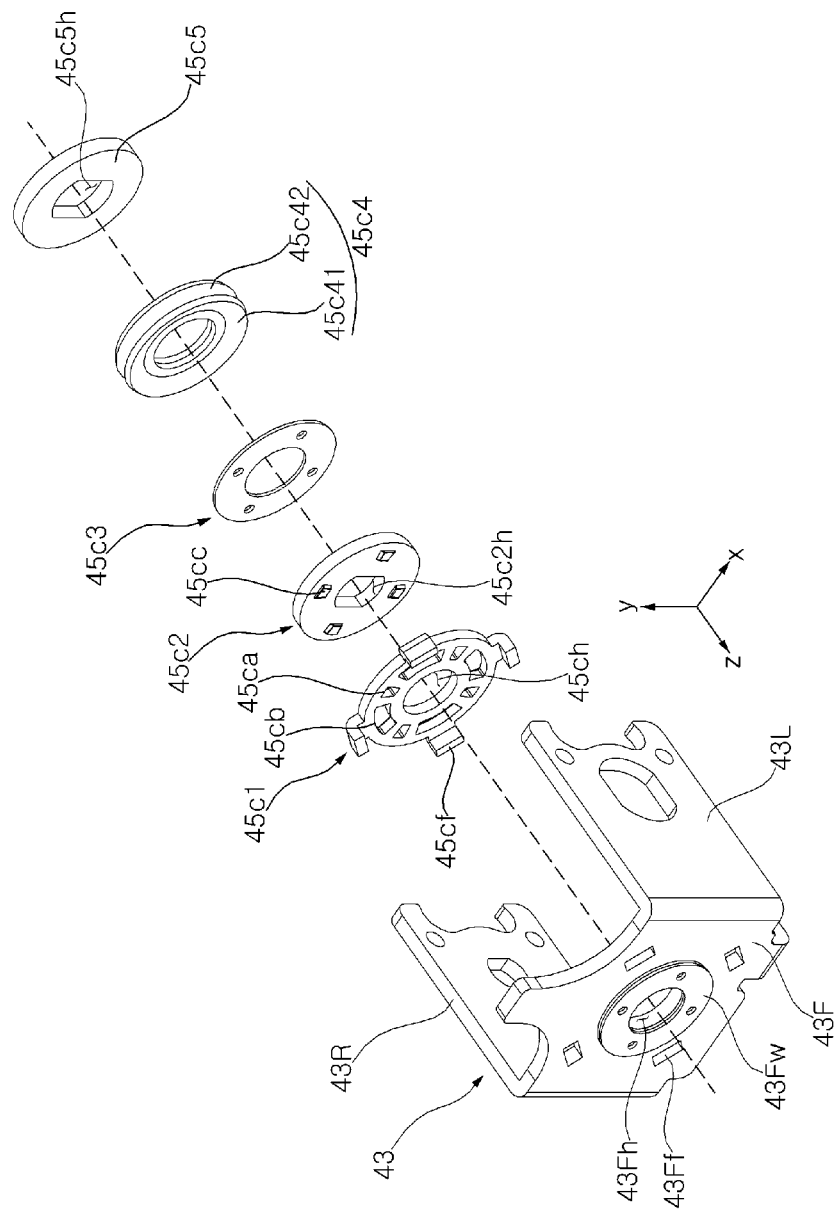

Referring to FIGS. 7 and 8, the rear bracket 43 may be positioned in the rear direction of the front bracket 42. The rear bracket 43 may include a mount 43F, a left wing 43L, and a right wing 43R.

The mount 43F may face the front bracket 42 and may have a circular mount hole 43Fh. The body 44b of the pivot shaft 44 may penetrate the mount hole 43Fh, and may rotate independently of the mount 43F within the mount hole 43Fh. In other words, even when the pivot shaft 44 rotates, the rear bracket 43 may not rotate. For example, at least one washer 43Fw may be positioned between the front bracket 42 and the mount 43F, and may have a circular hole through which the body 44b passes.

The left wing 43L may extend in the rear direction from the left side of the mount 43F. The right wing 43R may extend in the rear direction from the right side of the mount 43F. A plurality of members 45c described later (45c1, 45c2, 45c3, 45c4, 45c5) may be coupled to the mount 43F at between the left wing 43L and the right wing 43R.

A rear grab 45cl may be opposite to the washer 43Fw with respect to the mount 43F, and may have a circular hole 45ch through which the body 44b of the pivot shaft 44 passes. The protrusions 45cf may protrude in the front direction from around the periphery of the rear grab 45cl, may be spaced apart from each other at intervals of 90 degrees, and may be inserted and coupled to a groove or hole 42Ff of the mount 43F. Accordingly, the rear grab 45cl may be coupled to the rear surface of the mount 43F.

In addition, a plurality of fixing holes 45ca and a plurality of slots 45cb may be formed to penetrate the rear grab 45cl in the thickness direction of the rear grab 45cl, and may be separated from each other in the circumferential direction of the rear grab 45cl. The plurality of fixing holes 45ca and the plurality of slots 45cb may be alternately positioned in the circumferential direction of the rear grab 45cl. For example, the fixing holes 45ca or the slots 45cb may be spaced apart from each other at intervals of 90 degrees. In the circumferential direction of the rear grab 45cl, the length of the slot 45cb may be greater than the length of the fixing hole 45ca.

A disc 45c2 may be positioned in the rear direction of the rear grab 45cl, and may have a hole 45c2h through which the body 44b of the pivot shaft 44 passes. The shape of the hole 45c2h may be the same as the shape of the longitudinal cross-section of the body 44b. A plurality of bosses 45cc may protrude from the front surface of the disc 45c2 toward the rear grab 45cl, and may be spaced apart from each other in the circumferential direction of the disc 45c2. For example, the bosses 45cc may be spaced apart from each other at intervals of 90 degrees. The size of the boss 45cc may be the same as or correspond to the size of the fixing hole 45ca. That is, when the boss 45cc is inserted into the fixing hole 45ca, the rotation of the disc 45c2 and the pivot shaft 44 may be limited by the rear grab 45cl. Further, when the boss 45cc is inserted into the slot 45cb, the disc 45c2 and the pivot shaft 44 may rotate within the trajectory of a slot 45cb.

The washer 45c3 may be positioned in the rear direction of the disc 45c2, and may have a circular hole (no reference numeral) through which the body 44b of the pivot shaft 44 passes.

A disc spring 45c4 may be opposite to the disc 45c2 with respect to the washer 45c3, and may have a circular hole (no reference numeral) through which the body 44b of the pivot shaft 44 passes. The disc spring 45c4 may be resilient and may be convex in the front direction or rear direction. The disc spring 45c4 may generate an elastic force in the axial direction of the pivot shaft 44. For example, the disc spring 45c4 may be provided as a pair. In this case, the first disc spring 45c41 and the second disc spring 45c42 may be convex in different directions. The first disc spring 45c41 may be convex in the rear direction, and the second disc spring 45c42 may be convex in the front direction from the rear direction of the first disc spring 45c41. Accordingly, the overall elastic force of the first and second disc springs 45c41 and 45c42 may be strengthened.

A cap 45c5 may be positioned in the rear direction of the disc spring 45c4, and may have a hole 45c5h through which the body 44b of the pivot shaft 44 passes. The shape of the hole 45c5h may be the same as the shape of the longitudinal cross-section of the body 44b. The cap 45c5 may be coupled to or fixed to the distal end of the body 44b.

Accordingly, the pivot shaft 44 may rotate together with the front bracket 42, the front grab 45a, the disc 45c2, and the cap 45c5. In addition, the pivot shaft 45 may rotate independently of the washer 43Fw, the rear bracket 43, the rear grab 45cl, the washer 45c3, and the disc spring 45c4. In other words, even when the pivot shaft 45 rotates, the washer 43Fw, the rear bracket 43, the rear grab 45cl, the washer 45c3, and the disc spring 45c4 may not rotate.

Besides, a user may pivot the head 10 (see FIG. 5) with respect to the pivot shaft 44. For example, the head 10 may be pivoted within a range of +90 degrees to −90 degrees. In addition, due to the elastic force of the above-described disc spring 45c41, 45c2, the head 10 may maintain a certain pivot angle, as long as an external force greater than or equal to a certain level is not applied. In addition, during the pivoting movement of the head 10, a user may feel a fastening feeling according to the fastening of the boss 45cc and the fixing hole 45ca or the slot 45cb. That is, when the boss 45cc comes out of the slot 45cb and is inserted into the fixing hole 45ca, a user can feel that the head 10 is positioned at a pivot angle of 0 degrees, +90 degrees, or −90 degrees.

Meanwhile, a left protrusion 42L may be positioned between the center and the left side of the front bracket 42, and may protrude in the rear direction from the front bracket 42. A right protrusion 42R may be positioned between the center and the right side of the front bracket 42, and may protrude in the rear direction from the front bracket 42. In addition, a stopper 43S may protrude upward from the upper side of the mount 43F, and may be positioned on the rotation trajectory of the left protrusion 42L and the right protrusion 42R. Accordingly, the stopper 43S may limit the rotation of the front bracket 42 and the pivot shaft 44 to a certain angle.

Figure 9:
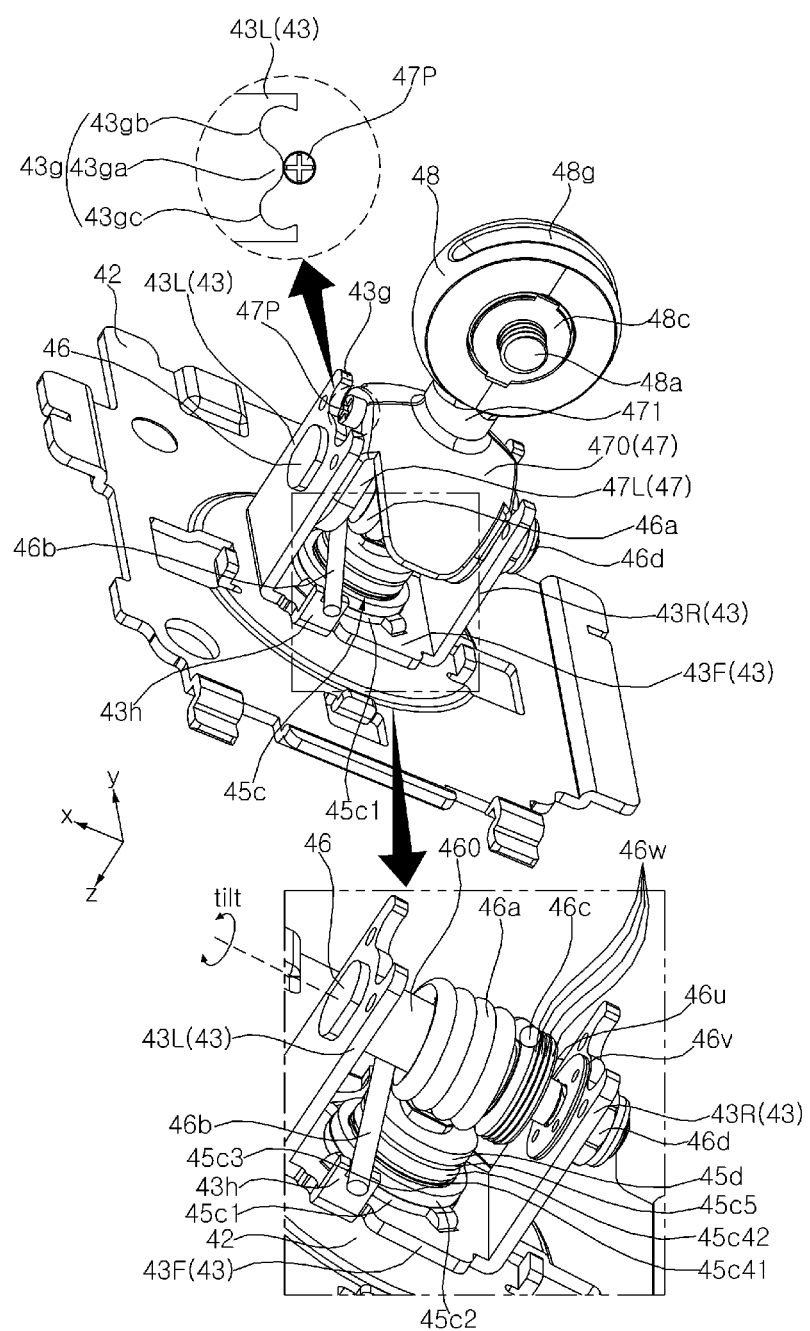

Referring to FIG. 9, a holder 47 may be positioned between the left wing 43L and the right wing 43R. A holder body 470 may cover the rear direction of the mount 43F of the rear bracket 43. A first part 47L may protrude toward the mount 43F from a left side portion of the holder body 470, and may be adjacent to the left wing 43L. A second part 47R (see FIG. 7) may protrude from a right side portion of the holder 47 toward the mount 43F, and may be adjacent to the right wing 43R.

A tilt shaft 46 may extend in the left-right direction. The tilt shaft 46 may penetrate the left wing 43L, the first part 47L, the second part 47R, and the right wing 43R. A head (no reference numeral) that is one end of the tilt shaft 46 may be seated on a side surface of the left wing 43L. The other end of the tilt shaft 46 may be threaded, and a fastening member 46d such as a nut may be fastened to the other end of the tilt shaft 46 on the right wing 43R.

In addition, the tilt shaft 46 may have a cylindrical shape as a whole, and may be fixed to the left wing 43L and the right wing 43R. The tilt shaft 46 may be rotatably coupled to the holder 47. That is, the tilt shaft 46 may provide a tilt axis. At least one washer 46v may be positioned between the second part 47R and the right wing 43R, and may have a circular hole through which the tilt shaft 46 passes.

An elastic member 46b may be positioned between the left wing 43L and the right wing 43R. The elastic member 46b may be wound around the outer circumference of the tilt shaft 46 a plurality of times, and may have elasticity. The elastic member 46b may be a coil-shaped spring.

In addition, a portion 46b of the elastic member 46a may extend in a direction intersecting the tilt shaft 46 without being wound around the tilt shaft 46. A seating portion 43h may protrude in the rear direction from the lower side of the mount 43F of the rear bracket 43, and may be adjacent to the left wing 43L. The seating portion 43h may have a groove into which a portion of the elastic member 46a is inserted. That is, a portion of the elastic member 46a may be caught in the groove of the seating portion 43h.

In addition, one end of the elastic member 46a may be formed in the above mentioned portion 46b. A disc spring 46w may be adjacent to the other end 46c of the elastic member 46a, and may be positioned between the elastic member 46a and the second part 47R. The disc spring 46w may have a circular hole (no reference numeral) through which the tilt shaft 46 passes. The disc spring 46w may have elasticity and may be convex in a direction toward the elastic member 46a. The disc spring 46w may generate an elastic force in the axial direction of the tilt shaft 46. The washer 46u may be positioned between the disc spring 46w and the second part 47R, and may have a circular hole through which the tilt shaft 46 passes.

Accordingly, the tilt shaft 46 may rotate together with the rear bracket 43, the front bracket 42, and a plurality of members 45c5, 45c4, 45c3, 45c2, 45c1, 43Fw, 45a, and 44. In response to the rotation of the tilt shaft 46, the head 10 (see FIG. 5) fixed to the front bracket 42 may be tilted up or down. In this case, the elastic member 46a may provide a force for supporting the head 10 inclined at a certain angle. In addition, the disc spring 46w may add a force for maintaining the angle of the head 10 inclined at a certain angle, as long as an external force greater than or equal to a certain level is not applied.

For example, the head 10 may be tilted within the range of +25 degrees to −25 degrees. In addition, due to the elastic force of the above-described elastic member 46a and the disc spring 46w, the head 10 may maintain a certain tilt angle, as long as an external force greater than or equal to a certain level is not applied.

Meanwhile, a pin 47P may be fixed to the first part 47L and/or the second part 47R. For example, the pin 47P may protrude to the left from the side surface of the first part 47L.

In this case, the guide groove 43g may be formed while being depressed in the front direction from the rear end of the left wing 43L. A reference point 43ga may contact the pin 47P in a state in which the head 10 (see FIG. 5) is not inclined up or down. An up groove 43gb may be formed by drawing an arc in a first rotation direction from the reference point 43ga. A down groove 43gc may be formed by drawing an arc from the reference point 43ga in a second rotation direction opposite to the first rotation direction.

Here, the tilt shaft 46 may rotate in the first rotation direction or the second rotation direction. When the tilt shaft 46 rotates in the first rotation direction, the pin 47P may relatively move on the down groove 43gc. The rotation of the tilt shaft 46 may be limited as the down groove 43gc is caught by the pin 47P. When the tilt shaft 46 rotates in the second rotation direction, the pin 47P may relatively move on the up groove 43gb. The rotation of the tilt shaft 46 may be limited as the up groove 43gb is caught by the pin 47P.

Accordingly, a maximum angle at which the head 10 can be tilted upward may be determined according to the length of the up groove 43gb. In addition, a maximum angle at which the head 10 can be tilted downward may be determined according to the length of the down groove 43gc. For example, the head 10 may be tilted within the range of +25 degrees to −25 degrees.

Figure 10:
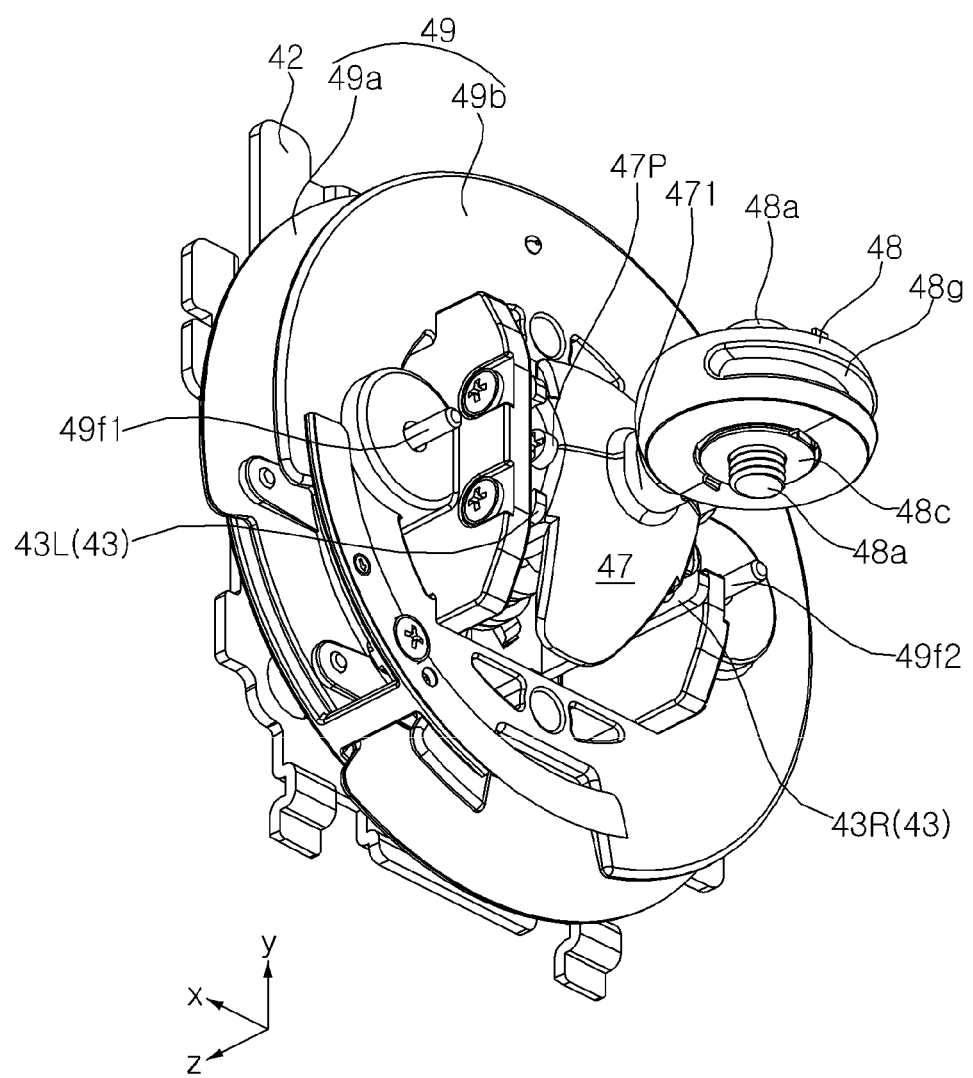

Referring to FIG. 10, a first rotation unit 48 may be positioned in the rear direction of the holder 47. A first connection portion 471 may connect the holder 47 and the first rotation unit 48. For example, the holder 47, the first connection portion 471, and the first rotation unit 48 may be formed as one body.

A cable holder 49 may be positioned in the rear direction of the front bracket 42, and may be penetrated by the rear bracket 43 and the holder 47. The cable holder 49 may be coupled to the left wing 43L and the right wing 43R through a fastening member such as a screw. A first plate 49a and a second plate 49b may have a ring shape as a whole, and may be spaced apart from each other in the front-rear direction.

Accordingly, a cable (not shown) may be wound around the cable holder 49 at between the first plate 49a and the second plate 49b.

Figure 11:
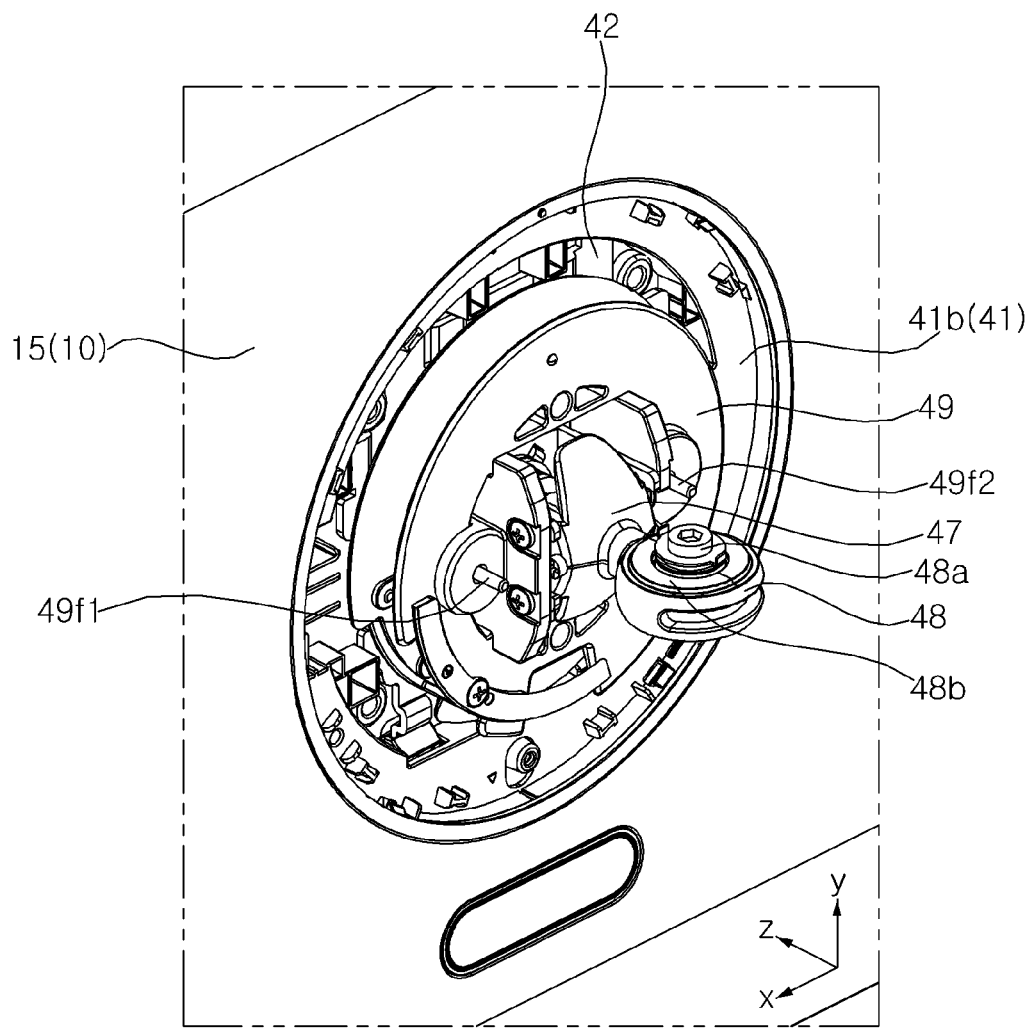
Figure 12:
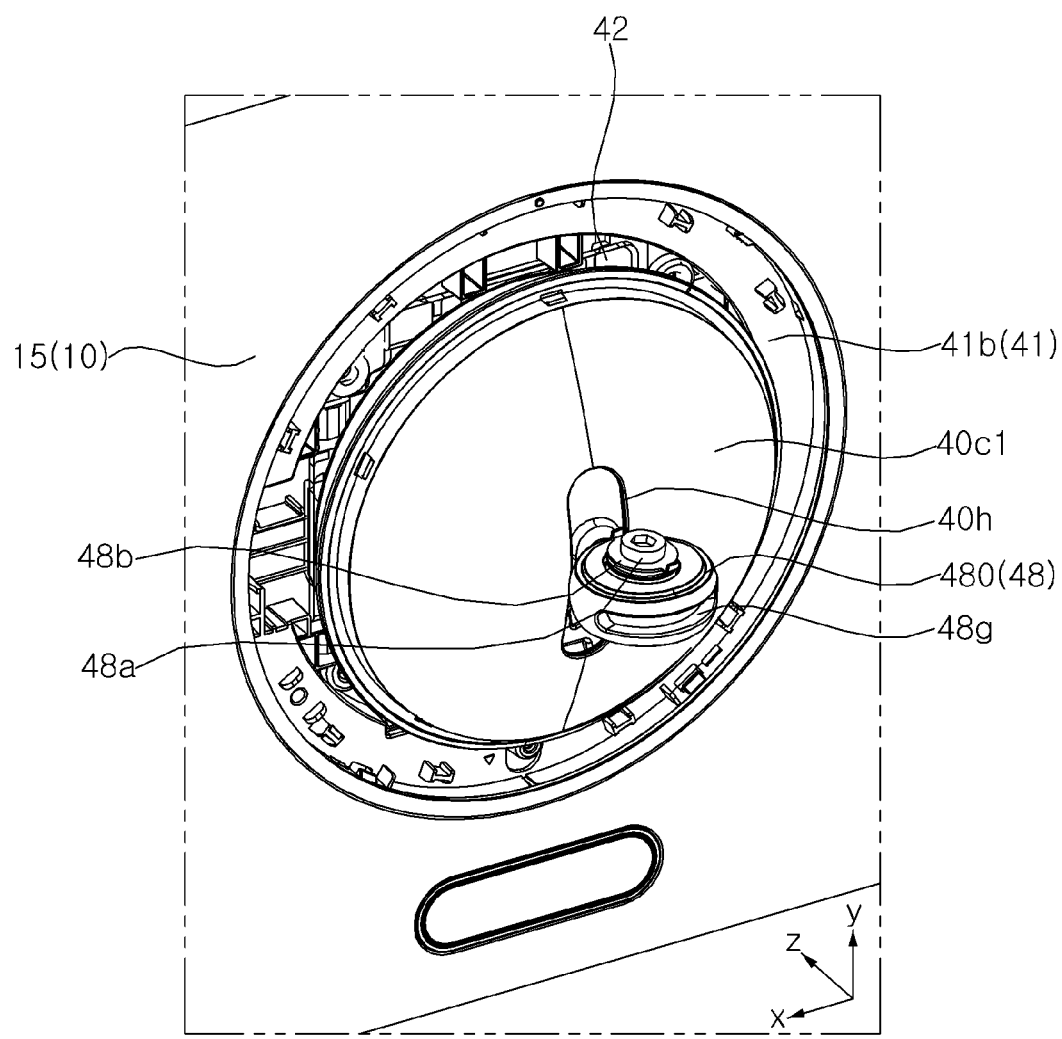

Referring to FIGS. 11 and 12, as described above, the front bracket 42 may be detachably coupled to the fixing plate 41a (see FIG. 5).

A cover 40cl may cover the rear direction of the cable holder 49, and the first rotation unit 48 may pass therethrough (see 40h in FIG. 12). A fastening member 49f1, 49f2 may penetrate the cable holder 49 to protrude in the rear direction, and may be coupled to the inner side of the cover 40c1. For example, the fastening member 49f1, 49f2 may be a screw or a bolt.

Figure 13:
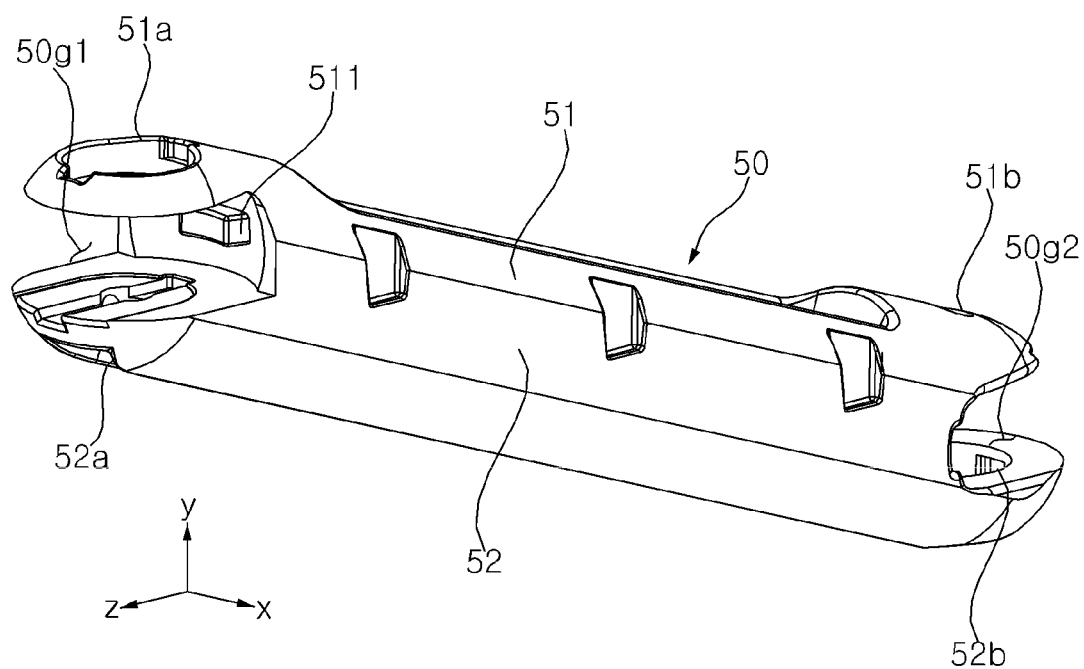
Figure 14:
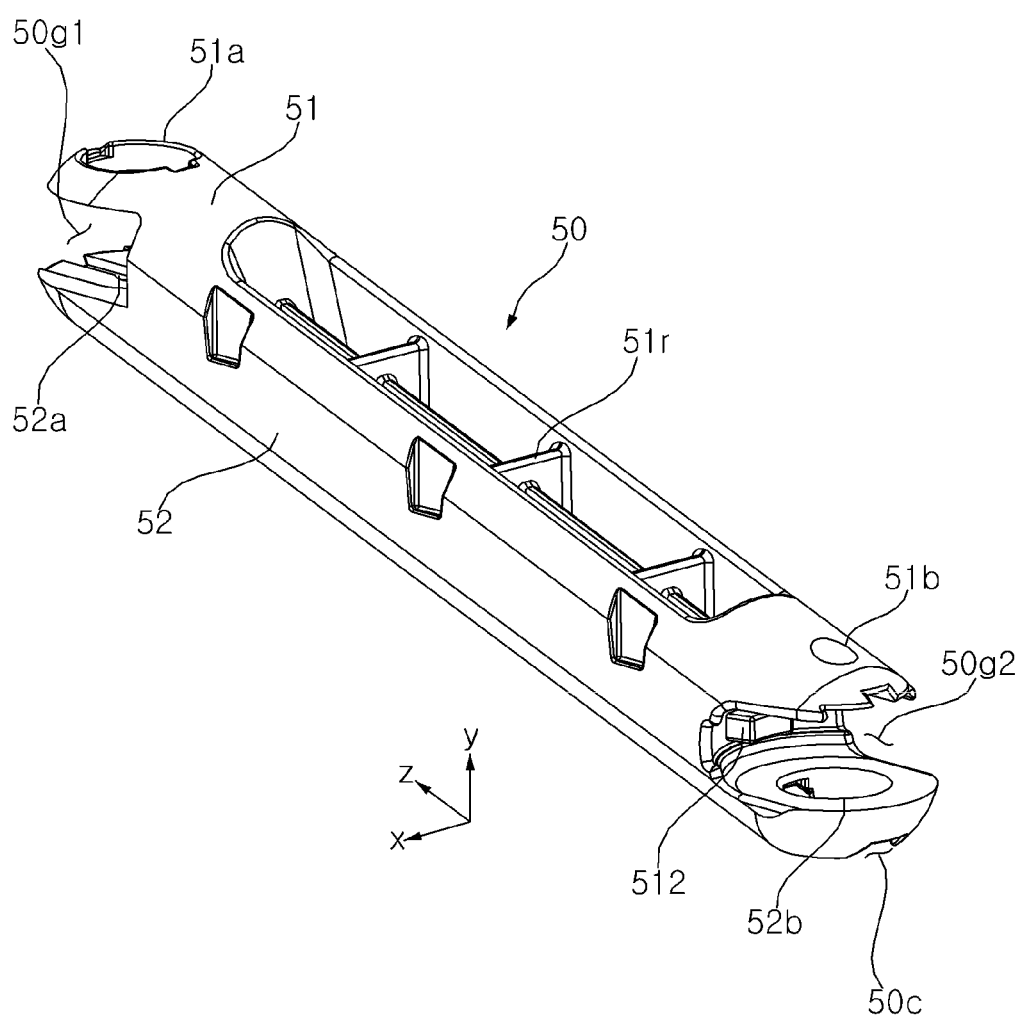

Referring to FIGS. 13 and 14, the arm 50 may include arm body 51, 52. The arm body 51, 52 may extend in a direction inclined upward by a certain angle (acute angle) with respect to a horizontal plane. The arm body 51, 52 may extend parallel to the horizontal plane. For example, an upper arm body 51 and a lower arm body 52 may be coupled to each other in a vertical direction. As another example, the upper arm body 51 and the lower arm body 52 may be formed as one body. The arm 50 may be referred to as a rod 50 or a link 50.

A front portion of the upper arm body 51 may be spaced upward from a front portion of the lower arm body 52. A front groove 50g1 may be formed in the front portion of the arm body 51, 52 and may have a "U" shape that is opened in the front direction. A rear portion of the upper arm body 51 may be spaced upward from a rear portion of the lower arm body 52. A rear groove 50g2 may be formed in the rear portion of the arm body 51, 52, and may have a "U" shape that is opened in the rear direction.

An upper insertion hole 51a may be formed to vertically penetrate the front portion of the upper arm body 51, and may face the front groove 50g1. An upper fastening hole 51b may be formed to vertically penetrate the rear portion of the upper arm body 51, and may face the rear groove 50g2.

A lower fastening hole 52a may be formed to vertically penetrate the front portion of the lower arm body 52, and may be aligned with the upper insertion hole 51a. A lower insertion hole 52b may be formed to vertically penetrate the rear portion of the lower arm body 52, and may be aligned with the upper fastening hole 51b.

Meanwhile, a cable groove 50c may be formed on the lower surface of the lower arm body 52, and may extend along the length direction of the lower arm body 52. The cable C (see FIG. 19) may be positioned in the cable groove 50c.

Meanwhile, a portion of the upper surface of the upper arm body 51 may have a recessed shape. In this case, a plurality of ribs 51r may be provided in the portion of the upper surface of the upper arm body 51. Accordingly, the rigidity of the arm body 51, 52 can be secured while reducing the weight of the arm body 51, 52.

Figure 15:
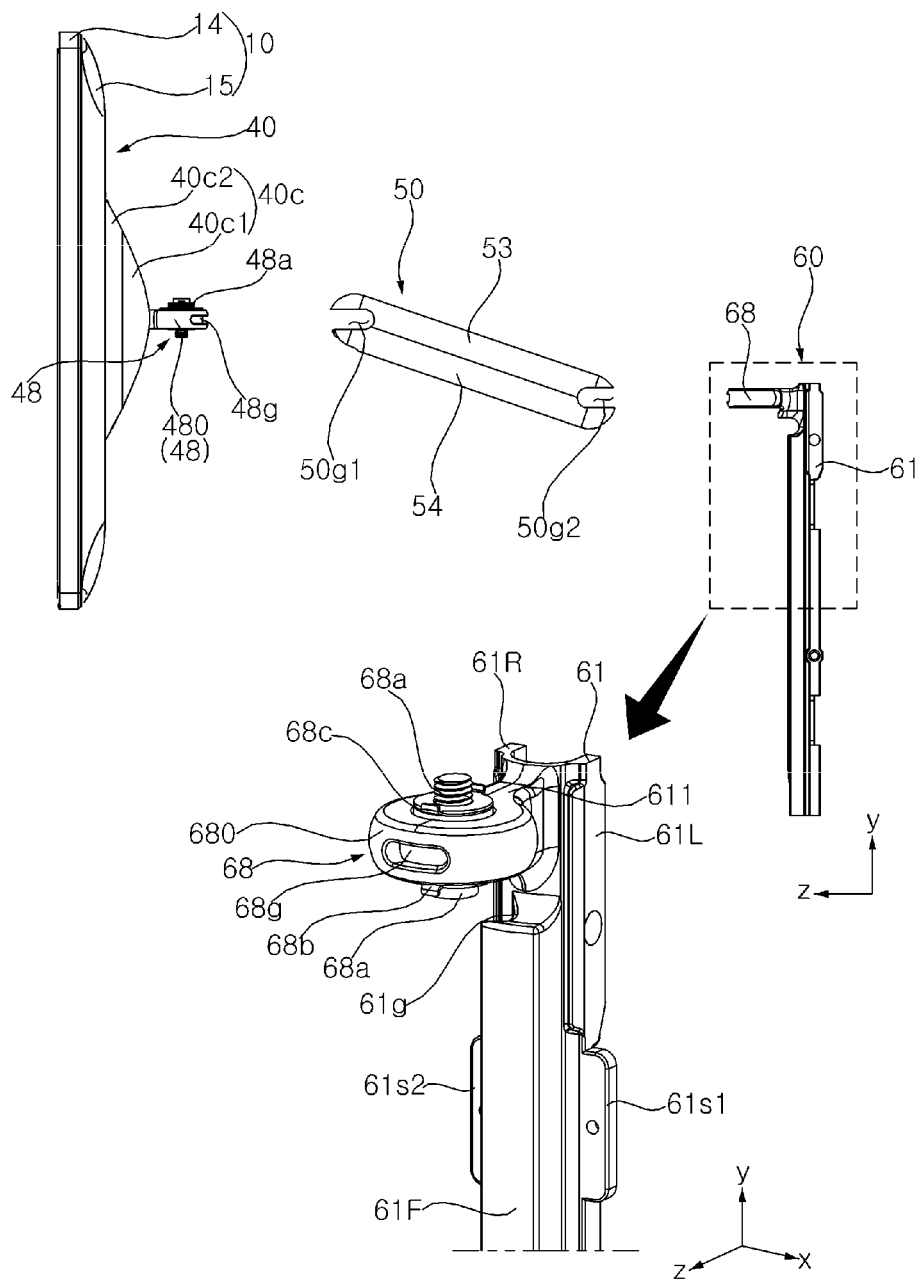

Referring to FIG. 15, a cover ring 40c2 may extend along the circumference of the cover 40c1, and may be detachably coupled to the fixing ring 41b (see FIG. 11).

An upper cover 53 may cover the surface of the upper arm body 51 (see FIG. 14). A lower cover 54 may cover the surface of the lower arm body 52 (see FIG. 14). The upper cover 53 and the lower cover 54 may be formed separately, or may be formed as one body.

The first rotation unit 48 may be inserted into the front groove 50g1, and may be rotatably coupled to the arm 50. The second rotation unit 68 may be inserted into the rear groove 50g2, and may be rotatably coupled to the arm 50.

Meanwhile, the second rotation unit 68 may protrude from a vertical member 61 described later toward the rear groove 50g2.

Figure 16:
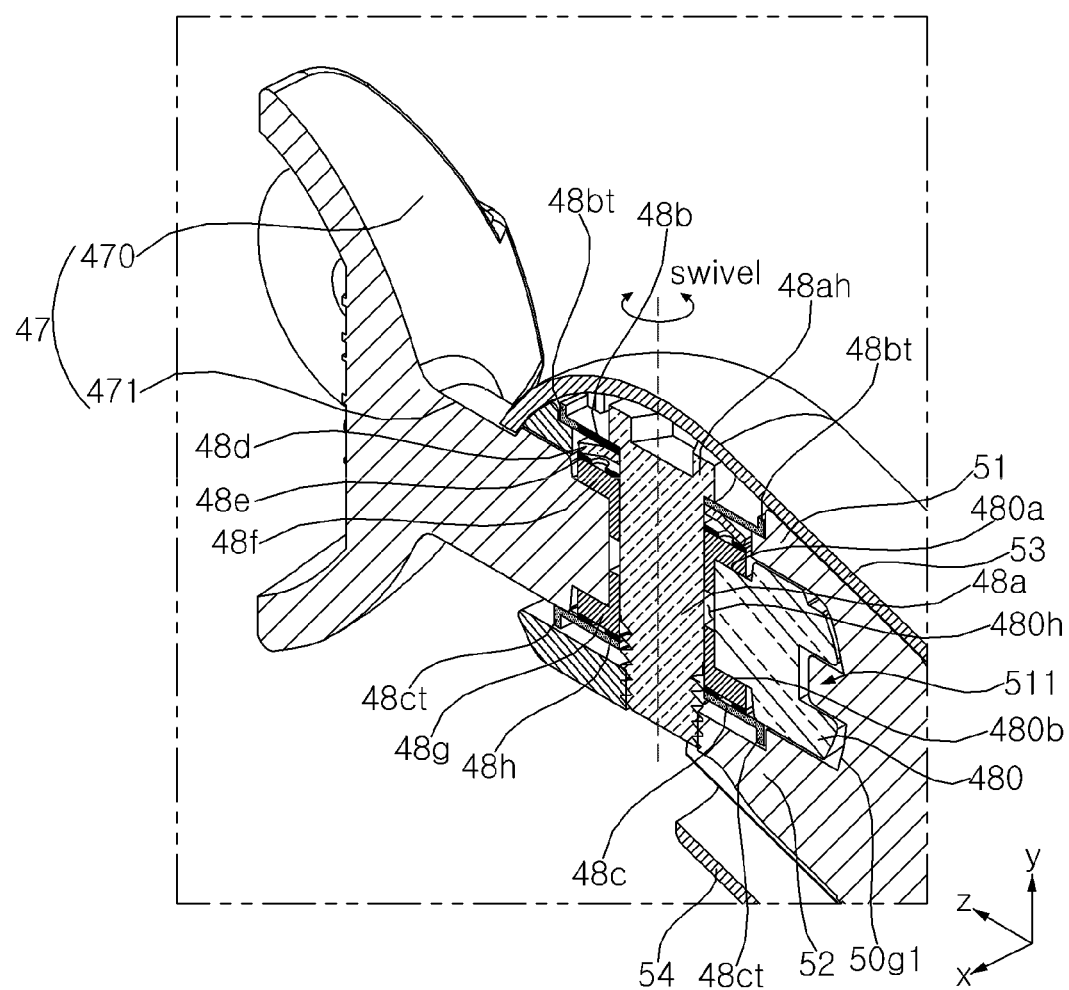

Referring to FIGS. 15 and 16, the first rotation unit 48 may include a first body 480, a first fastening member 48a, a first upper fixing washer 48b, a first disc spring 48d, a first upper washer 48e, a first upper bushing 48f, a first lower bushing 48g, a first lower washer 48h, and a first lower fixing washer 48c. The first rotation unit 48 may be referred to as a first swivel unit 48 or a first swivel module 48.

The first body 480 may be opened vertically. The first body 480 may have a donut shape as a whole. For example, the first body 480 may be formed as one body with the first connection portion 471. The first body 480 may be inserted into the front groove 50g1.

The first fastening member 48a may extend in a vertical direction. The first fastening member 48a may be inserted into the arm 50 through the upper insertion hole 51a (see FIG. 14), and may penetrate a hole 480h formed in the center of the first body 480. A head 48ah of the first fastening member 48a may be positioned inside the upper arm body 51. The first fastening member 48a may be screwed into the lower fastening hole 52a (see FIG. 14).

The first upper fixing washer 48b may be positioned in the lower side of the head 48ah of the first fastening member 48a, and may be penetrated by the first fastening member 48a. The first upper fixing washer 48b may be fixed to the inner side of the upper arm body 51. For example, the first upper fixing washer 48b may be a toothed lock washer. A tooth 48bt of the first upper fixing washer 48b may be inserted and coupled to a groove (no reference numeral) formed in the inner side of the upper arm body 51.

The first disc spring 48d may be positioned in the lower side of the first upper fixing washer 48b. The first disc spring 48d may have elasticity, and may be convex toward the first upper fixing washer 48b. The first disc spring 48d may generate an elastic force in the axial direction of the first fastening member 48a.

The first upper washer 48e may be positioned in the lower side of the first disc spring 48d, and may be penetrated by the first fastening member 48a. The first upper washer 48e may have a ring shape.

The first upper bushing 48f may be opposite to the first disc spring 48d with respect to the first upper washer 48e. The first fastening member 48a may penetrate the first upper bushing 48f. The first upper bushing 48f may have a cylindrical shape in which a flange (no reference numeral) is formed in an upper end. The flange of the first upper bushing 48f may contact on the first upper groove 480a formed along the circumference of the hole 480h in the upper surface of the first body 480. A portion (no reference numeral) of the first upper bushing 48f may be inserted into the hole 480h of the first body 480, may be positioned between the inner circumferential surface of the first body 480 and the outer circumferential surface of the first fastening member 48a, and may be in contact with the inner circumferential surface of the first body 480 and the outer circumferential surface of the first fastening member 48a.

The first lower bushing 48g may be opposite to the first upper bushing 48f, and may be spaced downwardly from the first upper bushing 48f. The first fastening member 48a may penetrate the first lower bushing 48g. The first lower bushing 48g may have a cylindrical shape in which a flange (no reference numeral) is formed in a lower end. The flange of the first lower bushing 48g may contact on the first lower groove 480b formed along the circumference of the hole 480h in the lower surface of the first body 480. A portion (no reference numeral) of the first lower bushing 48g may be inserted into the hole 480h of the first body 480, may be positioned between the inner circumferential surface of the first body 480 and the outer circumferential surface of the first fastening member 48a, and may be in contact with the inner circumferential surface of the first body 480 and the outer circumferential surface of the first fastening member 48a.

The first lower washer 48h may be positioned in the lower side of the first lower bushing 48g, and may be penetrated by the first fastening member 48a. The first lower washer 48h may have a ring shape.

The first lower fixing washer 48c may be opposite to the first lower bushing 48g with respect to the first lower washer 48h, and may be penetrated by the first fastening member 48a. The first lower fixing washer 48c may be fixed to the inner side of the lower arm body 52. For example, the first lower fixing washer 48c may be a toothed lock washer. A tooth 48ct of the first lower fixing washer 48c may be inserted and coupled to a groove (no reference numeral) formed in the inner side of the lower arm body 52.

Accordingly, the first body 480 may rotate with respect to the first fastening member 48a. That is, the first fastening member 48a may provide a first swivel shaft. In addition, due to the elastic force of the first disc spring 48d described above, the head 10 may maintain a certain swivel angle, as long as an external force greater than or equal to a certain level is not applied.

Meanwhile, the first groove 48g may be formed along the circumferential direction of the first body 480 in the side surface of the first body 480. The first groove 48g may face the inside of the front groove 50g1. A first protrusion 511 may protrude from the front groove 50g1 toward the first groove 48g, and may be inserted into the first groove 48g. The length of the first protrusion 511 may be smaller than the length of the first groove 48g. That is, when the first body 480 rotates with respect to the first fastening member 48a, the first protrusion 511 may relatively move along the first groove 48g. The rotation of the first body 480 may be limited as one end or the other end of the first groove 48g is caught by the first protrusion 511.

Accordingly, the maximum angle at which the head 10 can be rotated left and right may be determined according to the length of the first groove 48g.

Figure 17:
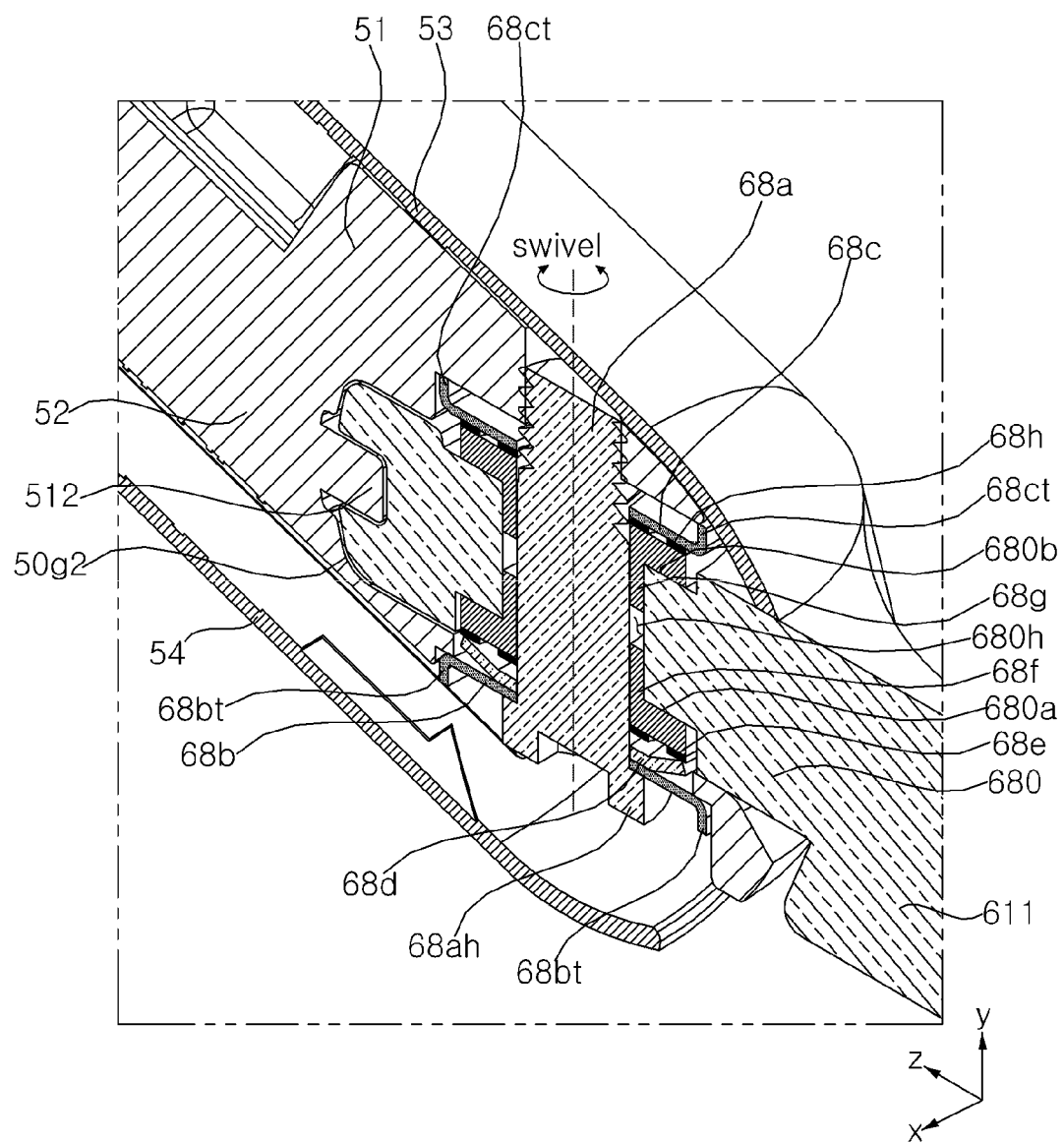

Referring to FIGS. 15 and 17, the second rotation unit 68 may include a second body 680, a second fastening member 68a, a second lower fixing washer 68b, a second disc spring 68d, a second lower washer 68e, a second lower bushing 68f, a second upper bushing 68g, a second upper washer 68h, and a second upper fixing washer 68c. The second rotation unit 68 may be referred to as a second swivel unit 68 or a second swivel module 68.

The second body 680 may be opened vertically. The second body 680 may have a donut shape as a whole. The second body 680 may be connected to the vertical member 61 through a second connection portion 611. For example, the second body 680, the second connection portion 611, and the vertical member 61 may be formed as one body. The second body 680 may be inserted into the rear groove 50g2.

The second fastening member 68a may extend in a vertical direction. The second fastening member 68a may be inserted into the arm 50 through the lower insertion hole 52b (see FIG. 14), and may penetrate the hole 680h formed in the center of the second body 680. The head 68ah of the second fastening member 68a may be positioned in the inner side the lower arm body 52. The second fastening member 68a may be screwed into the upper fastening hole 51b (see FIG. 14).

The second lower fixing washer 68b may be positioned in the upper side of the head 68ah of the second fastening member 68a, and may be penetrated by the second fastening member 68a. The second lower fixing washer 68b may be fixed to the inner side of the lower arm body 52. For example, the second lower fixing washer 68b may be a toothed lock washer. A tooth 68bt of the second lower fixing washer 68b may be inserted and coupled to a groove (no reference numeral) formed in the inner side of the lower arm body 52.

The second disc spring 68d may be positioned in the upper side of the second lower fixing washer 68b. The second disc spring 68d may have elasticity, and may be convex toward the second lower fixing washer 68b. The second disc spring 68d may generate an elastic force in the axial direction of the second fastening member 68a.

The second lower washer 68e may be positioned in the upper side of the second disc spring 68d, and may be penetrated by the second fastening member 68a. The second lower washer 68e may have a ring shape.

The second lower bushing 68f may be opposite to the second disc spring 68d with respect to the second lower washer 68e. The second fastening member 68a may penetrate the second lower bushing 68f. The second lower bushing 68f may have a cylindrical shape in which a flange (no reference numeral) is formed in the lower end. The flange of the second lower bushing 68f may contact on the second lower groove 680a formed along the circumference of the hole 680h in the lower surface of the second body 680. A portion (no reference numeral) of the second lower bushing 68f may be inserted into the hole 680h of the second body 680, may be positioned between the inner circumferential surface of the second body 680 and the outer circumferential surface of the second fastening member 68a, and may be in contact with the inner circumferential surface of the second body 680 and the outer circumferential surface of the second fastening member 68a.

The second upper bushing 68g may be opposite to the second lower bushing 68f, and may be upwardly spaced from the second lower bushing 68f. The second fastening member 68a may penetrate the second upper bushing 68g. The second upper bushing 68g may have a cylindrical shape in which a flange (no reference numeral) is formed in an upper end. The flange of the second upper bushing 68g may contact on the second upper groove 680b formed along the circumference of the hole 680h in the upper surface of the second body 680. A portion (no reference numeral) of the second upper bushing 68g may be inserted into the hole 680h of the second body 680, may be positioned between the inner circumferential surface of the second body 680 and the outer circumferential surface of the second fastening member 68a, and may be in contact with the inner circumferential surface of the second body 680 and the outer circumferential surface of the second fastening member 68a.

The second upper washer 68h may be positioned in the upper side of the second upper bushing 68g, and may be penetrated by the second fastening member 68a. The second upper washer 68h may have a ring shape.

The second upper fixing washer 68c may be opposite to the second upper bushing 68g with respect to the second upper washer 68h, and may be penetrated by the second fastening member 68a. The second upper fixing washer 68c may be fixed to the inner side of the upper arm body 51. For example, the second upper fixing washer 68c may be a toothed lock washer. A tooth 68*ct* of the second upper fixing washer 68*c* may be inserted and coupled to a groove (no reference numeral) formed in the inner side of the upper arm body 51.

Accordingly, the second body 680 may rotate with respect to the second fastening member 68*a*. That is, the second fastening member 68*a* may provide a second swivel shaft. In addition, due to the elastic force of the above-described second disc spring 68*d*, the head 10 can maintain a certain swivel angle, as long as an external force greater than or equal to a certain level is not applied.

Meanwhile, the second groove 68*g* may be formed along the circumferential direction of the second body 680 in the side surface of the second body 680. The second groove 68*g* may face inward of the rear groove 50*g*2. The second protrusion 512 may protrude from the rear groove 50*g*2 toward the second groove 68*g*, and may be inserted into the second groove 68*g*. The length of the second protrusion 512 may be smaller than the length of the second groove 68*g*. That is, when the second body 680 rotates with respect to the second fastening member 68*a*, the second protrusion 512 may relatively move along the second groove 68*g*. The rotation of the second body 680 may be limited as one end or the other end of the second groove 68*g* is caught by the second protrusion 512.

Accordingly, the maximum angle at which the head 10 can be rotated left and right may be determined according to the length of the second groove 68*g*.

Figure 18:
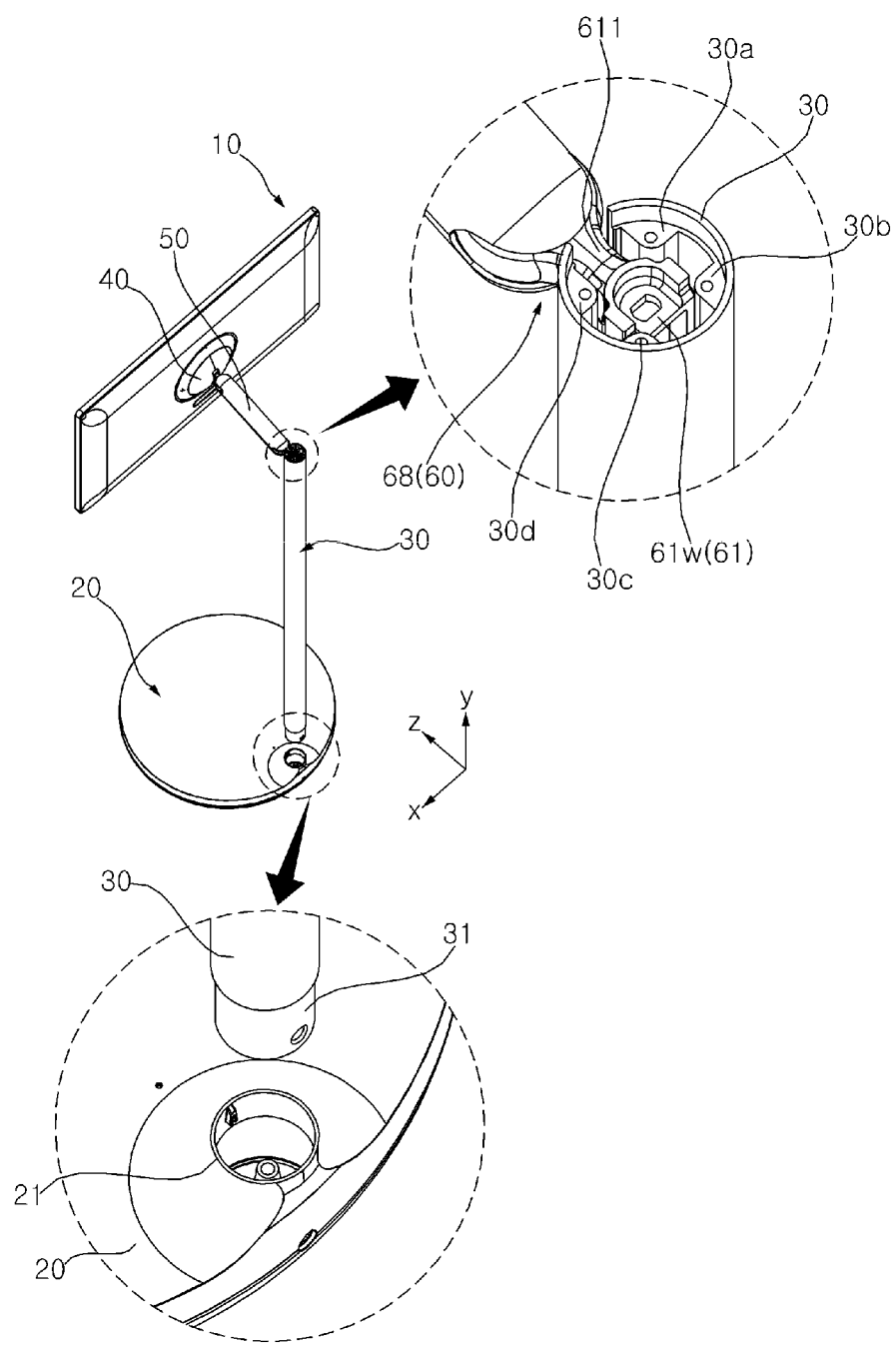

Referring to FIG. 18, the arm 50 may extend in a direction intersecting the head 10 and the pole 30. The arm 50 may connect the articulated connector 40 and the elevating module 60. The second rotation unit 68 of the elevating module 60 and the vertical member 61 may be connected through the second connection portion 611. The second connection portion 611 may penetrate the pole 30.

The vertical member 61 may extend in the length direction of the pole 30. The vertical member 61 may be accommodated in the pole 30. A partition wall 61*w* may be adjacent to the upper end of the vertical member 61.

The pole 30 may extend in a vertical direction, and surround the vertical member 61. A plurality of ribs 30*a*, 30*b*, 30*c*, and 30*d* may be positioned between the pole 30 and the vertical member 61, and may be spaced apart from each other in the circumferential direction of the pole 30. The first rib 30*a*, the second rib 30*b*, the third rib 30*c*, and the fourth rib 30*d* may be positioned in a vertex of an arbitrary rectangle inside the pole 30.

In addition, the lower end 31 of the pole 30 may be inserted and coupled to a port 21 formed in the upper surface of the base 20. For example, the port 21 may have a monticule shape.

Figure 19:
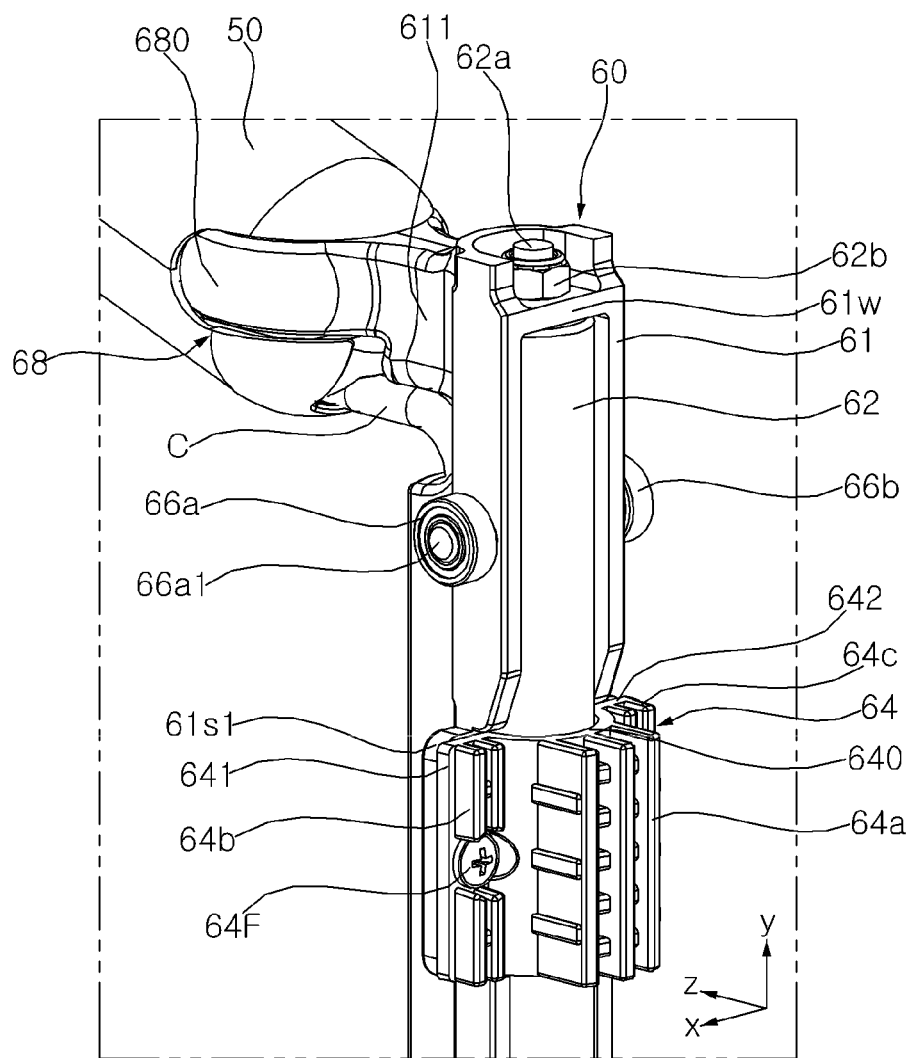
Figure 20:
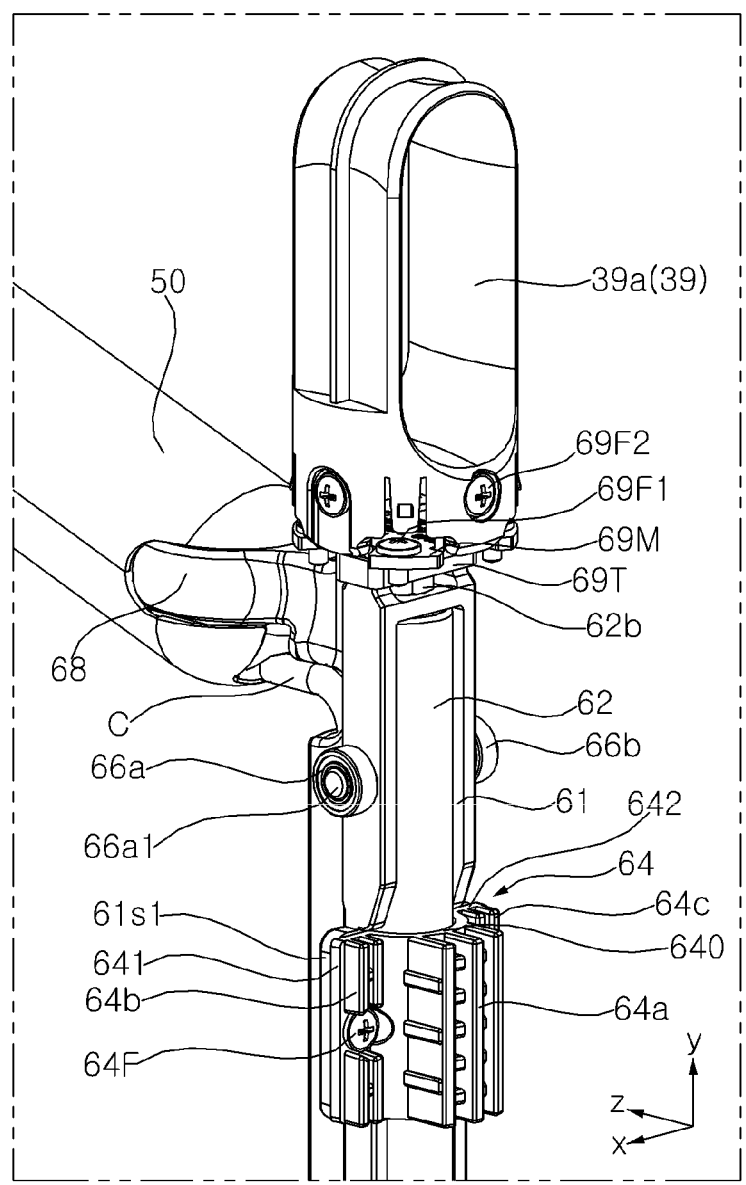

Referring to FIGS. 19 and 20, the vertical member 61 may have a cylindrical shape cut in half as a whole. The rear and lower sides of the vertical member 61 may be opened, and the upper side may be blocked by the partition wall 61*w*.

The upper shaft 62 may extend in the length direction of the vertical member 61. The upper shaft 62 may have a cylindrical shape with an upper side blocked. At least a portion of the upper shaft 62 may be accommodated in the vertical member 61. A protrusion 62*a* may protrude upward from the upper side of the upper shaft 62, and may penetrate the partition wall 61*w*. A fastening member 62*b* such as a nut may be screwed to the protrusion 62*a* on the partition wall 61*w*. Accordingly, the upper shaft 62 may be detachably coupled to the vertical member 61.

A cap 69T may be fitted on the upper end of the vertical member 61, and may be flat. A mount 69M may be positioned on the cap 69T, and may be fastened to the plurality of ribs 30*a*, 30*b*, 30*c*, 30*d* (see FIG. 18) through the vertical fastening member 69F1. A handle body 39*a* of the handle 39 may be opposite to the cap 69T with respect to the mount 69M, and may be fastened to the mount 69M through a horizontal fastening member 69F2. The handle body 39*a* may have a track shape as a whole, and may be covered by a handle cover 39*b* (see FIG. 2).

Figure 21:
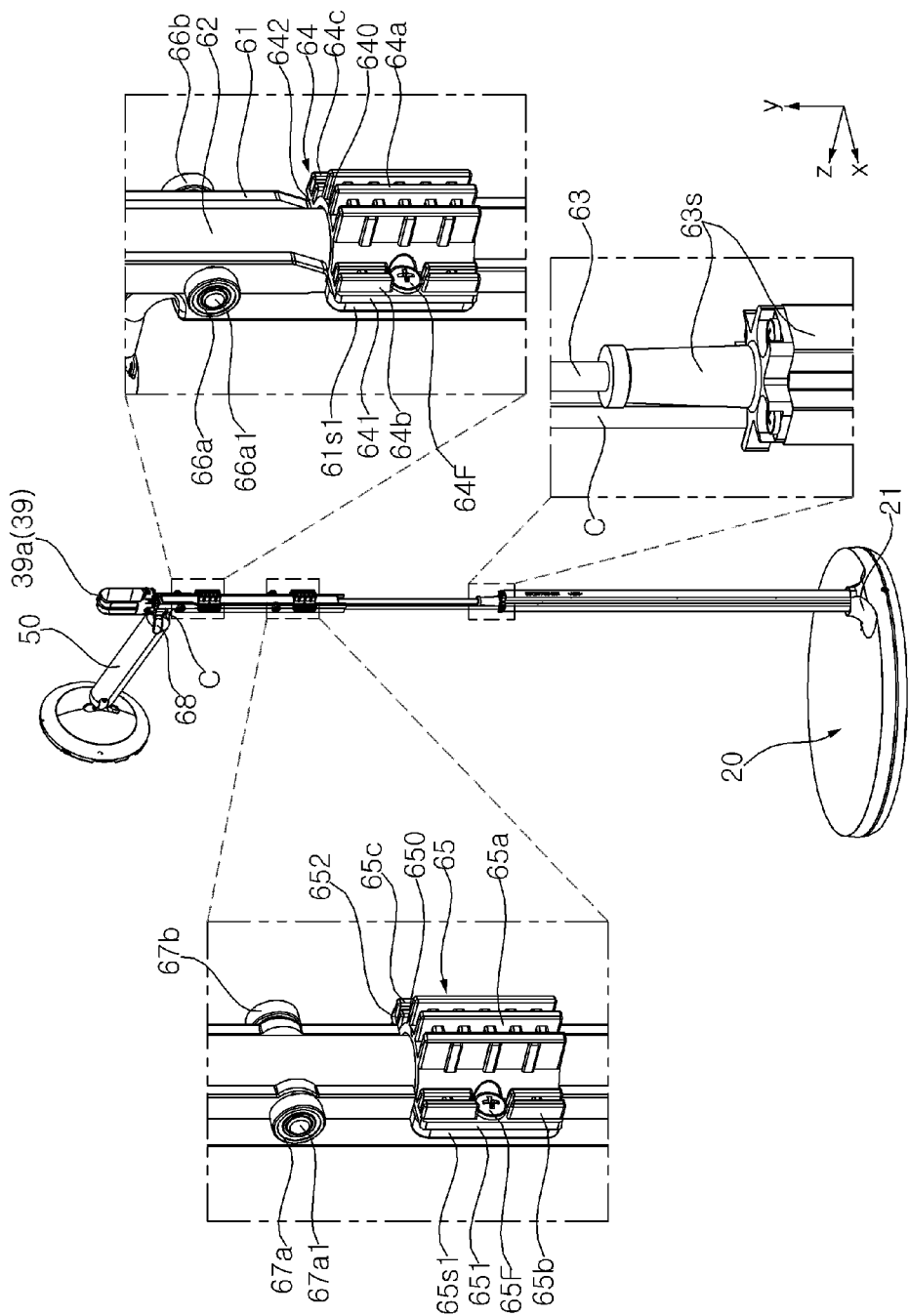

Referring to FIG. 21, a stem 63*s* may extend in a vertical direction and may be aligned with the vertical member 61. The lower end of the stem 63*s* may be inserted into the port 21 of the base 20.

A gas spring 62, 63 may include the above-described upper shaft 62 and a lower shaft 63 connected to the upper shaft 62 in an up-down direction. The lower shaft 63 may extend in the length direction of the upper shaft 62, and may have a smaller diameter than the upper shaft 62. That is, the lower shaft 63 may be inserted into the upper shaft 62. The lower end of the lower shaft 63 may be fixed on the stem 63*s*.

A clamp 64, 65 may be opposite to the vertical member 61 with respect to the upper shaft 62. In other words, the upper shaft 62 may be positioned between the vertical member 61 and the clamp 64, 65. For example, the clamp 64, 65 may be provided in plurality. For example, the first clamp 64 and the second clamp 65 may be spaced apart from each other in the up-down direction.

The first clamp 64 may include a first semi-cylinder 640, a first left flange 641, and a first right flange 642. The first semi-cylinder 640 may contact the outer circumference of the upper shaft 62. The first left flange 641 may extend from one side of the first semi-cylinder 640 to the left, and may be coupled to a first portion 61*s*1 of the vertical member 61 through a fastening member 64F. The first right flange 642 may extend from the other side of the first semi-cylinder 640 to the right, and may be coupled to a second portion 61*s*2 of the vertical member 61 through a fastening member (not shown).

The second clamp 65 may include a second semi-cylinder 650, a second left flange 651, and a second right flange 652. The second semi-cylinder 650 may contact the outer circumference of the upper shaft 62. The second left flange 651 may extend from one side of the second semi-cylinder 650 to the left, and may be coupled to a third portion 65*s*1 of the vertical member 61 through the fastening member 65F. The second right flange 652 may extend from the other side of the second semi-cylinder 640 to the right, and may be coupled to a fourth portion (not shown) of the vertical member 61 through a fastening member (not shown).

Accordingly, the upper shaft 62 may be detachably coupled to the vertical member 61. In addition, the upper shaft 62 can move down or up along the lower shaft 63.

Figure 22:
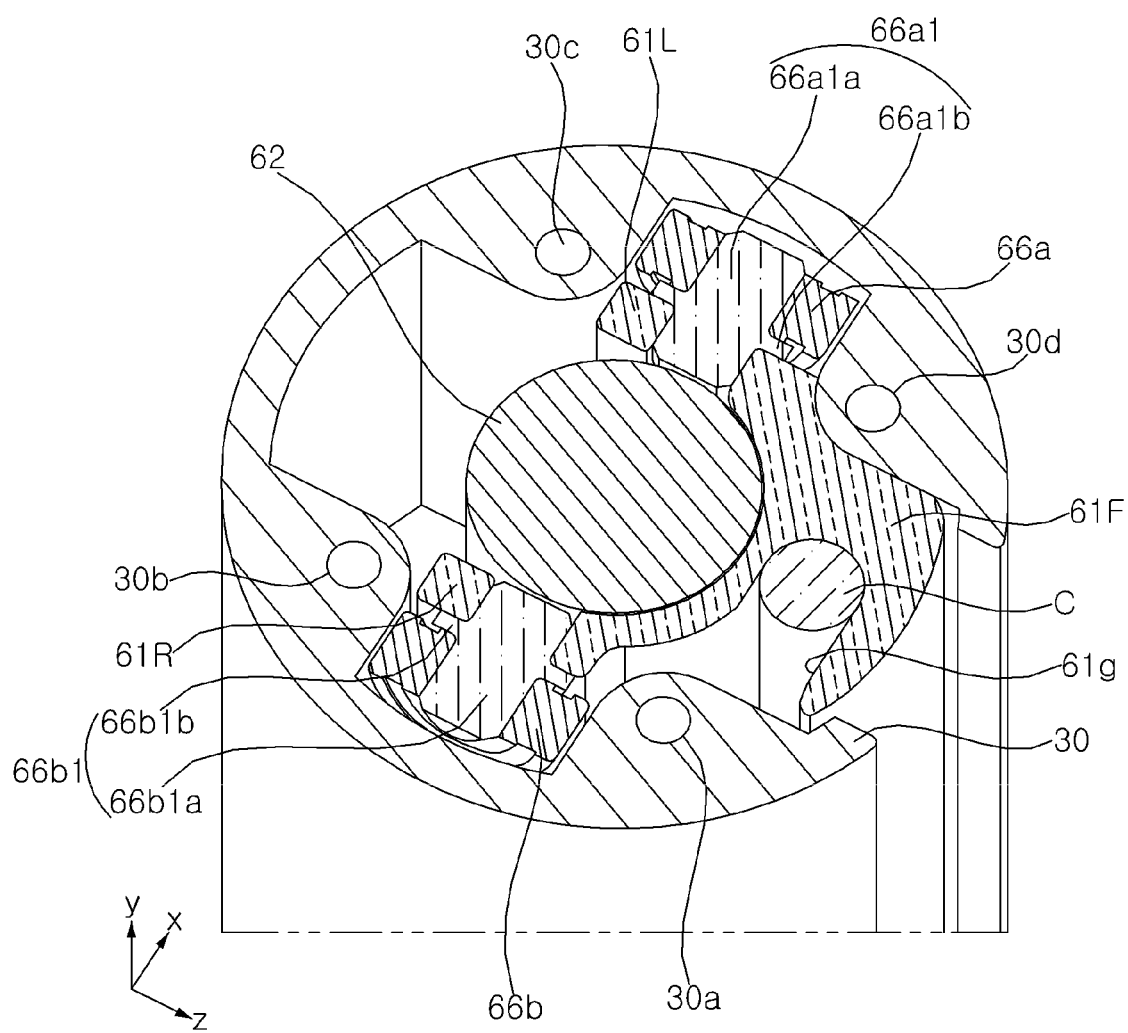

Referring to FIGS. 21 and 22, a roller 66*a*, 66*b*, 67*a*, 67*b* may be adjacent to the clamp 64, 65. For example, a first roller 66*a*, 66*b* may be adjacent to the first clamp 64, and a second roller 67*a*, 67*b* may be adjacent to the second clamp 65.

The first roller 66*a*, 66*b* may include a first left roller 66*a* and a first right roller 66*b*. A body 66*a*1*a* of a first left pin 66*a*1 may penetrate the first left roller 66*a* and a left side portion 61L of the vertical member 61. A flange 66*a*1*b* of the first left pin 66*al* may be positioned between the first left roller 66*a* and the left side portion 61L. The first left roller 66*a* may be coupled to the left side portion 61L through the first left pin 66*al*. A body 66*b*1*a* of a first right pin 66*b*1 may penetrate the first right roller 66*b* and a right side portion 61R of the vertical member 61. A flange 66*b*1*b* of the first right pin 66b1 may be positioned between the first right roller 66b and the right side portion 61R. Accordingly, the first right roller 66b may be coupled to the right side portion 61R through the first right pin 66b1.

For example, the second roller 67a, 67b may have the same shape as the first roller 66a, 66b. That is, the contents described above with respect to the first rollers 66a and 66b may be equally applied to the second rollers 67a and 67b. Accordingly, the second left roller 67a may be coupled to the left side portion 61L, and the second right roller 67b may be coupled to the right side portion 61R.

In addition, the left roller 66a, 67a may be positioned between a third rib 30c and a fourth rib 30d, and may be in contact with the third rib 30c and the fourth rib 30d. The right roller 66b, 67b may be positioned between a first rib 30a and a second rib 30b, and may be in contact with the first rib 30a and the second rib 30b. For example, the roller 66a, 66b, 67a, 67b may have an oil groove through which a fluid such as oil flows. For example, the roller 66a, 66b, 67a, 67b may include a Poly Oxy Methylene (POM) material.

Accordingly, the vertical member 61 can be smoothly raised or lowered inside the pole 30 by the roller 66a, 66b, 67a, 67b.

Figure 23:
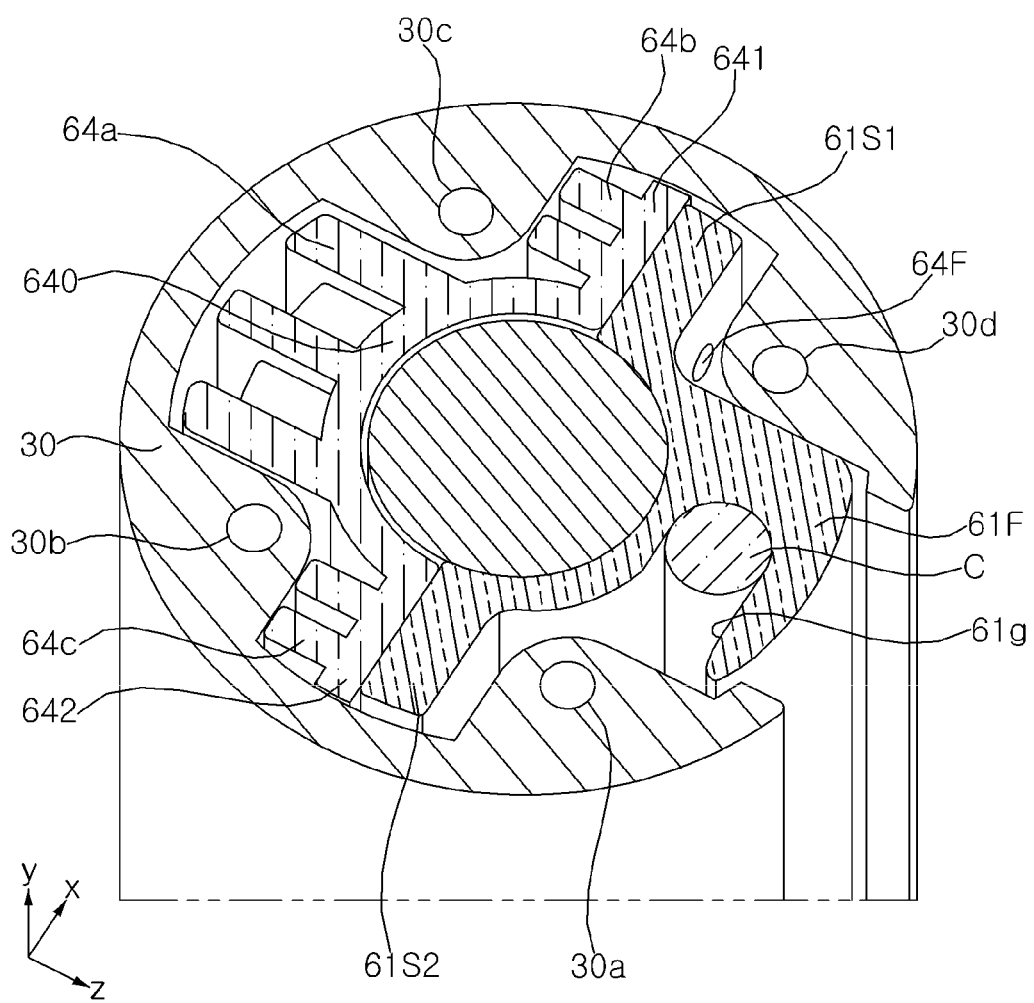

Referring to FIGS. 21 and 23, the first left flange 641 of the first clamp 64 may be positioned between the third rib 30c and the fourth rib 30d. The first right flange 642 of the first clamp 64 may be positioned between the first rib 30a and the second rib 30b. The first clamp 64 may include a first center protrusion 64a, a first left protrusion 64b, and a first right protrusion 64c.

The first center protrusion 64a may protrude from the first semi-cylinder 650 toward the inner side of the pole 30, and may contact the inner side of the pole 30. For example, a plurality of first center protrusions 64a may be spaced apart from each other, and may be parallel to each other. The first left protrusion 64b may protrude from the first left flange 641 toward the third rib 30c, and may contact the third rib 30c. The first right protrusion 64c may protrude from the first right flange 642 toward the second rib 30b, and may contact the second rib 30b. Accordingly, the first center protrusion 64a, the first left protrusion 64b, and the first right protrusion 64c may cause friction between the vertical member 61 and the pole 30.

For example, the second clamp 65 may be spaced downward from the first clamp 64, and may have the same shape as the first clamp 64. That is, the above description of the first clamp 64 may be identically applied to the second clamp 65. Accordingly, the second center protrusion 65a, the second left protrusion 65b, and the second right protrusion 65c of the second clamp 65 may cause friction between the vertical member 61 and the pole 30.

Accordingly, the position (height) of the vertical member 61 with respect to the base 20 may be uniformly maintained by a friction force between the protrusion 64a, 64b, 64c, 65a, 65b, 65c and the pole 30, as long as an external force greater than or equal to a certain level is not applied.

Meanwhile, the length of the left protrusion 64b, 65b and the right protrusion 64c, 65c may be smaller than the length of the center protrusion 64a, 65a. Accordingly, the pole 30 may include a plurality of ribs 30a, 30b, 30c, and 30d, and the rigidity of the pole 30 may be sufficiently secured.

Referring back to FIGS. 22 and 23, a cable groove 61g may be formed in a front portion 61F of the vertical member 61, and may be formed to be elongated in the vertical direction. A cable C may be inserted into the cable groove 61g. The cable C may be disposed along the cable groove 50c (see FIG. 14) of the arm 50, and may be electrically connected to the head 10. In addition, the cable C may be disposed along the stem 63s (see FIG. 21), and may be electrically connected to electronic components such as a battery Bt (see FIG. 1) disposed inside the base 20.

Figure 24:
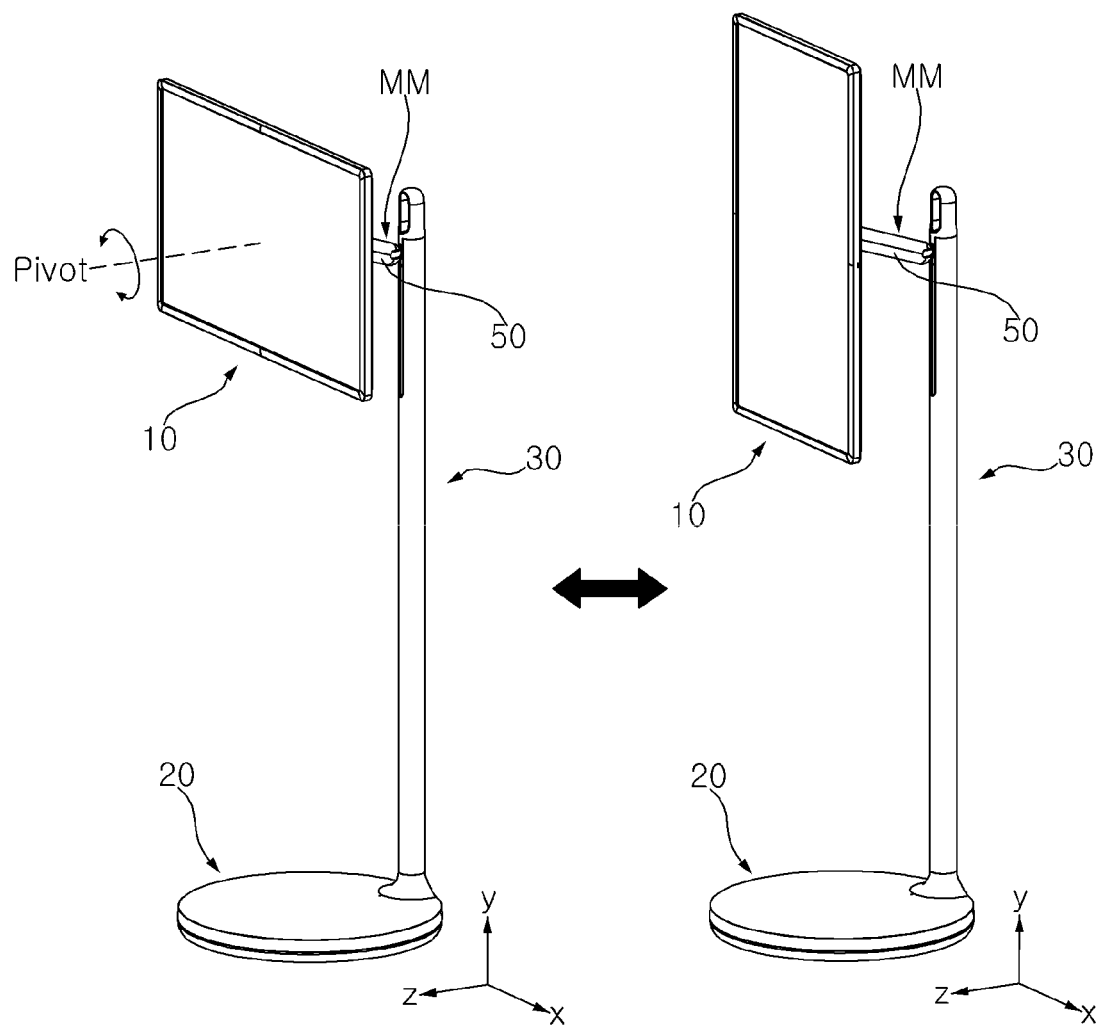

Referring to FIG. 24, the head 10 may be spaced upwardly from the base 20. A user may pivot the head 10. In this case, a pivot axis may pass through the center of the head 10 and may be orthogonal to the head 10. Referring to the left drawing of FIG. 24, the head 10 may be placed in a landscape mode. Referring to the right drawing of FIG. 24, the head 10 may be placed in a portrait mode.

Figure 25:
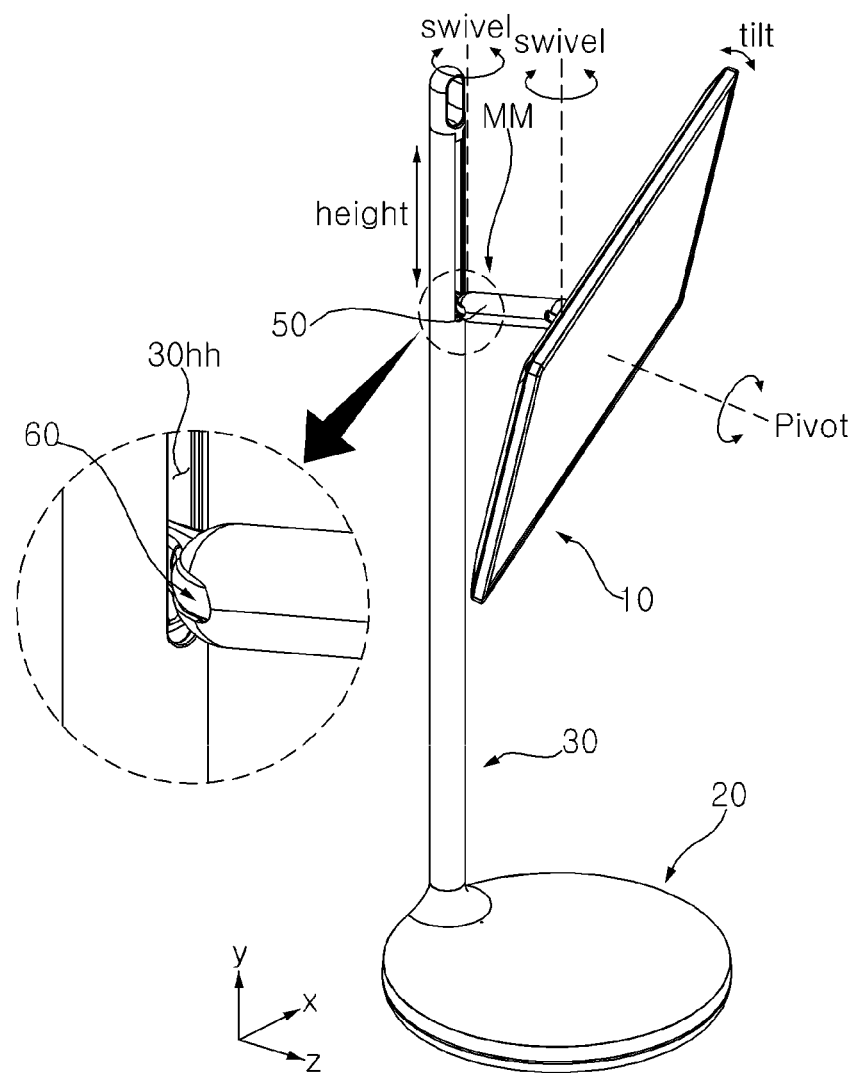

Referring to FIG. 25, a user may tilt the head 10. In this case, the tilt axis may be a horizontal axis which is positioned in the rear direction of the center of the head 10 and parallel to the head 10. A user may swivel the head 10. In this case, a first swivel axis may be a vertical axis adjacent to one end of the arm 50. Alternatively, a second swivel axis may be a vertical axis adjacent to the other end of the arm 50. A user may raise or lower the head 10 from the pole 30. At this time, the minimum height and the maximum height of the head 10 may be formed by engaging the arm 50 into the hole 30hh formed in the pole 30.

The above-described pivoting, tilting, swiveling, and elevating operations of the head 10 may be implemented independently of each other. For example, the head 10 may be pivoted within a range of +90 degrees to −90 degrees. For example, the head 10 may be tilted within the range of +25 degrees to −25 degrees. For example, the head 10 may be swiveled within a range of +65 to −65 degrees. For example, the head 10 may be positioned at 1,065 to 1,265 mm from the base 20 or the ground, based in a landscape mode.

Figure 26:
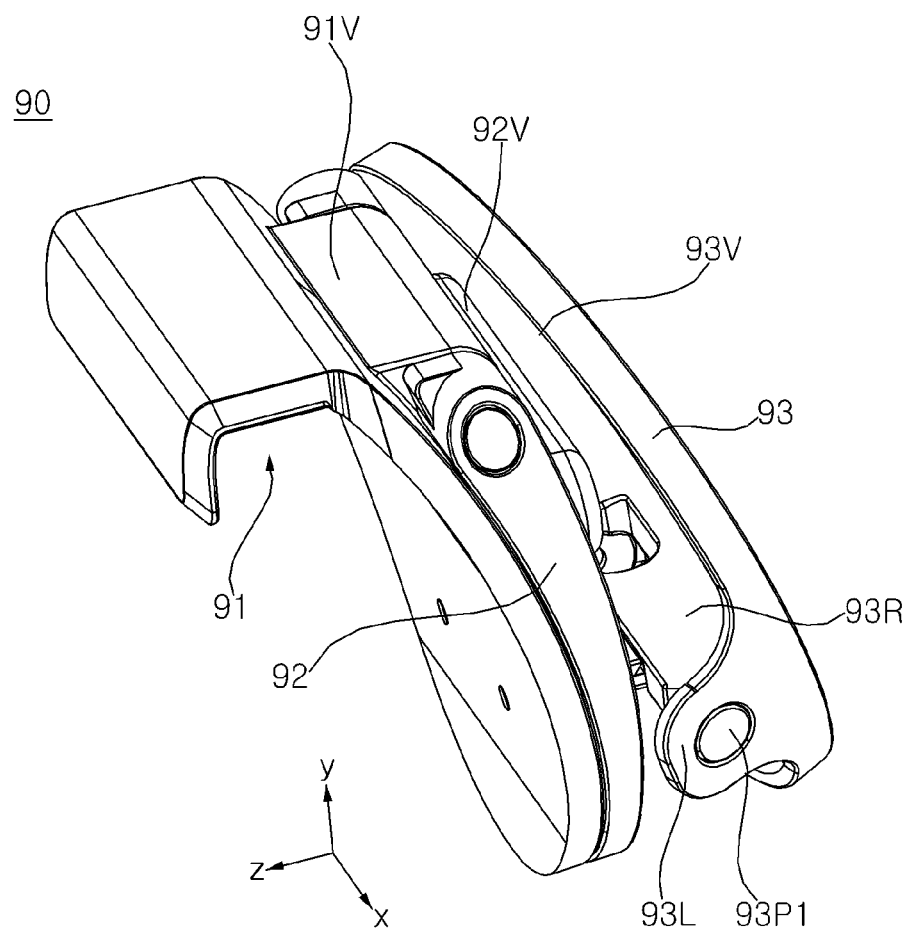

Referring to FIG. 26, a cradle 90 may include a front part 91, a middle part 92, and a rear part 93. The middle part 92 may be positioned in the rear direction of the front part 91, and may be coupled to the front part 91. The rear part 93 may be opposite to the front part 91 with respect to the middle part 92, and may be coupled to the middle part 92.

Figure 27:
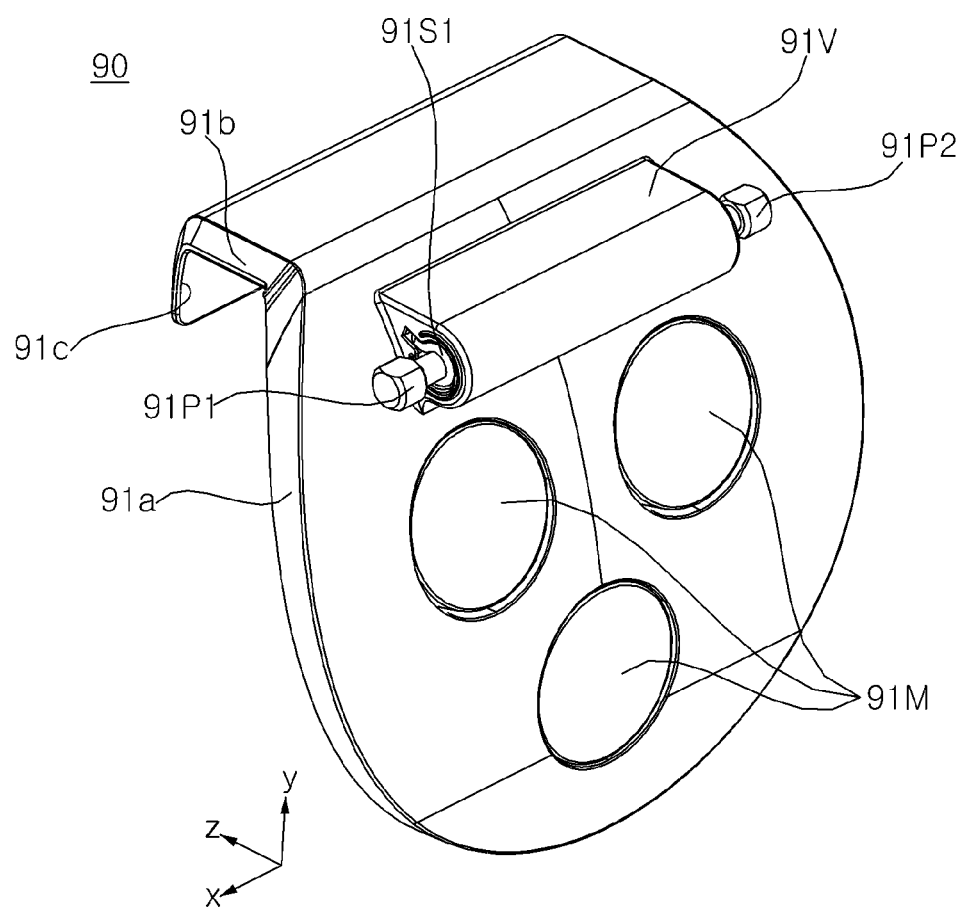
Figure 28:
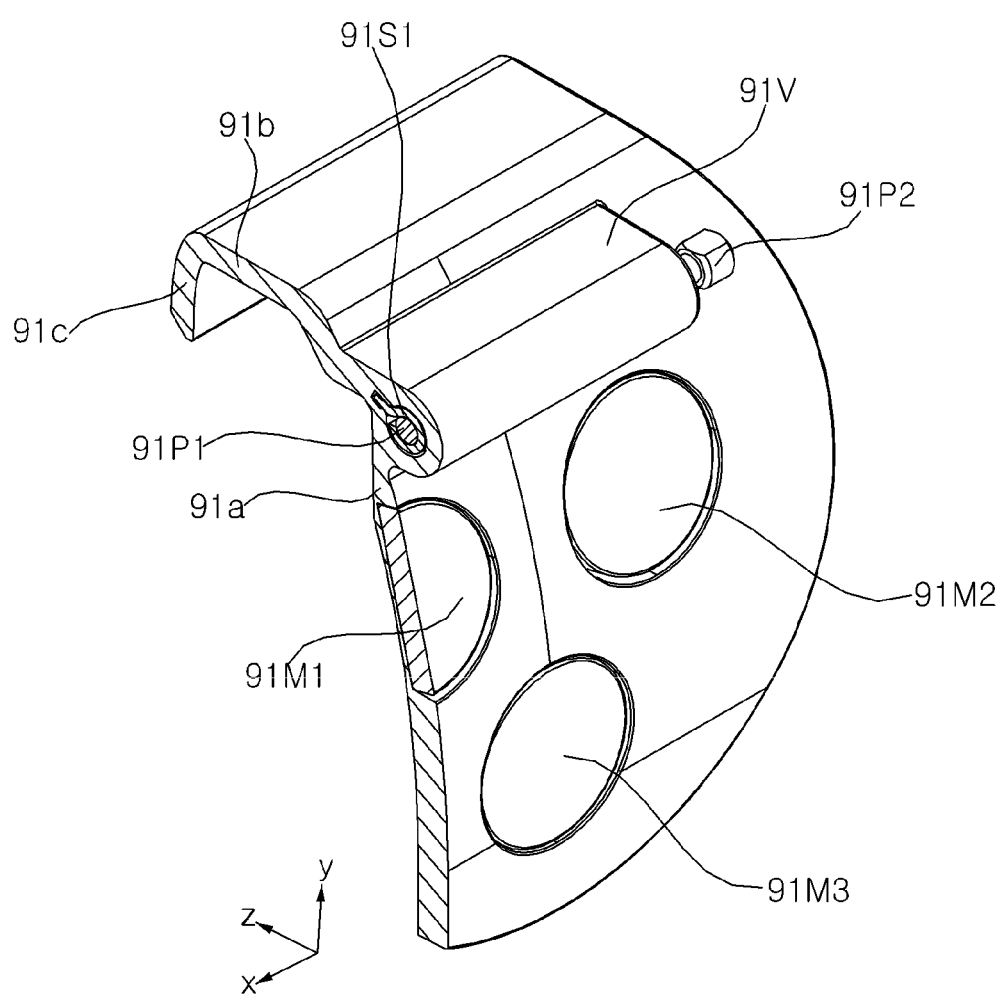

Referring to FIGS. 27 and 28, the front part 91 may include a first part 91a, a second part 91b, and a third part 91c. The front surface of the first part 91a may have a shape corresponding to the rear surface of a portion adjacent to the circumference of the back cover 15 among the rear surface of the back cover 15 (see FIG. 2). The front surface of the first part 91a may be curved. The second part 91b may be bent in the front direction from the upper end of the first part 91a. The angle between the second part 91b and the first part 91a may be an obtuse angle. The third part 91c may be bent downward from the front end of the second part 91b. The angle between the third part 91c and the second part 91b may be a right angle or slightly greater than 90 degrees. Accordingly, the first part 91a may have a shape in which a portion of an upper portion of the curved disc is cut off, and the second part 91b and the third part 91c may have a hook shape as a whole.

At least one magnet 91M may be coupled to the first part 91a. For example, a first magnet 91M1, a second magnet 91M2, and a third magnet 91M3 may be seated in a groove formed on the rear surface of the first part 91a. Preferably, a plurality of magnets 91M1, 91M2, and 91M3 may be symmetrically disposed in the first part 91a.

A support portion 91V may be adjacent to the upper end of the first part 91, and may protrude in the rear direction from the rear surface of the first part 91. The support portion 91V may extend in the left-right direction. A left fixing pin 91P1 may be fixed to one end of the support portion 91V, and a right fixing pin 91P2 may be fixed to the other end of the support portion 91V. A reinforcing portion 91S1 may have a hook shape, and may be inserted into the support portion 91V. For example, a single reinforcing portion 91S1 may extend long in the left-right direction along the support portion 91V. For another example, one of a pair of reinforcing portions 91S1 may be adjacent to the left fixing pin 91P1, and the other may be adjacent to the right fixing pin 91P2.

Figure 29:
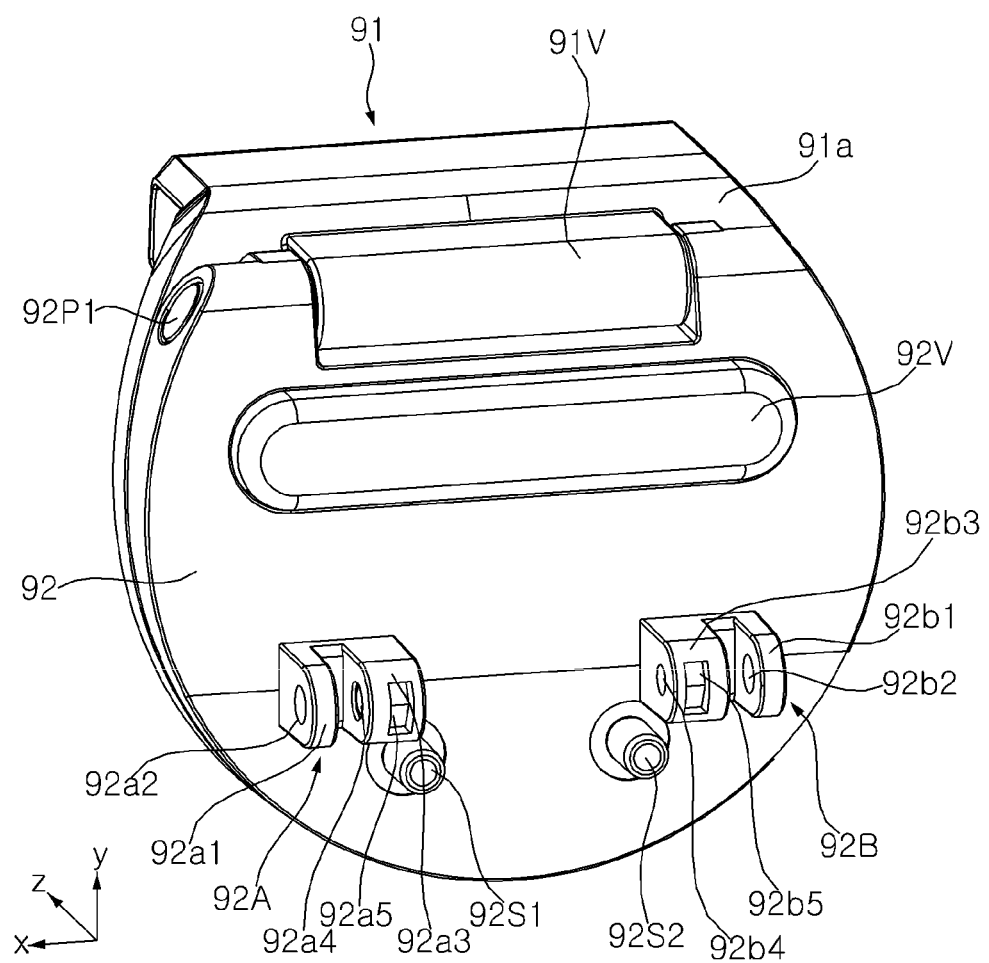

Referring to FIG. 29, the middle part 92 may be seated on the rear surface of the first part 91a. The middle part 92 may have a shape corresponding to the first part 91a, and may be penetrated by the support portion 91V. In this case, the left fixing pin 91P1 (see FIG. 28) may be inserted into one side of the middle part 92, and the right fixing pin 91P2 (see FIG. 28) may be inserted into the other side of the middle part 92. Accordingly, the middle part 92 may be coupled to the front part 91. Meanwhile, the first left cover pin 92P1 may be aligned with the left fixing pin 91P1, and may close a hole formed in one side of the middle part 92. In addition, the first right cover pin 92P2 may be aligned with the right fixing pin 91P2, and may close a hole formed in the other side of the middle part 92.

An axis holder 92A, 92B may protrude the rear direction from the lower portion of the middle part 92. For example, the axis holder 92A, 92B may include a first axis holder 92A and a second axis holder 92B that are spaced apart from each other in the left-right direction.

The first axis holder 92A may include a first insertion portion 92a1 having a first insertion hole 92a2 and a first fixing portion 92a3 having a first fixing hole 92a4. The first fixing member 92a5 such as a nut may be fixed to the inner side of the first fixing portion 92a3 and may be aligned with the first fixing hole 92a4 and the first insertion hole 92a2.

The second axis holder 92B may include a second insertion portion 92b1 having a second insertion hole 92b2 and a second fixing portion 92b3 having a second fixing hole 92b4. The second fixing member 92b5 such as a nut may be fixed to the inner side of the second fixing portion 92b3 and may be aligned with the second fixing hole 92b4 and the second insertion hole 92b2.

For example, the second axis holder 92B and the first axis holder 92A may be symmetrical.

A fixing pin 92S1, 92S2 may protrude in the rear direction from the lower portion of the middle part 92. The fixing pin 92S1, 92S2 may be adjacent to the axis holder 92A, 92B. For example, the fixing pin 92S1, 92S2 may include a first fixing pin 92S1 and a second fixing pin 92S2 spaced apart from each other in the left-right direction.

The first fixing pin 92S1 may be adjacent to the first axis holder 92A, and may protrude in the rear direction from the rear surface of the middle part 92. The second fixing pin 92S2 may be adjacent to the second axis holder 92B, and may protrude in the rear direction from the rear surface of the middle part 92. For example, the second fixing pin 92S2 may have the same shape as the first fixing pin 92S1.

Figure 30:
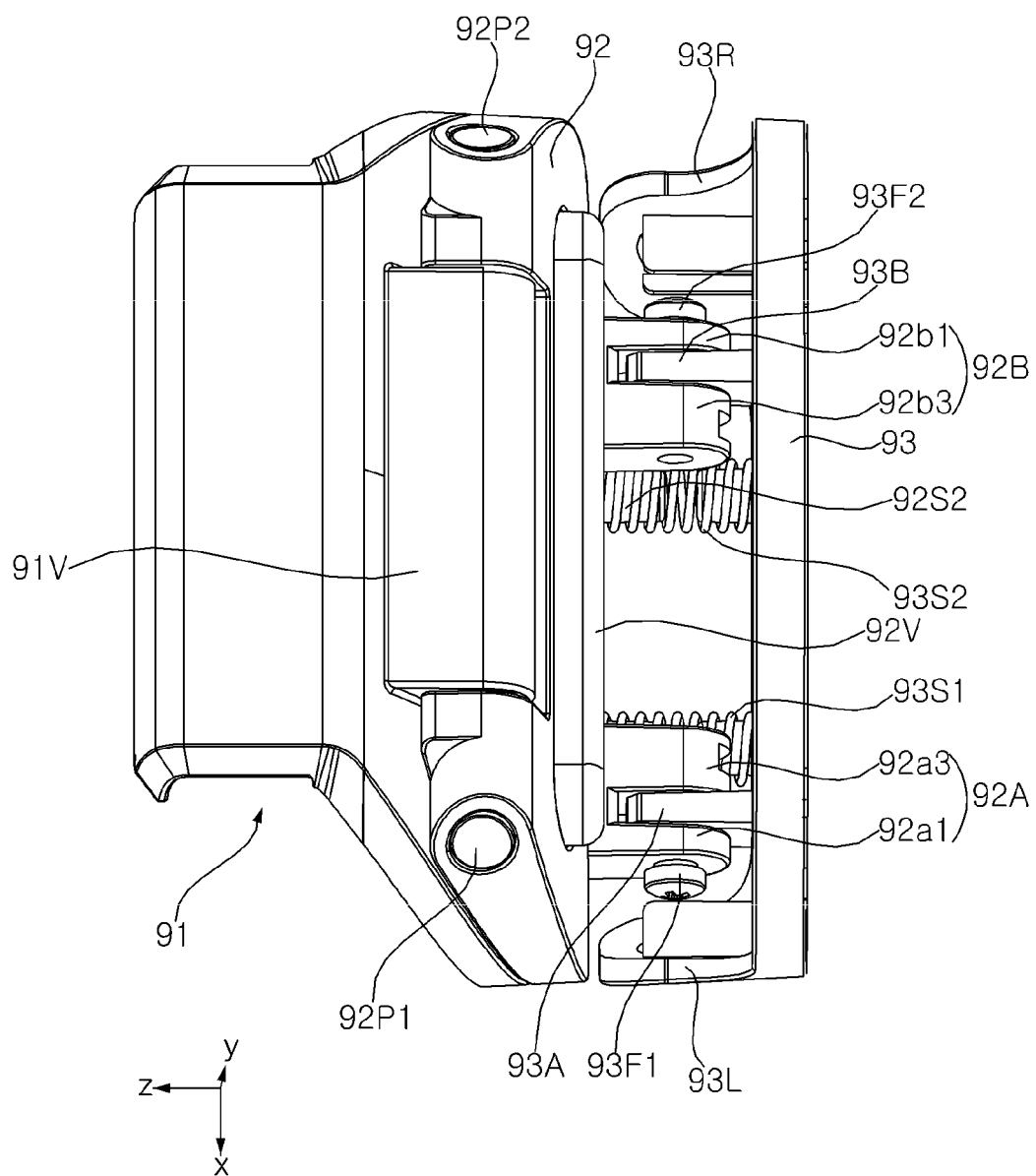

Referring to FIGS. 29 and 30, the rear part 93 may be positioned in the rear direction of the middle part 92, and may face the middle part 92.

A leaf 93A, 93B may protrude from the lower portion of the rear part 93 toward the middle part 92. The leaf 93A, 93B may be positioned between the insertion portion 92a1, 92b1 and the fixing portion 92a3, 92b3 of the axis holder 92A, 92B. A fastening member 93F1, 93F2 such as a bolt may penetrate the insertion portion 92a1, 92b1, the leaf 93A, 93B, and the fixing portion 92a3, 92b3, and may be fastened to the fixing member 92a5, 92b5. For example, the leaf 93A, 93B may include a first leaf 93A that is penetrated by a first fastening member 93F1 at between the first insertion portion 92a1 and the first fixing portion 92a3, and a second leaf 93B that is penetrated by a second fastening member 93F2 at between the second insertion portion 92b1 and the second fixing portion 92b3.

Accordingly, the rear part 93 may rotate with respect to the fastening member 93F1, 93F2. That is, the fastening member 93F1, 93F2 may provide a hinge axis of the rear part 93.

An elastic member 93S1, 93S2 may have elasticity, and may extend in the length direction of the fixing pin 92S1, 92S2. The fixing pin 92S1, 92S2 may be inserted into the elastic member 93S1, 93S2. One end of the elastic member 93S1, 93S2 may be fixed to the middle part 92, and the other end of the elastic member 93S1, 93S2 may be fixed to the rear part 93. For example, the elastic member 93S1, 93S2 may be a spring. For example, the elastic member 93S1 may include a first elastic member 93S1 wound around the outer circumference of the first fixing pin 92S1 and a second elastic member 93S2 wound around the outer circumference of the second fixing pin 92S2.

Meanwhile, the left portion 93L of the rear part 93 may have a first hole through which the first fastening member 93F1 passes, and a first cover pin 93P1 may close the hole. In addition, the right portion 93R of the rear part 93 may have a second hole through which the second fastening member 93F2 passes, and a second cover pin (not shown) may close the second hole.

Figure 31:
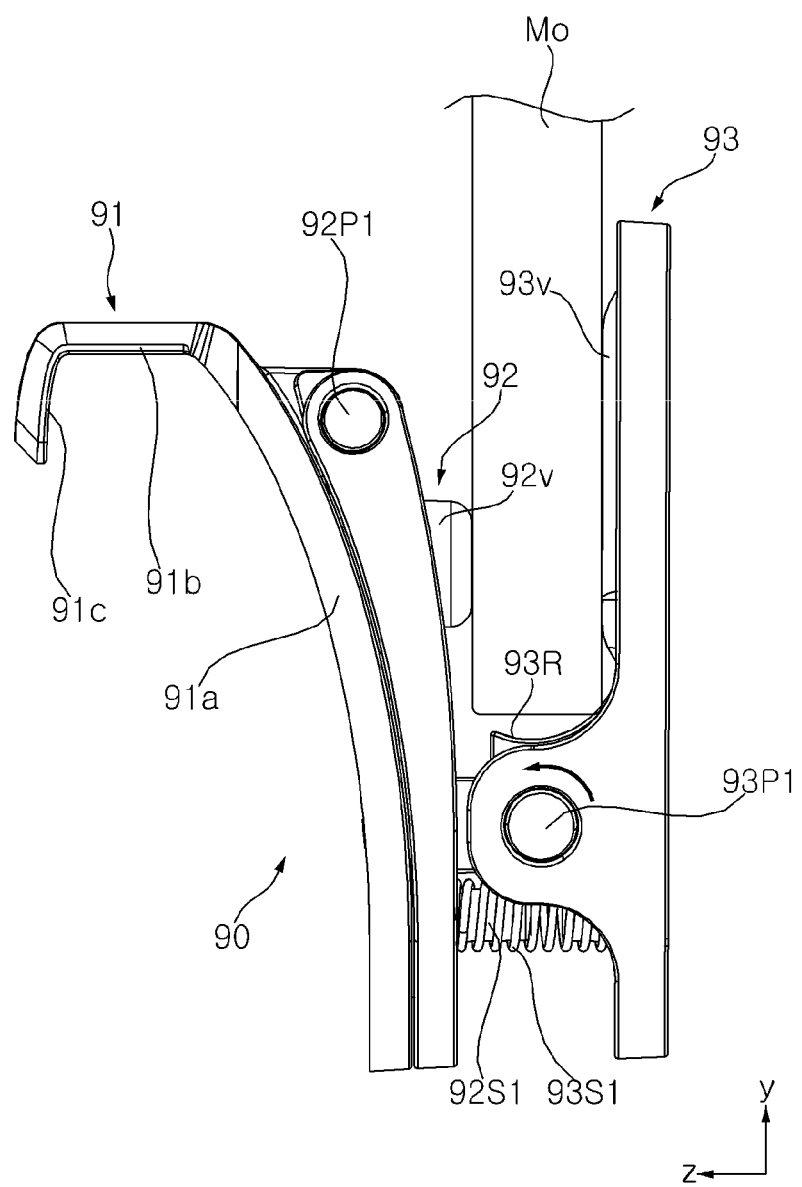

Referring to FIGS. 26 and 31, when the rear part 93 may rotate clockwise with respect to the above-described hinge axis 93F1, 93F2 by an external force applied to the rear part 93, the elastic member 93S1, 93S2 may be compressed and elastically deformed. That is, when the external force applied to the rear part 93 is released, the elastic member 93S1, 93S2 may be extended and restored, and may rotate counterclockwise with respect to the above-described hinge axis 93F1, 93F2 by the elastic force of the elastic member 93S1, 93S2.

Referring to FIG. 26, in the initial state of the cradle 90, the upper portion of the rear part 93 may be in contact with contact or adjacent to the middle part 92.

Referring to FIG. 31, a user may rotate the rear part 93 clockwise with respect to the above-described hinge axis 93F1, 93F1, and may insert a terminal Mo such as a smartphone into between the middle part 92 and the rear part 93. In this case, the rear part 93 may press the terminal Mo to the middle part 92 by the elastic force of the elastic member 93S1, 93S2. Accordingly, the terminal Mo may be stably fixed to the cradle 90.

Meanwhile, a middle pad 92V may protrude in the rear direction from the rear surface of the middle part 92. In addition, the rear pad 93V may protrude in the front direction from the rear part 93. A pad 92V, 93V made of a cushioning material such as rubber or silicon may alleviate an impact applied to the terminal Mo or minimize the occurrence of scratches on the terminal Mo by the cradle 90.

Referring back to FIGS. 1 and 2, a hook 91b, 91c of the cradle 90 may be caught on the end frame 14. Specifically, the third part 91c of the front part 91 may be caught on the horizontal portion 14H (see FIG. 3) of the end frame 14, the second part 91b may be positioned on the vertical portion 14V (see FIG. 3) of the end frame 14, and the first part 91a may be positioned on the rear surface of the back cover 15. Accordingly, the cradle 90 may be detachably coupled to the circumference of the head 10.

Figure 32:
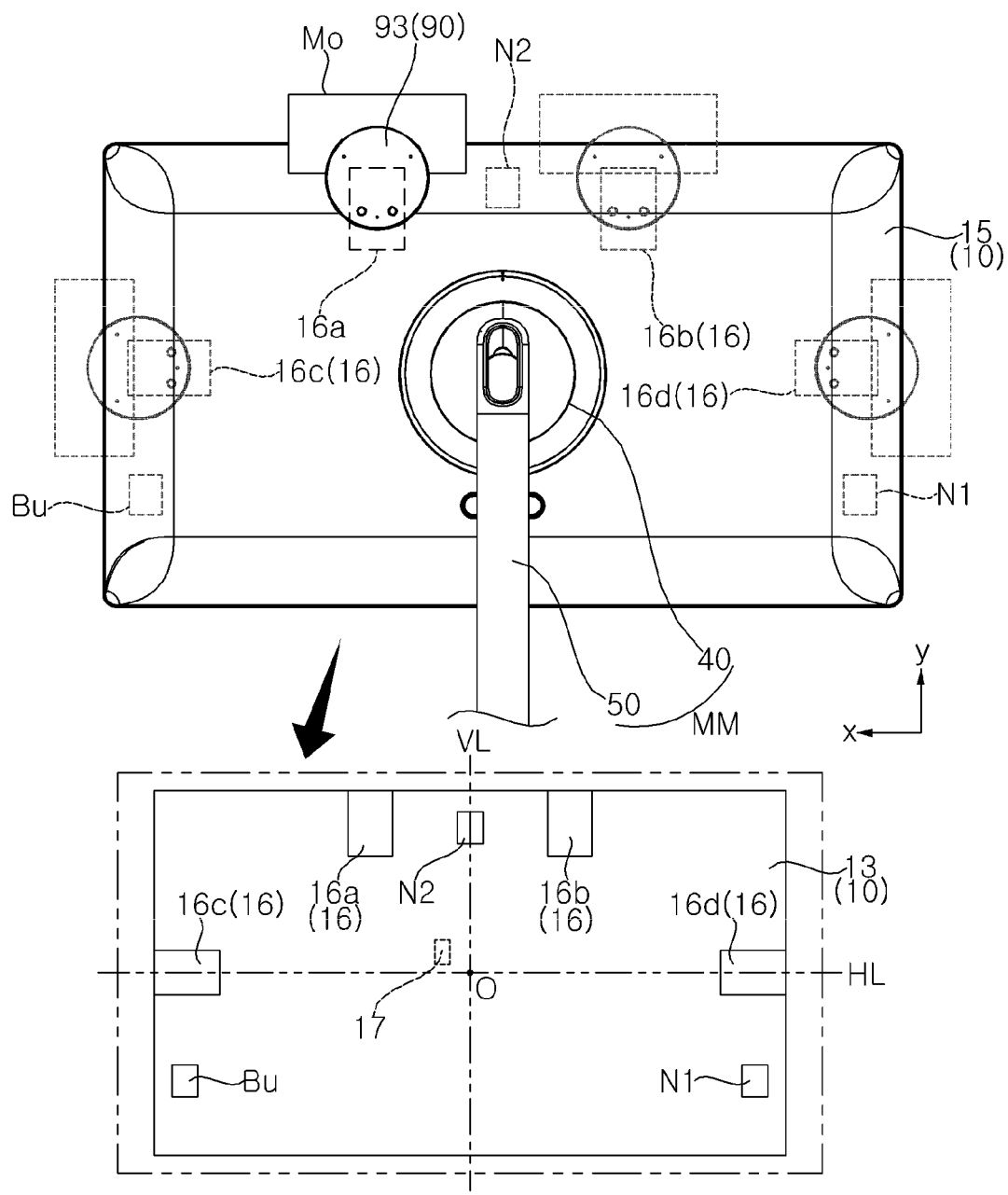

Referring to FIG. 32, the cradle 90 may be coupled to any point on the circumference of the head 10. In addition, the cradle 90 may be more strongly coupled to the head 10 by using the magnetic force of the aforementioned magnet 91M (see FIG. 27). For example, a position at which the cradle 90 is coupled to the head 10 by using the above magnetic force may correspond to a position of a plate 16 described later.

At least one plate 16 may be positioned between the frame 13 (see FIG. 3) and the back cover 15, and may be coupled to the frame 13 and/or the back cover 15. The plate 16 may be made of a magnetic substance such as iron Fe. The plate 16 may be formed flat, or may be curved along the curvature of the first part 91a (see FIG. 28) of the cradle 90. For example, the plate 16 may be provided in plurality.

A first plate 16a and a second plate 16b may be adjacent to the upper side of the head 10, and may be spaced apart from each other in the left-right direction. For example, the first plate 16a may be positioned in the left side of a vertical line VL passing through a center O of the head 10, and the second plate 16b may be positioned in the right side of the vertical line VL. A third plate 16c may be adjacent to the left side of the head 10, and a fourth plate 16d may be adjacent to the right side of the head 10. For example, the third plate 16c and the fourth plate 16d may be positioned on a horizontal line HL passing through the center O of the head 10 or slightly offset upward or downward therefrom.

Accordingly, at the position of the plate 16, the cradle 90 may be more strongly coupled to the head 10 by the magnetic attraction between the magnet 91M (see FIG. 27) and the plate 16.

Meanwhile, a gyro sensor 17 may be mounted on the frame 13 at between the frame 13 and the back cover 15. For example, the display device may include one gyro sensor 17. For example, the gyro sensor 17 may be positioned apart from the vertical line VL and the horizontal line HL. As another example, the display device may include a plurality of gyro sensors 17. The sensing value of the gyro sensor 17 may vary according to a pivot angle of the head 10. Accordingly, the gyro sensor 17 may detect a pivot of the head 10 and a mode (ex., a landscape mode or a portrait mode) of the head 10.

Figure 33:
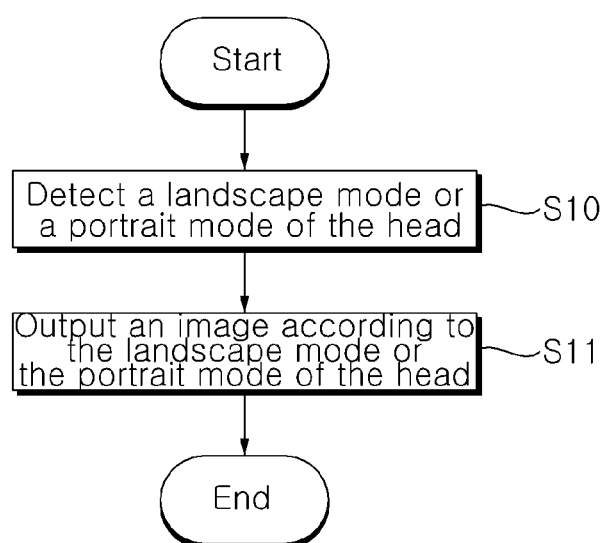
Figure 34:
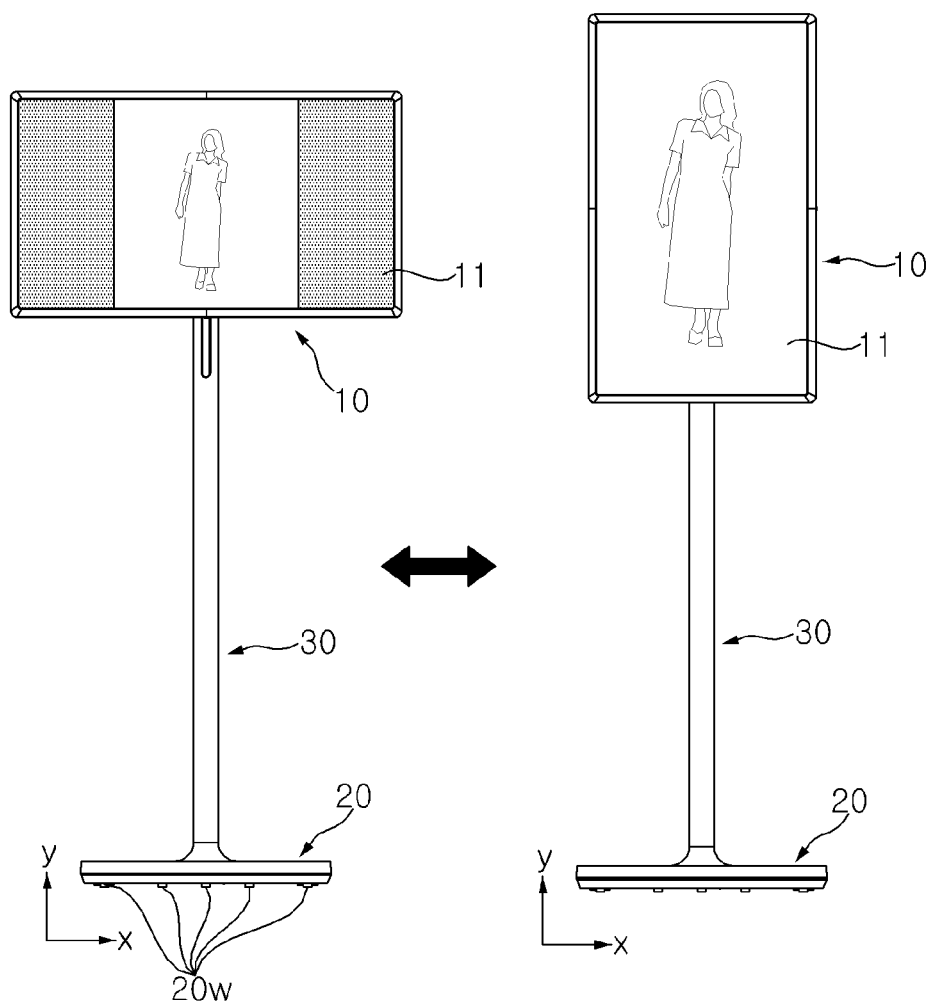

Referring to FIGS. 33 and 34, a controller of the display device may detect a landscape mode (see the left drawing of FIG. 34) or a portrait mode (see the right drawing of FIG. 34) of the head 10, based on information obtained from the gyro sensor 17 (see FIG. 32) (S10).

The controller may adjust the aspect ratio of the image according to the landscape mode or the portrait mode of the head 10, and may output an image through the display panel 11 (S11).

Figure 35:
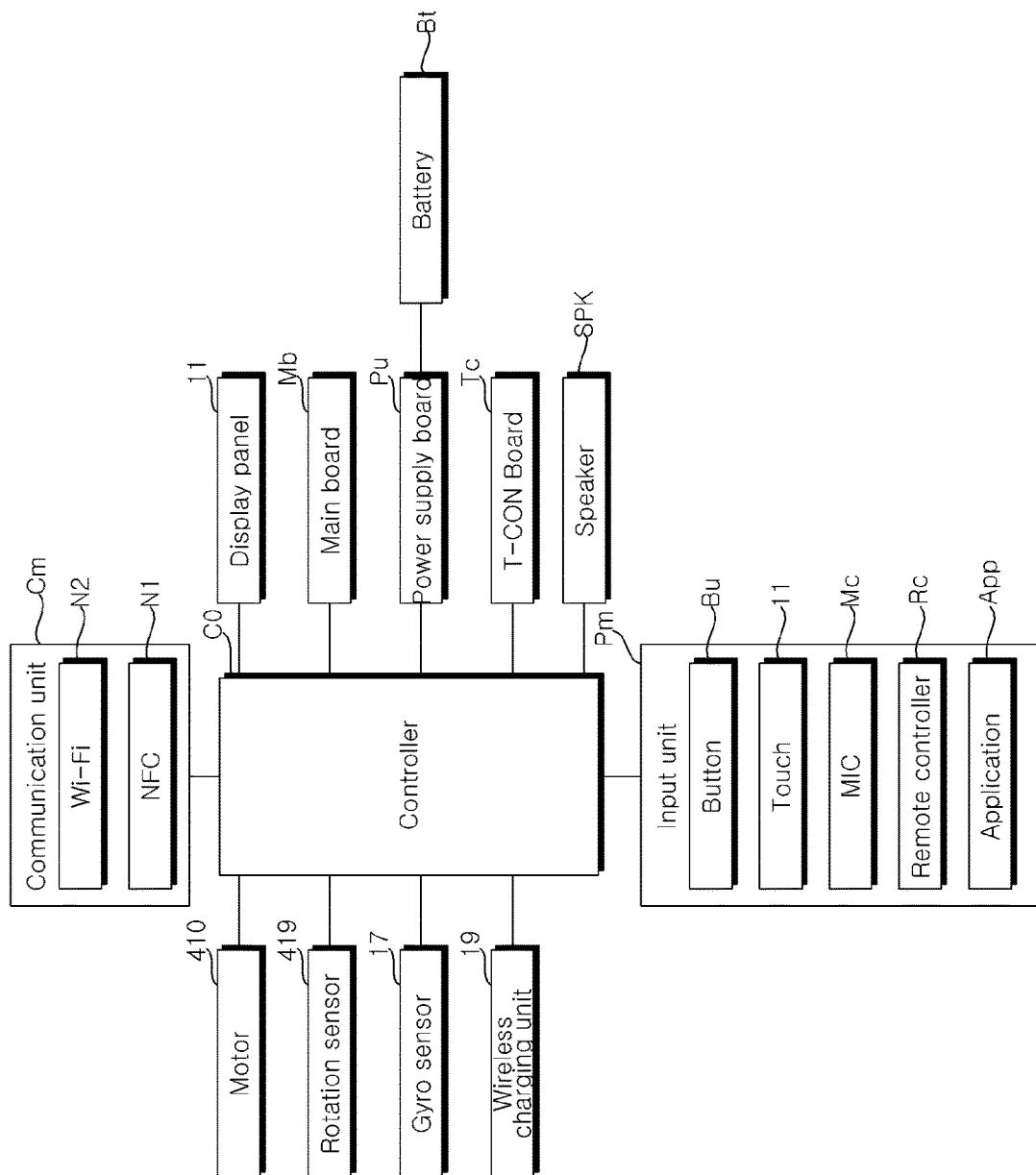

Referring to FIG. 35, the controller C0 of the display device may control the operation of the display device. The controller C0 may be electrically connected to components of the display device.

The display panel 11, a main board Mb, a power supply board Pu, and a Timing Controller board (T-CON board) Tc may be electrically connected to the controller C0. The main board Mb, the power supply board Pu, and the T-CON board Tc may be mounted on the rear surface of the frame 13 (see FIG. 3). The main board Mb may control the display device. The controller C0 may be implemented as the main board MB or may be a higher-order control unit that controls the main board Mb or the like. The power supply board Pu may receive power from a battery Bt (see FIG. 1) and/or an external power source through a cable, and may provide power to each component of the display device. The T-CON board Tc may provide an image signal to the display panel 110.

A speaker SPK may be electrically connected to the controller C0. The speaker SPK may be installed in the head 10, the pole 30, the arm 50, and/or the base 20, and may provide sound.

The gyro sensor 17 may be electrically connected to the controller C0.

A communication unit Cm may include a near field communication (NFC) module N1 and/or a Wi-Fi module N2. The NFC module N1 (see FIG. 13) may be mounted in the frame 13 at between the frame 13 and the back cover 15, and may be adjacent to the right and lower sides of the head 10. A user may connect the head 10 and the terminal Mo by tagging the terminal to the NFC module N1. The Wi-Fi module N2 (see FIG. 13) may be mounted in the frame 13 at between the frame 13 and the back cover 15, and may be adjacent to the upper side of the head 10. The head 10 may access the network through the Wi-Fi module N2.

An input unit Pm may be electrically connected to the controller C0. A user may input a command or signal to the controller C0 through the input unit Pm. For example, the input unit Pm may be a button Bu, the display panel 11, and/or a microphone Mc. The button Bu (see FIG. 32) may be mounted in the frame 13 at between the frame 13 and the back cover 15, and may be adjacent to the left side and the lower side of the head 10. A user may control the head 10 by handling the button Bu. The display panel 11 may be implemented as a touch type, and a user may control the display device by touching the display panel 11. The microphone Mc may be installed in the display device, and a user may control the display device by inputting a voice into the microphone Mc. For example, the input unit Pm may be a remote controller Rc that is handled by a user and communicates with the display device, or may be an application App that is installed in the user's terminal (smartphone) and communicates with the display device.

Figure 36:
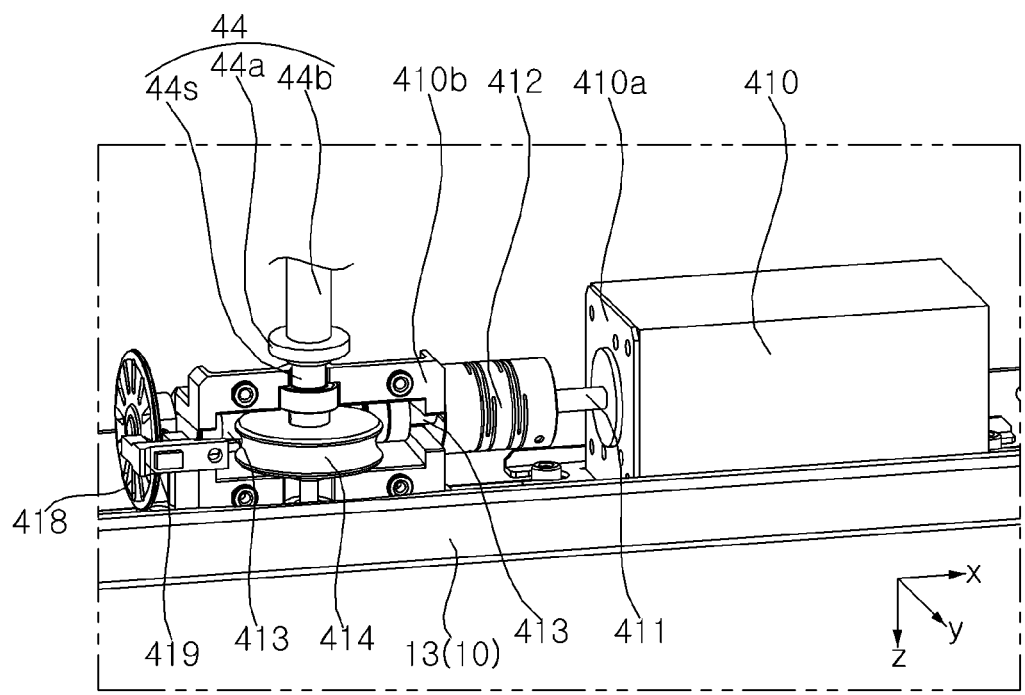

Referring to FIGS. 35 and 36, the motor 410 may be coupled to the rear surface of the frame 13 through a motor mount 410a. The motor 410 may be a motor capable of adjusting a rotation direction, a rotation angle, and a rotation speed. The motor 410 may be a step motor.

A worm 413 may be fixed to a rotation shaft 411 of the motor 410 through a coupling member 412, and may rotate together with the rotation shaft 411. A worm wheel 414 may be engaged with a thread formed on the outer circumferential surface of the worm 413. The axis of rotation of the worm 413 may be parallel to the left-right direction, and the axis of rotation of the worm wheel 414 may be parallel to the up-down direction.

A drive shaft 44s of the pivot shaft 44 may be opposite to the body 44b with respect to the head 44a, and may be fixed to the worm wheel 414.

Accordingly, when the motor 410 is driven, the pivot shaft 44 may rotate in a first rotation direction or in a second rotation direction opposite to the first rotation direction. That is, the head 10 (see FIG. 24) may be automatically pivoted.

A disc indicator 418 may be adjacent to a distal end of the worm 413, and may be fixed to the distal end of the worm 413. The disc indicator 418 may include a plurality of holes (no reference numeral) that are spaced apart from each other in the circumferential direction of the disc indicator 418.

A rotation sensor 419 may be adjacent to the disc indicator 418, and may be fixed to one side of a gear box 410b mounted in the frame 13 while accommodating the worm 413 and the worm wheel 414. The rotation sensor 419 may have a horseshoe shape. A light emitting unit and a light receiving unit of the rotation sensor 419 face each other but may be spaced apart from each other. The disc indicator 418 may rotate while passing between the light emitting unit and the light receiving unit according to the rotation of the worm 413. In response to the rotation of the disc indicator 418, the light of the light emitting unit may penetrate the hole of the disc indicator 418 or be blocked by the disc indicator 418.

Accordingly, the rotation sensor 419 may detect the number of rotations and/or the amount of rotation of the motor 410.

The above-described motor 410 and the rotation sensor 419 may be electrically connected to the controller C0. That is, the controller C0 may control the pivot of the head 10 (see FIG. 24) by adjusting the operation of the motor 410, based on information obtained from the rotation sensor 419.

Figure 37:
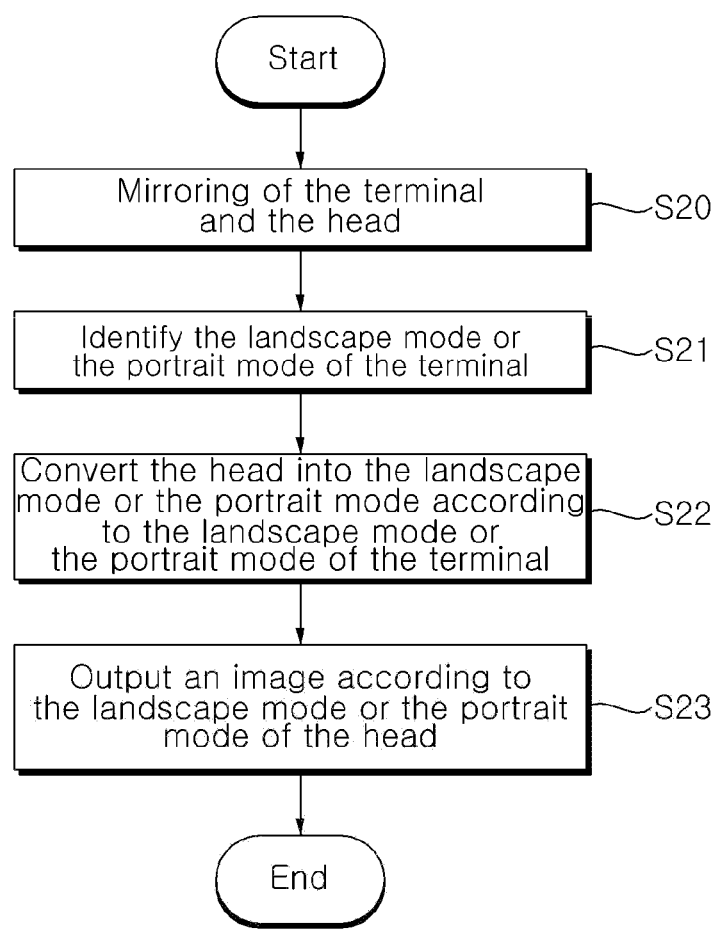
Figure 38:
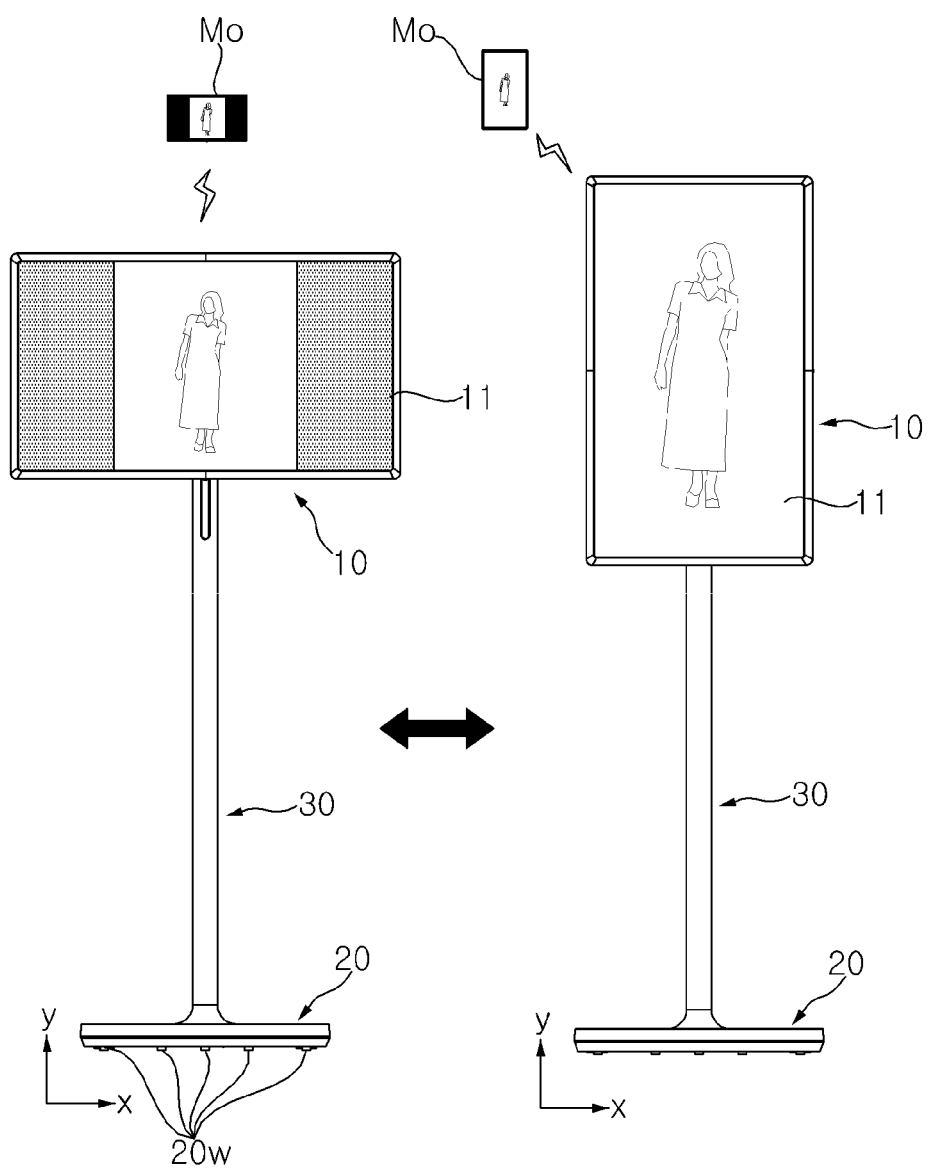

Referring to FIGS. 37 and 38, a user's terminal Mo may communicate with the head 10 through a communication unit Cm (see FIG. 35). That is, a user tags the terminal Mo to the NFC module N1 (see FIG. 35), or connects the head 10 to a network through the Wi-Fi module N2, so that a screen of the terminal Mo can be mirrored to the head 10 (S20).

The controller C0 may identify the landscape mode or the portrait mode of the terminal Mo, based on information obtained from the terminal Mo through the communication unit Cm (S21).

The controller C0 may pivot the head 10 according to the landscape mode or the portrait mode of the terminal Mo (S22). When the terminal Mo is in the landscape mode, the controller C0 may pivot the head 10 in the landscape mode (see the left drawing of FIG. 38) by adjusting the rotation of the motor 410 (see FIG. 36). When the terminal Mo is in the portrait mode, the controller C0 may pivot the head 10 in the portrait mode (see the right drawing of FIG. 38) by adjusting the rotation of the motor 410 (see FIG. 36).

The controller C0 may adjust the aspect ratio of the image according to the landscape mode or the portrait mode of the head 10, and may output an image through the display panel 11 (S23).

Figure 39:
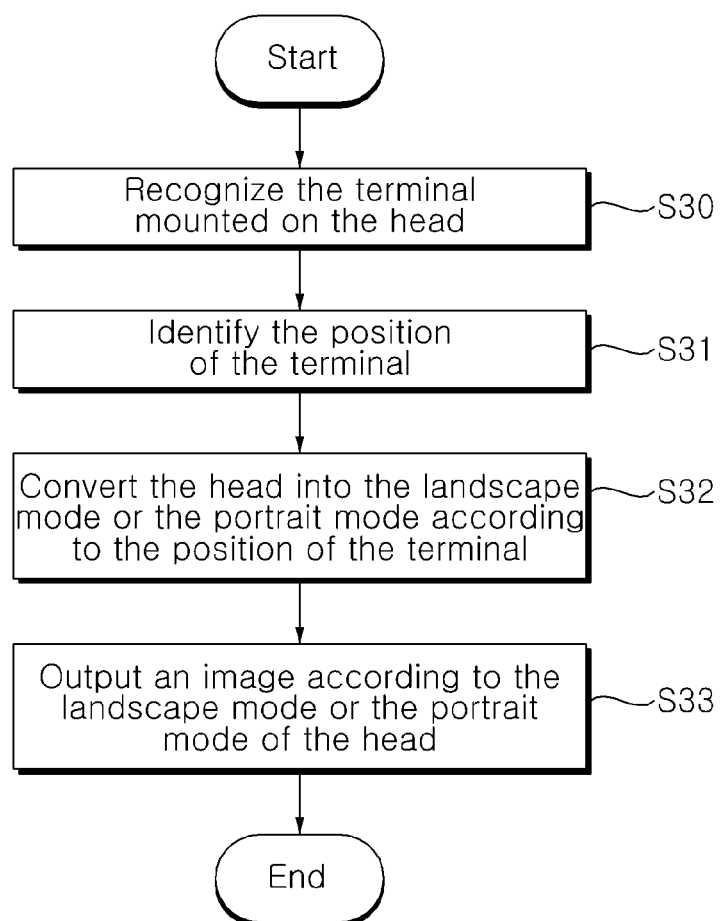
Figure 40:
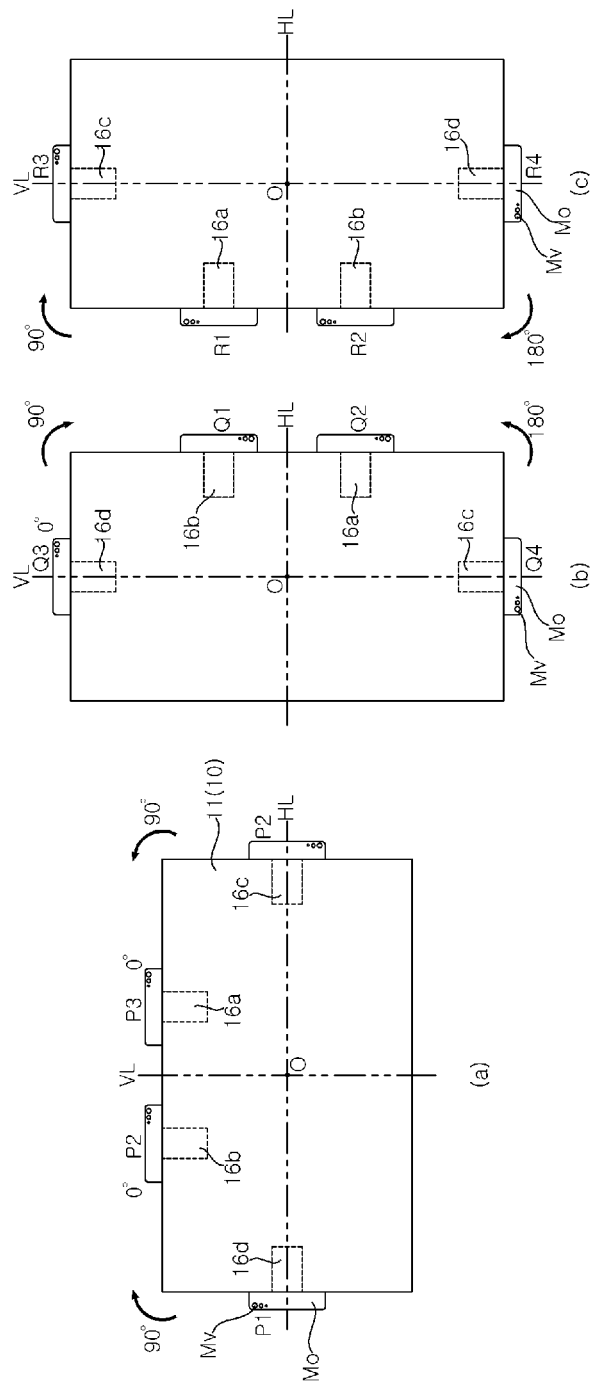
Figure 41:
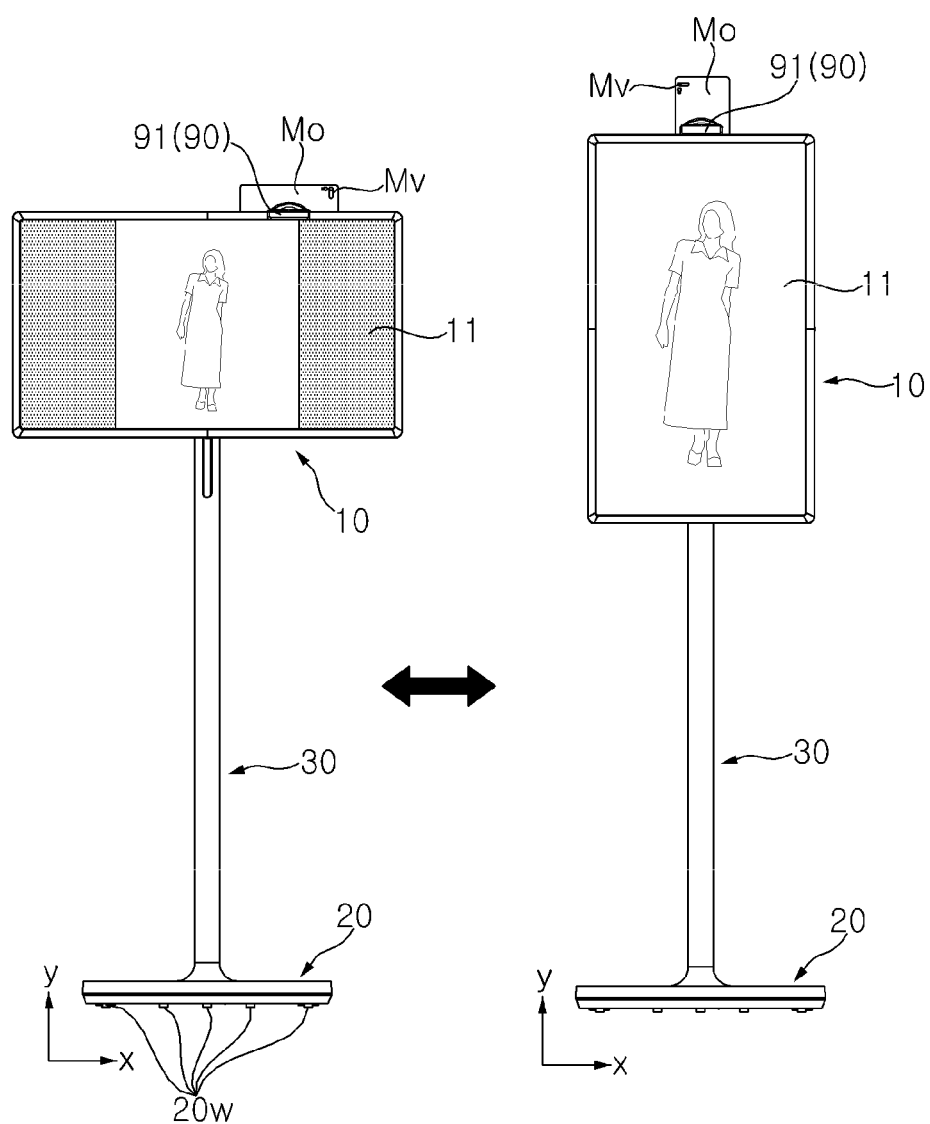

Referring to FIGS. 39 to 41, the controller C0 may recognize the terminal Mo mounted on the head 10 by using the cradle 90, based on information obtained from the gyro sensor 16 (see FIG. 32) (S30). The display panel of the terminal Mo may be provided on the front surface of the terminal Mo, and a camera Mv of the terminal Mo may be provided on the rear surface of the terminal Mo.

The controller C0 may identify the position of the terminal Mo mounted on the head 10, based on the information obtained from the gyro sensor 16 (S31).

The controller C0 may pivot the head 10 according to the position of the identified terminal Mo (S32).

Referring to (a) of FIG. 40, in the landscape mode of the head 10, when the terminal Mo is in a position P1 corresponding to the fourth plate 16*d*, the controller C0 may convert the head 10 from the landscape mode to the portrait mode by rotating the head 10 clockwise by 90 degrees. When the terminal Mo is in a position P4 corresponding to the third plate 16*c*, the controller C0 may convert the head 10 from the landscape mode to the portrait mode by rotating the head 10 counterclockwise by 90 degrees.

Further, in the landscape mode of the head 10, if the terminal Mo is in a position P2 corresponding to the second plate 16*b* or a position P3 corresponding to the first plate 16*a*, the controller C0 can maintain the landscape mode of the head 10.

Referring to (b) of FIG. 40, in a first portrait mode of the head 10, the first and second plates 16*a* and 16*b* may be adjacent to the left side of the head 10. In the first portrait mode of the head 10, when the terminal Mo is in a position Q1 corresponding to the second plate 16*b* or a position Q2 corresponding to the first plate 16*a*, the controller C0 may convert the head 10 from the first portrait mode to the landscape mode by rotating the head 10 counterclockwise by 90 degrees.

In addition, in the first portrait mode of the head 10, when the terminal Mo is in a position Q3 corresponding to the fourth plate 16*d*, the controller C0 can maintain the head 10 in the first portrait mode.

Further, in the first portrait mode of the head 10, when the terminal Mo is in a position Q4 corresponding to the third plate 16*c*, the controller C0 may convert the head 10 from the first portrait mode to a second portrait mode described later by rotating the head 10 counterclockwise by 180 degrees.

Referring to (c) of FIG. 40, in the second portrait mode of the head 10, the first and second plates 16*a* and 16*b* may be adjacent to the right side of the head 10. In the second portrait mode of the head 10, when the terminal Mo is in a position R1 corresponding to the first plate 16*a* or a position R2 corresponding to the second plate 16*b*, the controller may convert the head 10 from the second portrait mode to the landscape mode by rotating the head 10 clockwise by 90 degrees.

In addition, in the second portrait mode of the head 10, when the terminal Mo is in a position R3 corresponding to the third plate 16*c*, the controller C0 can maintain the second portrait mode of the head 10.

Further, in the second portrait mode of the head 10, when the terminal Mo is at the position R4 corresponding to the fourth plate 16*d*, the controller C0 may convert the head 10 from the second portrait mode to the first portrait mode by rotating the head 10 clockwise by 180 degrees.

The controller C0 may adjust the aspect ratio of the image according to the landscape mode or the portrait mode of the head 10, and may output an image through the display panel 11 (S33).

Figure 42:
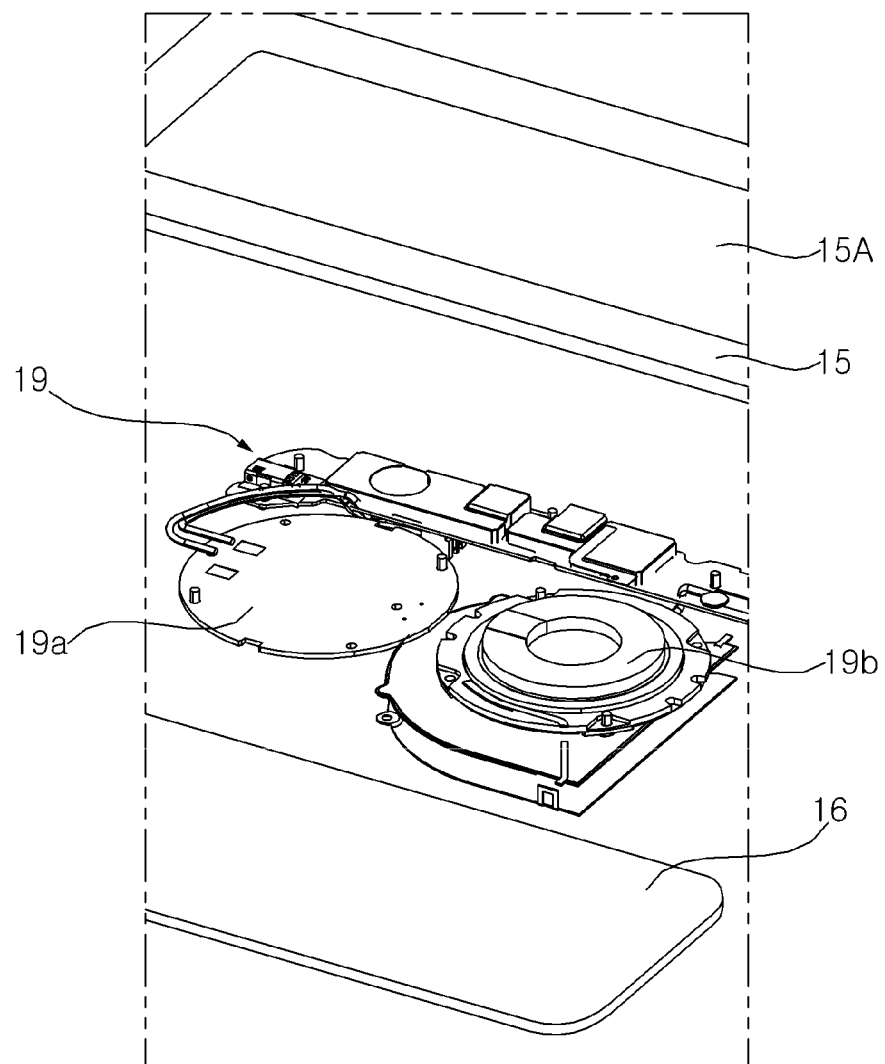

Referring to FIGS. 35 and 42, a wireless charging unit 19 may be positioned between the plate 16 and the back cover 15. The wireless charging unit 19 may be coupled to the frame 13 (see FIG. 3) and/or the back cover 15. The wireless charging unit 19 may wirelessly provide electrical energy to an electronic device through an inductive coupling method or a resonance coupling method. The wireless charging unit 19 may receive power from a power supply board Pu.

An inductive coupling method uses a principle that when the strength of a current flowing in one coil of two adjacent coils is changed, the magnetic field is changed by the current, and thus, the magnetic flux passing through the other coil is changed, so that the induced electromotive force is generated. That is, without moving two conductors spatially, if a current in only one coil is changed while two coils are brought close to each other, an induced electromotive force is generated in the other coil. In this case, the frequency characteristic is not significantly affected, but the power efficiency is affected by the alignment and distance between a transmitter (i.e. the wireless charging unit) and a receiver (i.e. the terminal) including each coil.

A resonance coupling method uses a principle that a part of the magnetic field change generated by applying a resonance frequency to any one of two coils spaced apart by a certain distance is applied to the other coil of the same resonance frequency to generate an induced electromotive force. That is, when the transmitter and the receiver resonate respectively with the same frequency, the electromagnetic waves are transmitted through a short-range electromagnetic field, and thus there is no energy transfer when the frequencies are different. In this case, it may be significantly important to select a frequency. In addition, since there is no energy transfer between different resonant frequencies, a charging target device may be selected through resonant frequency selection.

The wireless charging unit 19 may include a coil 19*b* electrically connected to a Printed Circuit Board (PCB) 19*a*. The coil 19*b* may wirelessly charge the terminal Mo seated in a charging area 15A of the back cover 15.

Accordingly, the terminal Mo may be mounted on the back cover 15 through the above-described cradle 90 (see FIG. 2), and may be wirelessly charged by facing the coil 19*b* with respect to the charging area 15A. For example, each of the plurality of wireless charging units 19 may be positioned in each of the plurality of plates 16*a*, 16*b*, 16*c*, and 16*d*. That is, the display device may provide a plurality of wireless charging areas.

The aforementioned wireless charging unit 19 may be electrically connected to the controller C0. The controller C0 may identify the position of the terminal Mo mounted on the head 10, based on the information obtained from the gyro sensor 16 (see FIG. 32). When it is recognized that the terminal Mo is mounted on the head 10 so that the terminal Mo overlaps the charging area 15A, the controller C0 may operate the wireless charging unit 19. The controller C0 may operate only the wireless charging unit 19 corresponding to the position of the terminal Mo among the plurality of wireless charging units 19.

Figure 43:
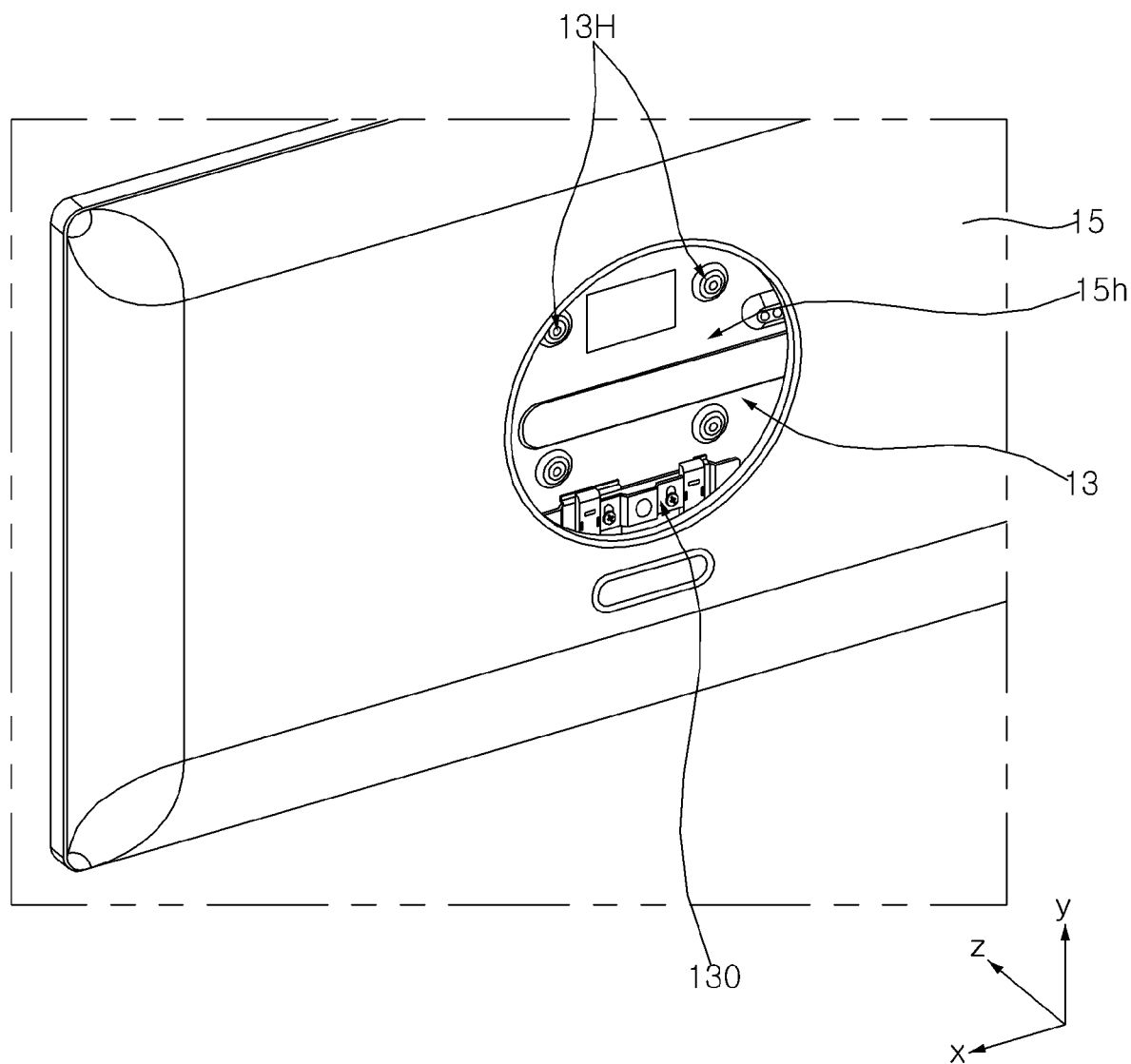

Next, FIG. 43 is an overview illustrating the back cover 15 having an opening or hole 15*h* through which fixing portions 13H and a click-type coupling part 130 are exposed (see also FIG. 4). The click-type coupling part 130 allows for the fixing member 41 of the motion module (MM) to be quickly and easily click snapped onto the display device. As shown in FIGS. 4 and 43, the fixing portions 13H and click-type coupling part 130 are exposed through the opening 15*h* of the back cover 15 on the frame 13.

Figure 44:
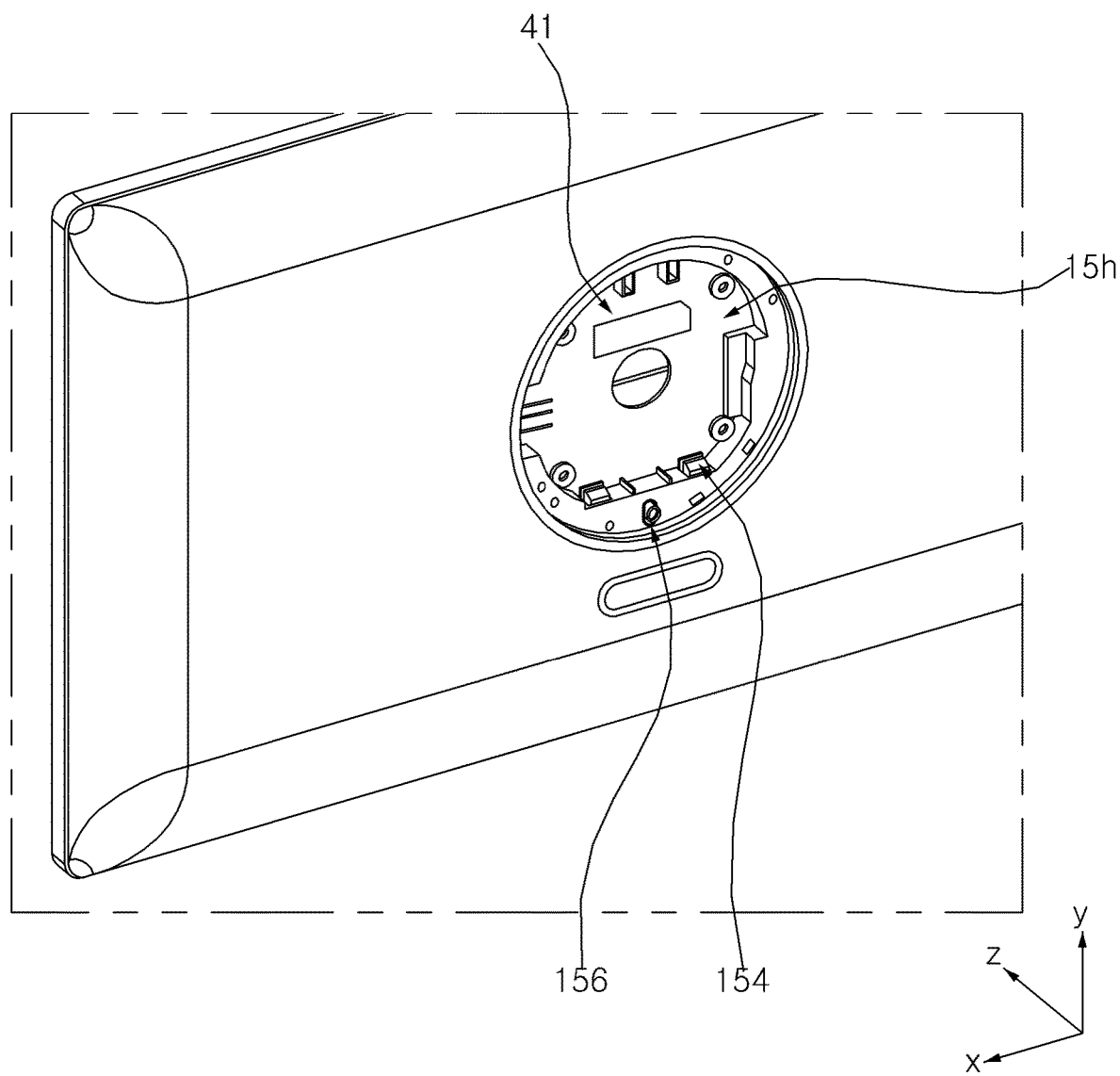

Also, FIGS. 5 and 44 illustrate the opening 15*h* being closed by a fixing member 41 coupled to a rear of the frame 13. That is, as shown in FIG. 44, the fixing member 41 of the motion module (MM) is coupled to the frame 13 through the opening 15*h* of the back cover 15. Also, as shown in FIG. 44, the click portion (engaging portions 154) of the click-type coupling part 130 are exposed through openings 41*c* (FIG. 45) of the fixing member 41 of the motion module (MM). A release protrusion 156 of the click-type coupling part 130 also protrudes through a pin hole in the fixing member 41.

Figure 45:
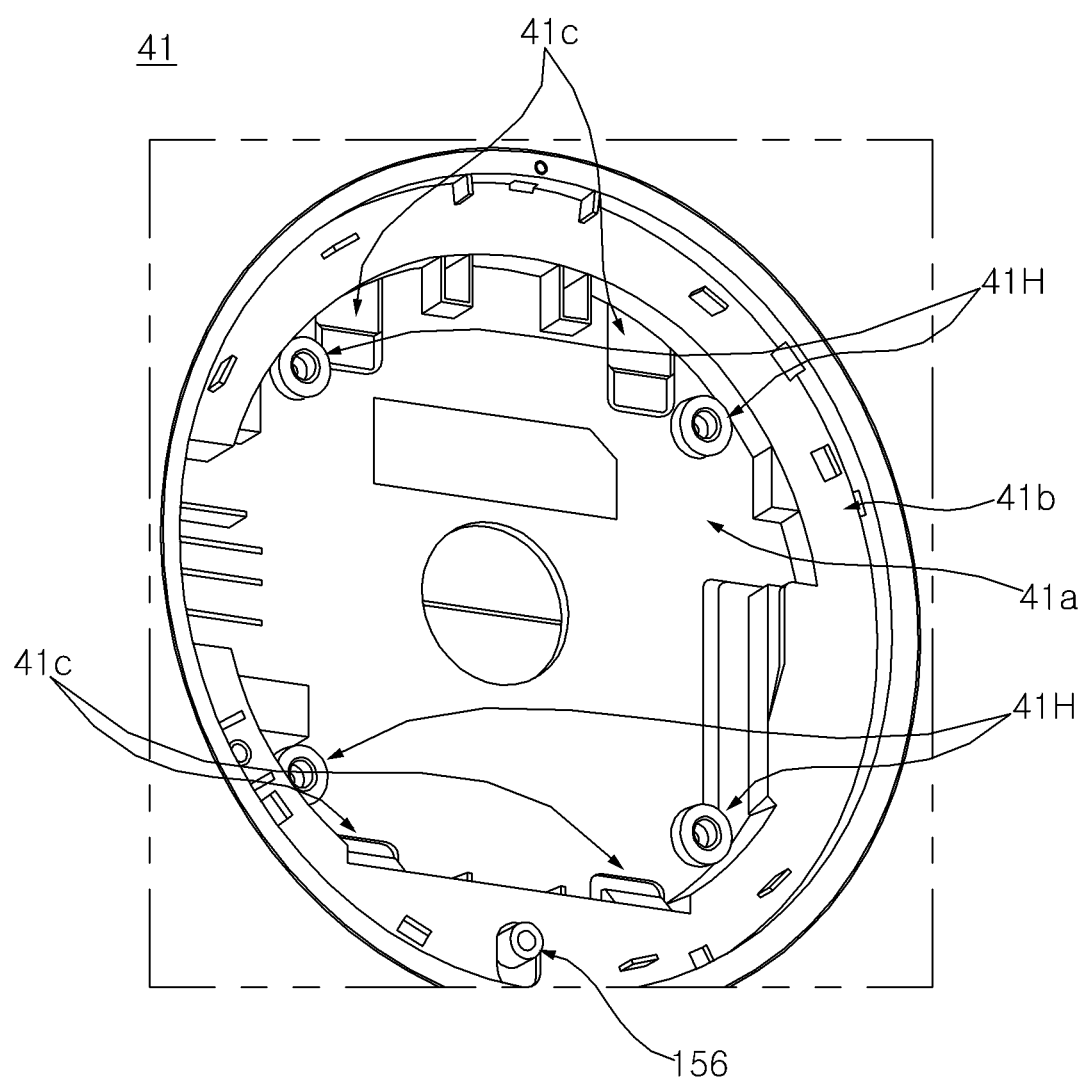

In addition, FIGS. 5 and 45 illustrates the fixing member 41 positioned in the opening 15*h* of the back cover 15. As shown in FIGS. 5 and 45, the fixing member 41 includes the fixing plate 41*a*, which may have a circular plate shape, and the fixing ring 41*b*. The pair of first protrusions 42*a* and the pair of second protrusions 42*b* of the connector 40 (FIGS. 2 and 6) are aligned with the openings 41*c* of the fixing member 41. In addition, the fixing ring 41*b* is positioned between the outer circumference of the fixing plate 41*a* and a portion defining the opening or hole 15*h* of the back cover 15 and may be coupled or fixed thereto. A fastening member such as a screw can be fastened to the fixing portions 13H through the fixing holes 41H. Accordingly, the fixing member 41 can be coupled to or fixed to the frame 13. As shown in FIG. 45, a pin hole is included in the fixing ring 41 and allows the release protrusion to pass therethrough and be pressed to release the connector 40.

In more detail, as shown in FIG. 45, the release protrusion 156 of the click-type coupling part 130 protrudes through a hole in the fixing ring 41*b* of the fixing member 41. Also, a width of the hole is greater than an outer diameter of the release protrusion 156. In addition, the lower openings 41*c* provide the function of exposing the engaging portions 154 so that the lower protruding portions 42*b* of the connector 40 can press against the engaging portion 154.

Figure 46:
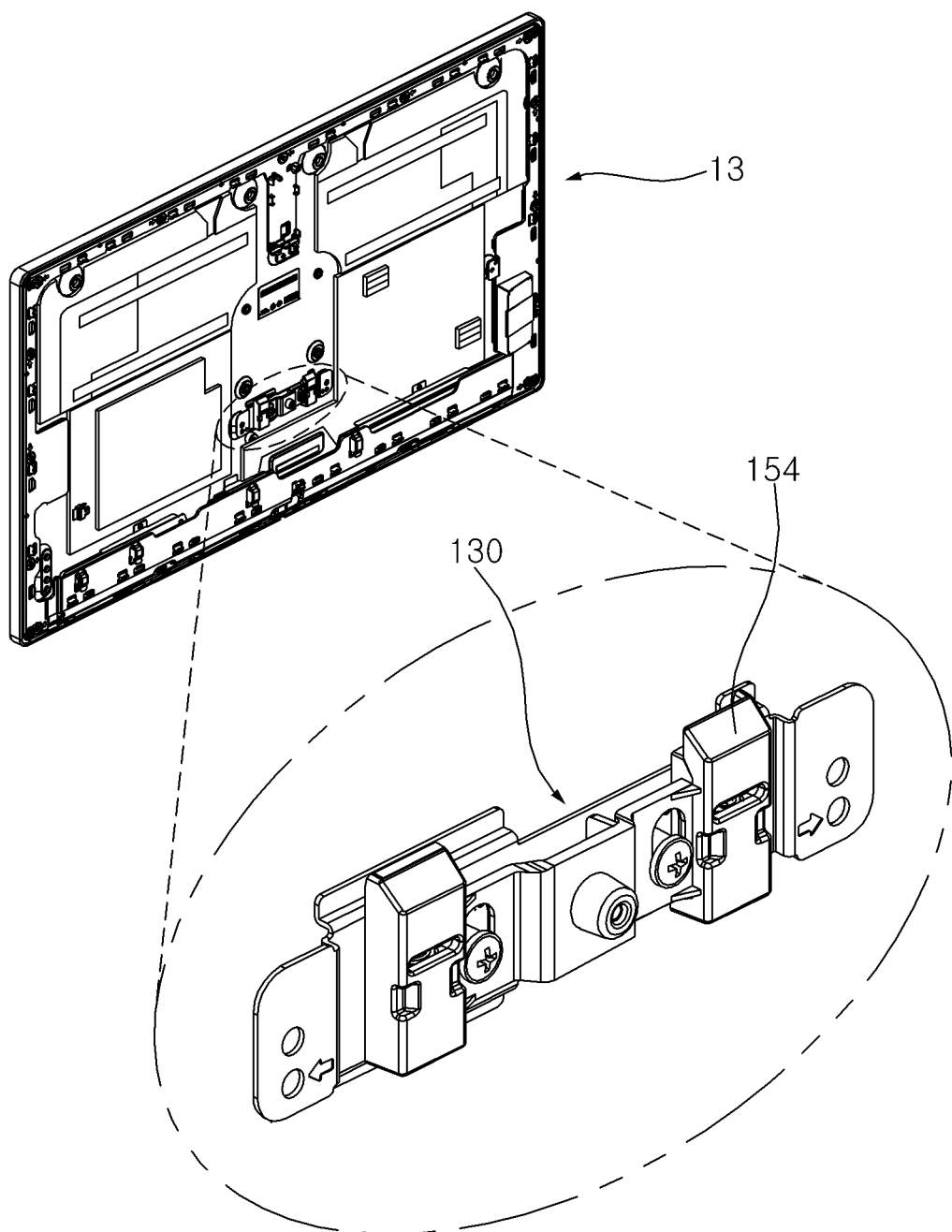

Next, FIG. 46 is an overview illustrating the frame 13 with the back cover removed exposing the various Printed Circuit Boards (PCBs) provided on the rear surface of the frame 13. As shown, the click-type coupling part 130 is attached to the rear surface of the frame 13 to secure the fixing member 41 with the engaging portions 154 of the click-type coupling part 130. Thus, the motion module (MM) can be click-coupled to the display device.

Figure 47:
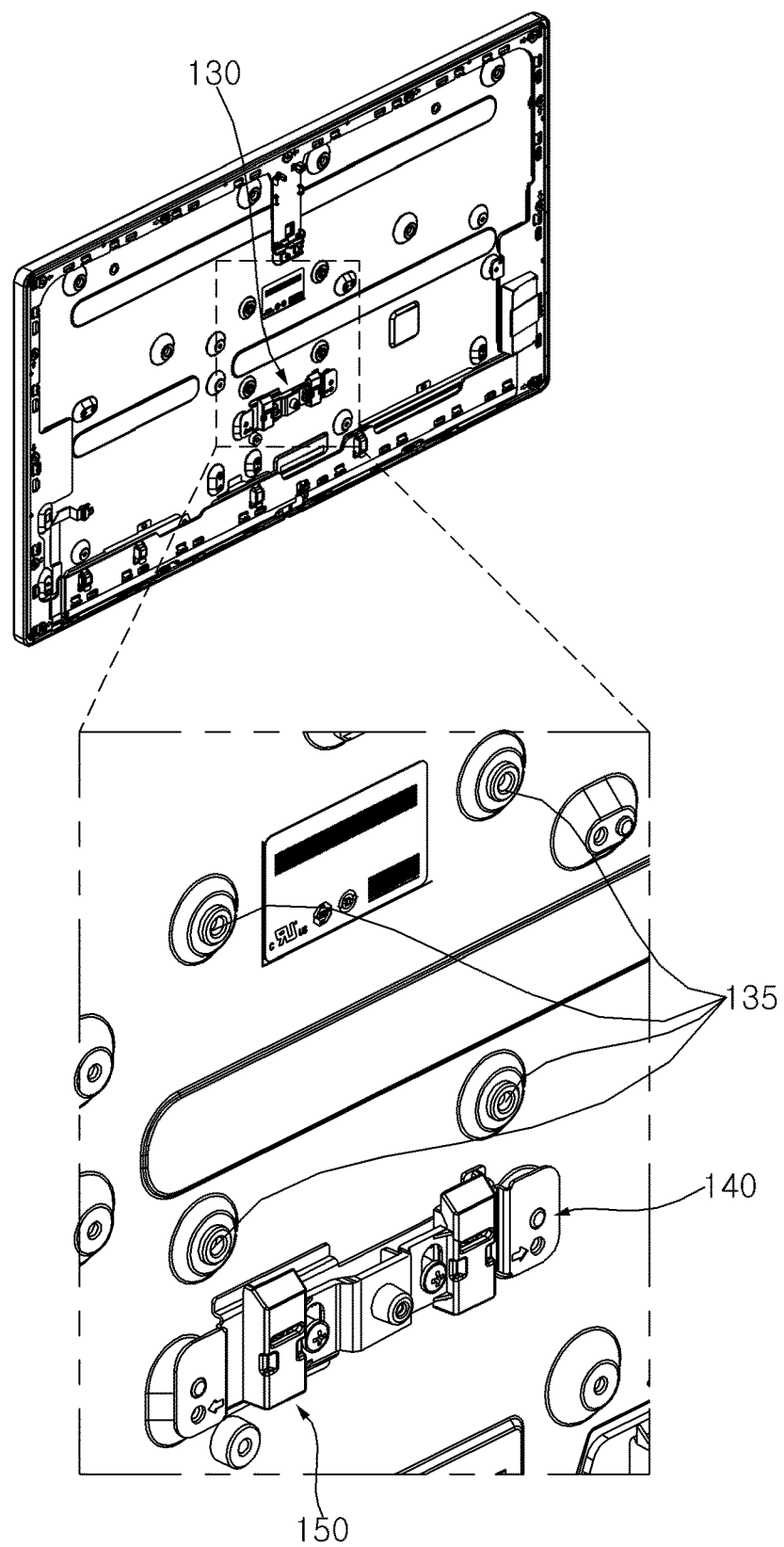

Next, FIG. 47 includes overviews of the rear of the frame 13 including the click-type coupling part 130 coupled to the frame 13. FIG. 47 also illustrates the fixing portions 13H. As shown in FIG. 47, the click-type coupling part 130 is disposed below the fixing portions 13H so that the fixing portions 13H are accessible when the fixing member 41 is removed. In addition, FIG. 47 also illustrates the click-type coupling part 130 including a fixing plate 140 coupled to the frame 13 and a click bracket 150 connected to the fixing plate 14. Thus, the fixing plate 140 can be coupled to the frame 13 and the click bracket 150 can be coupled to the fixing plate 140 via screws 135, for example.

Figure 48:
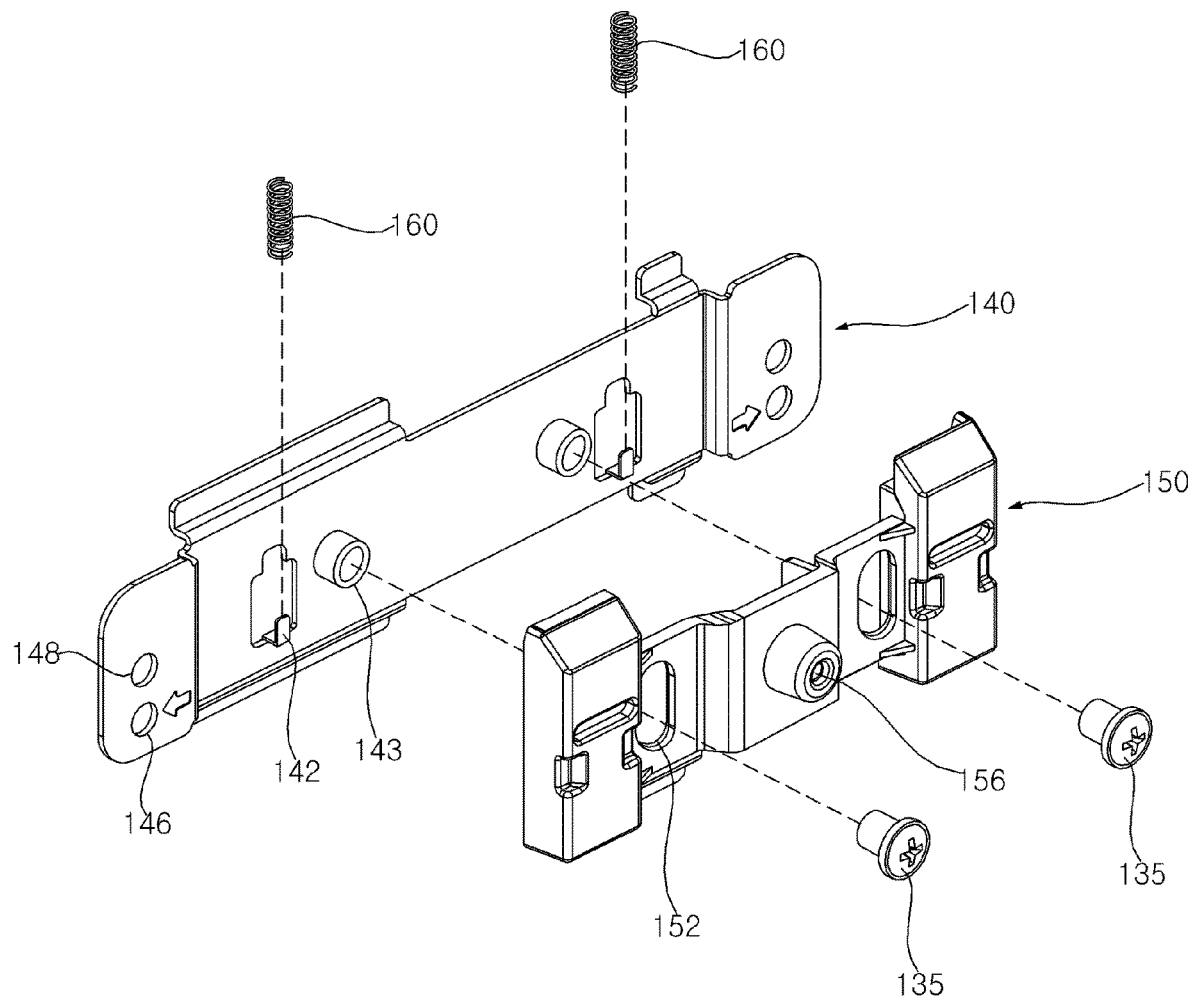

In more detail, FIG. 48 is an exploded view of the click-type coupling part 130 including a fixing plate 140 to be coupled to the rear surface of the frame 13 and supporting a first end of an elastic member or spring 160. In particular, the fixing plate 140 includes protruding guide pins 142 receiving the first ends of the springs 160 as shown in FIG. 48. Also, the click-type coupling part 130 includes the click bracket 150 to be coupled to the fixing plate 140 via screws 135 passing through the click bracket 150 to be fastened to the fixing plate 140 and the frame 13. In addition, as shown in FIG. 48, the click bracket 150 includes elongated guide holes 152 guiding the click bracket 150 onto protruding threading portions 143 of the fixing plate 140. The click bracket 150 can then be secured to the fixing plate 140 via the screws 135 engaging into the protruding threading portions 143. FIG. 48 also illustrates the click bracket 150 having the release protrusion 156 to be protruded through a hole in the fixing member 41 (see FIG. 45). Pressing the release protrusion 156 can release the connector 40 from the display device.

Figure 49:
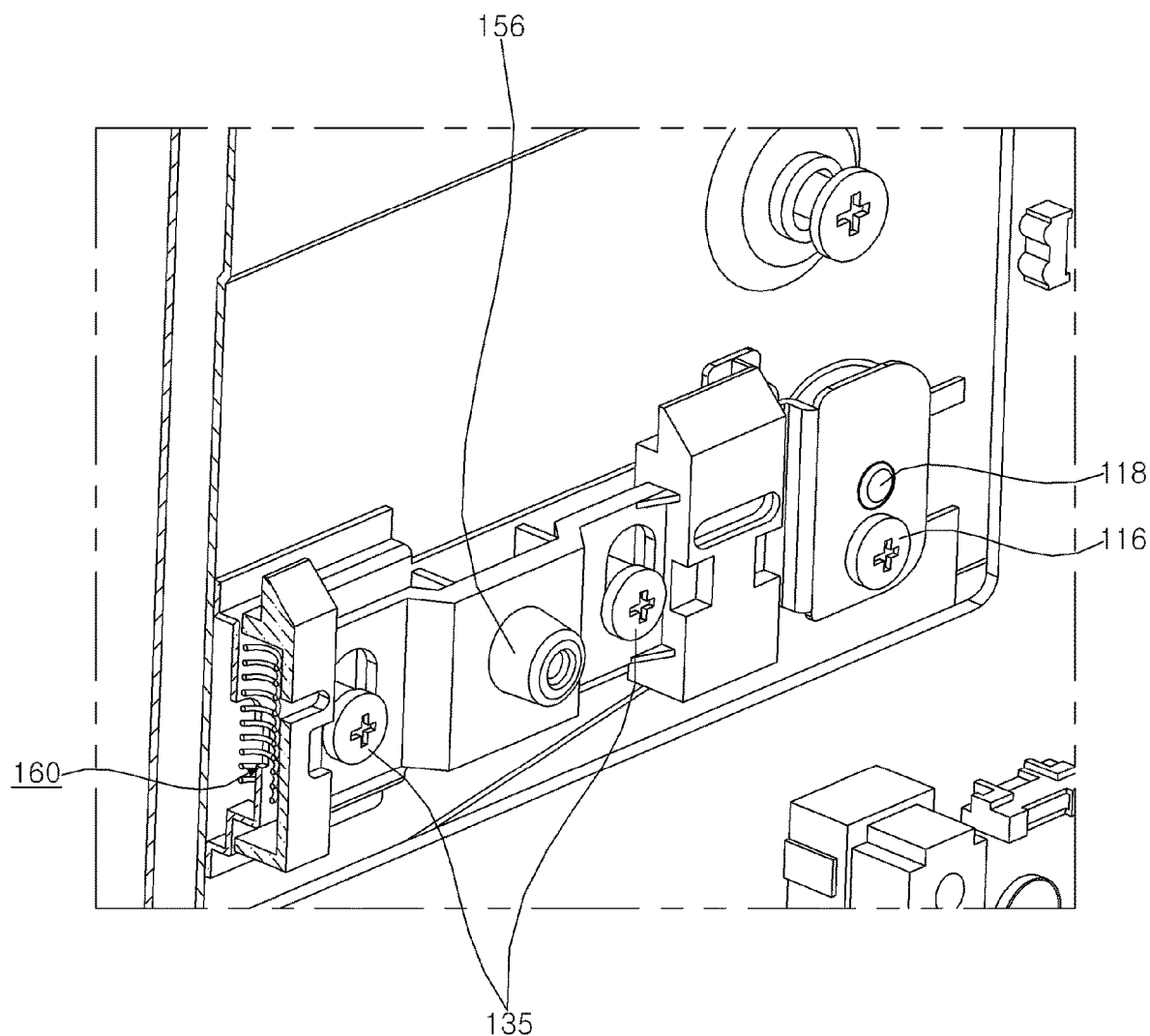

In addition, FIG. 48 also illustrates the fixing plate 140 includes lower holes 146 and upper holes 148 used for mounting the fixing plate 140 to the frame 13. In more detail, as shown in FIG. 49, the frame 13 includes a frame protruding portion 118 extending through the upper hole 148 and a fastener, such as a screw 116, passing through the lower hole 146 to secure the fixing plate 140 to the frame 13. As shown in FIGS. 48 and 49, the click bracket 150 is secured to the fixing plate 140 via the screws 135 extending through the elongated guide holes 152 in the click bracket 150 and being threaded into the protruding threading portions 143 of the fixing plate 140. As shown in FIG. 49, the screw 116 fixes the fixing plate 140 to the frame 13 along with the protruding portion 118 engaging into the upper hole 148, such that rearward separation of the click-type coupling part 130 is prevented. FIG. 49 also illustrates the protrusion 156 of the click bracket 150 and a cross-sectional view of one of the springs 160.

Figure 50:
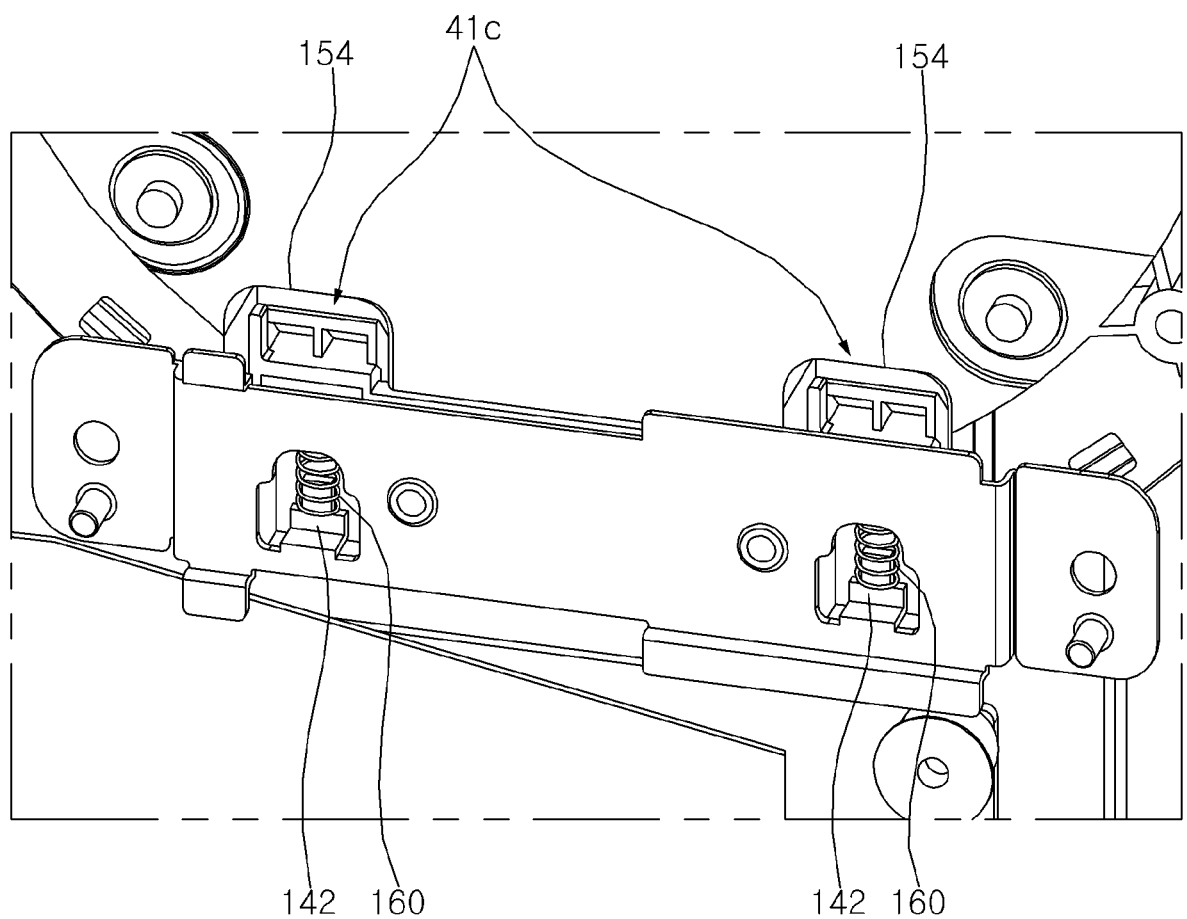

Next, FIG. 50 depicts a front view of the click-type coupling part 130 (see FIGS. 5 and 45). As shown in FIG. 50, the lower ends of the springs 160 are supported on the protruding guide pins 142 and press the engaging portions 154 of the click bracket 150 upward into the openings 41c of the fixing member 41 (see also FIG. 45). Thus, with reference to FIGS. 5, 6 and 50, the process of connecting the articulated connector 40 (FIG. 5) to the display device is as follows. That is, the first protrusions 42a are inserted into the upper opening 41c, and then the second protrusions 42b press the inclined surface of the engaging portions 154 and move the engaging portions 154 downward. When the second protrusions 42b continue to press on the engaging portions 154, the second protrusions 42b press away from the engaging portions 154, and the engaging portions 154 move upward due to the force of the springs 160. Therefore, the second protrusions 42b are located between the frame 13 and engaging portions 154 and the articulated connector 40 is connected to the display device. Also, the user can press the release protrusion 156 (FIG. 45), so the engaging portions 154 move downward, allowing the articulated connector 40 to be click-removed from the display device. Therefore, the articulated connector 40 is click-coupled and click-released to and from the frame 13.

Figure 51:
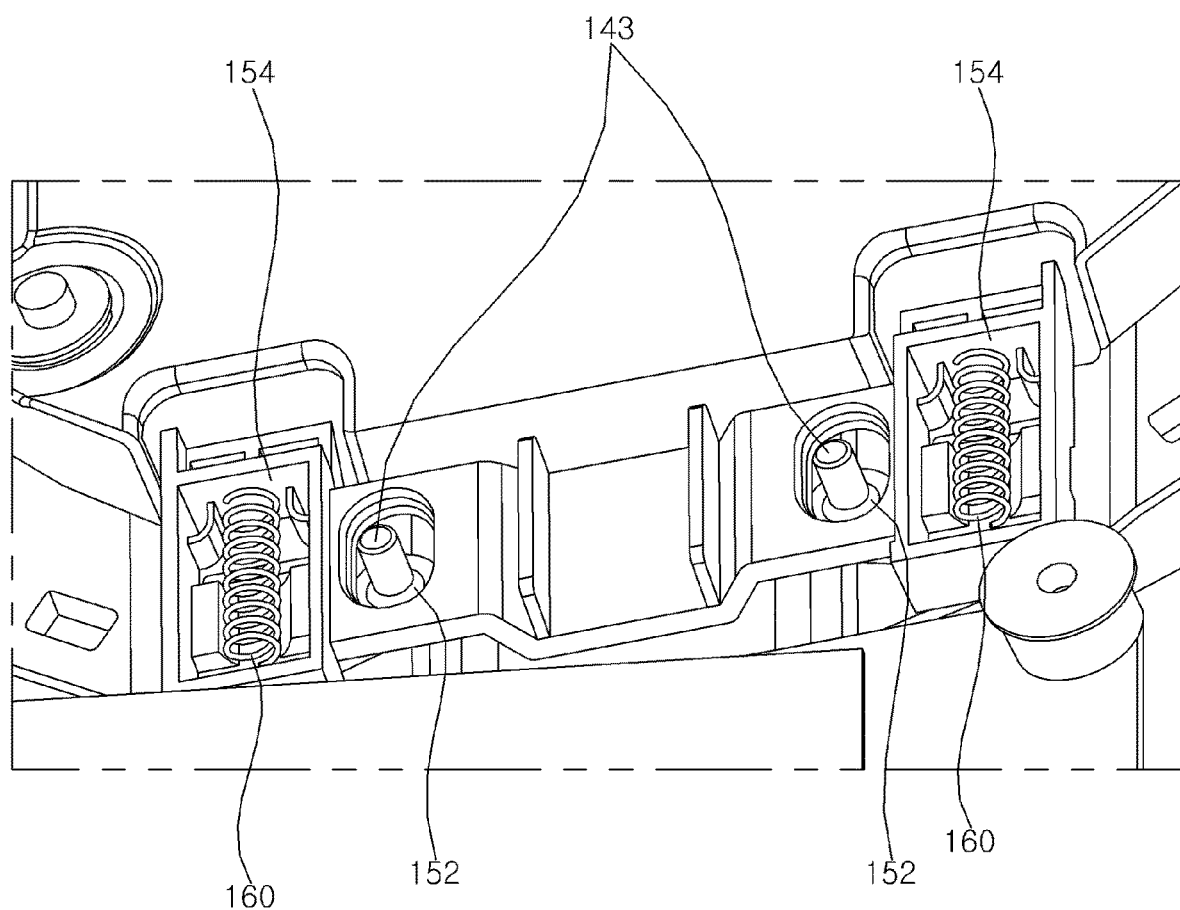

In addition, FIG. 51 depicts another front view of the click bracket 150 without the fixing plate 140. In particular, the engaging portions 154 interact with the springs 160, in which the upper end of the springs 160 bear against the click bracket 150. The protruding threading portions 143 are also shown passing through the elongated guide holes 152. Also, as shown, a vertical width of the elongated guide holes 152 is greater than a diameter of the protruding threaded portions 143 allowing the click-type coupling part 130 to move up and down with respect to the screw.

Referring to FIGS. 43 to 51, a display device includes a display panel 11 (FIG. 3); a frame 13 disposed at a rear of the display panel 11; a fixing member 41 disposed at a rear of the frame 13 and coupled to the frame 13, the fixing member 41 including upper openings 14c and lower openings 14c; a connector 40 (FIG. 6) including upper protruding portions 42a that are inserted into the upper openings 14c and including lower protruding portions 42b aligned with the lower openings 14c such that the lower protruding portions 42b press against the exposed engaging portions 154; and a locking unit 130 coupled to a rear surface of the frame 13, the locking unit 130 including engaging portions 154 passing through the lower openings 41c and elastic members 160 extending and pressing the engaging portions 154.

Further, the lower protruding portions 42b are engaged with and press against the engaging portions 154 exposed through the lower openings 41c, and the upper protruding portions 42a are engaged with the fixing member 41. In addition, the locking unit 130 includes a coupling body (fixing plate 140) coupled to the rear surface of the frame 13 and supporting a first end of the elastic member 160, the coupling body 140 including guide pins (protruding threaded portions 143) protruding rearward from a rear surface of the coupling body 140; and a support body (click bracket 150) disposed at a rear of the coupling body 140, and including the engaging portions 154 contacting a second end of the elastic member 160, the support body 150 including guide holes 152 guiding the placement of the support 150 onto the guide pins 143. In addition, a width of a corresponding guide hole 152 is greater than an outer diameter of a corresponding guide pin 143.

In addition, the locking unit 130 further includes fastening members 135 coupled to the guide pins 143 inserted into the guide holes 152, the fastening members 135 having a head in contact with a rear surface of the support body 150. Also, the frame 13 includes a coupling portion having a threaded coupling hole and a protruding portion, and the coupling body 140 of the locking unit 130 further includes a lower hole 146 through which a fastening member 116 passes into the threaded coupling hole of the frame; and an upper hole 148 into which the protruding portion of the frame 13 is inserted.

In addition, the fixing member 41 includes a first recessed portion 41a comprising a fixing plate 41a; and a second recessed portion 41b comprising a fixing ring 41b. Also, the upper and lower openings 41c are formed through the fixing plate 41a. Further, the engaging portions 154 of the locking unit 130 are spaced rearward from a rear surface of the second recessed portion 41b, the lower protruding portion 42b of the connector 40 is engaged with the engaging portion 154 of the locking unit 130, and the upper protruding portion 42a of the connector 40 is engaged with a lateral wall of the second recessed portion 41b. Also, the support body 150 of the locking unit 130 includes a release protrusion 156 for release the connector 30, the fixing ring 41b includes a pin hold through which the release protrusion 156 passes, and a width of the pin hole is greater than an outer diameter of the release protrusion 156.

Referring to FIGS. 1 to 42, a display device according to an aspect of the present disclosure may include: a base; a head spaced apart from the base and including a display panel; a pole extending from the base in a direction in which the head is spaced apart from the base; an articulated connector coupled to the head; an elevating module movably coupled to the pole in a length direction of the pole; and an arm extending in a direction intersecting the head and the pole, the arm having one side connected to the articulated connector and the other side connected to the elevating module.

The articulated connector may include a pivot module rotating about a pivot axis orthogonal to the head, the pivot module may include: a front bracket fixed to a rear surface of the head; a rear bracket positioned behind the front bracket and coupled to the arm; and a pivot shaft which penetrates the front bracket and the rear bracket, which is fixed to the front bracket, and which is rotatably coupled to the rear bracket, the pivot shaft providing the pivot axis.

The pivot module may include: a rear grab which is opposite to the front bracket with respect to the rear bracket, and which is fixed to the rear bracket, and to which the pivot shaft is rotatably coupled; a cap fixed to a distal end of the pivot shaft; and a disc spring positioned between the rear grab and the cap, and to which the pivot shaft is rotatably coupled.

The disc spring may further include: a first disc spring convex from the rear grab toward the cap; and a second disc spring positioned between the first disc spring and the cap, and convex from the cap toward the rear grab.

The pivot module may further include a disc positioned between the rear grab and the disc spring, and to which the pivot shaft is fixed, the disc may include a plurality of bosses which protrude from the disc toward the rear grab, and which are spaced apart from each other in a circumferential direction of the disc, the rear grab may further include: a plurality of fixing holes which have a size corresponding to the boss, and which are spaced apart from each other in a circumferential direction of the rear grab; and a plurality of slots which extend in the circumferential direction of the rear grab, which are longer than the fixing hole, and which are alternately disposed with the plurality of fixing holes.

The articulated connector may include: a tilt module which is parallel to the head, and which rotates about a tilt axis extending in a horizontal direction, the tilt module may include: a rear bracket coupled to a rear surface of the head and rotatably coupled to the arm about the tilt axis; a tilt shaft penetrating the rear bracket in a horizontal direction and fixed to the rear bracket, the tilt shaft providing the tilt axis; and an elastic member which is wound around an outer circumference of the tilt shaft in a coil shape, and which has one end caught on the rear bracket.

The tilt module may further include at least one disc spring which is adjacent to the other end opposite to the one end of the elastic member, and to which the tilt shaft is rotatably coupled, and which is convex toward the one end.

The tilt module may further include a holder to which the tilt shaft is rotatably coupled, and which is coupled to the arm, the holder may further include a pin protruding outward from a side surface of the holder, the rear bracket may further include a guide groove in which the pin is positioned, and which extends while drawing an arc in a rotation direction of the rear bracket.

The articulated connector may include a first rotation unit which is parallel to the head, and which rotates about a first swivel axis extending in a vertical direction, the first rotation unit may include: a holder coupled to a rear surface of the head; a first body connected to the holder and opened up and down; and a first fastening member which penetrate the opening of the first body, and to which the first body is rotatably coupled, and which is fixed to the arm, the first fastening member providing the first swivel axis.

The first rotation unit may further include: a fixing washer which is adjacent to one end of the first fastening member, which is fixed to an inner side of the arm, and through which the first fastening member passes; a disc spring which is opposite to the one end of the first fastening member with respect to the fixing washer, which is convex toward the fixing washer, and through which the first fastening member passes; a washer which is opposite to the fixing washer with respect to the disc spring, and through which the first fastening member passes; and a bushing which is opposite to the disc spring with respect to the washer, and through which the first fastening member passes, the bushing including a flange positioned on the first body, and a portion positioned in the opening of the first body.

The elevating module may include a second rotation unit which is parallel to the pole, and which rotates about a second swivel axis extending in a vertical direction, the second rotation unit comprises: a vertical member coupled to the pole; a second body connected to the vertical member and opened up and down; and a second fastening member which penetrates the opening of the second body, to which the second body is rotatably coupled, and which is fixed to the arm, the second fastening member providing the second swivel axis.

The elevating module may include: a vertical member positioned inside the pole, extending in a length direction of the pole, and coupled to the arm; a stem positioned between the vertical member and the base, coupled to the base, and extending in a length direction of the vertical member; a lower shaft fixed on the stem, and extending in a length direction of the vertical member; and an upper shaft fixed to an inner side of the vertical member, extending in a length direction of the vertical member, and movable along the lower shaft.

The elevating module may further include: a roller coupled to one side of the vertical member, and in contact with an inner surface of the pole; and a clamp opposite to the vertical member with respect to the upper shaft, and coupled to the vertical member, the clamp may include a protrusion protruding from the clamp toward the inner surface of the pole, and in contact with the inner surface of the pole.

The display device may further include a cradle caught on one side of the head, the cradle including a magnet positioned inside the cradle, the head may include: a back cover forming a rear surface of the head; and a plate opposite to the magnet with respect to the back cover, the cradle may include: a front part at which the magnet is positioned and in contact with the back cover; a rear part positioned behind the front part, the rear part being hinged to the front part with respect to a hinge axis between the front part and the rear part; and an elastic member positioned between the front part and the rear part, fixed to the front part and the rear part, adjacent to the hinge axis, and providing elastic force to the rear part.

The display device further may include a gyro sensor positioned at the head, and detecting a coupling between the head and the cradle; and a controller electrically connected to the gyro sensor, the articulated connector may include a pivot module that pivots together with the head, the pivot module including a motor and a power transmission member for transmitting power of the motor to a pivot axis of the pivot module, and the controller is configured to pivot the head, based on information obtained from the gyro sensor.

The display device may further include a wireless charging unit positioned between the plate and the back cover.

The base may include a plurality of moving wheels coupled to a lower surface of the base.

The effect of the display device according to the present disclosure will be described as follows.

According to at least one of the embodiments of the present disclosure, it is possible to provide a display device having a stand of a display panel.

According to at least one of the embodiments of the present disclosure, it is possible to provide a structure that can freely adjust the angle or position of a head having a display panel.

According to at least one of the embodiments of the present disclosure, it is possible to provide a structure capable of implementing various motion operations of a display panel, such as a pivot motion, a tilt motion, a swivel motion, and an elevating motion, independently of each other.

According to at least one of the embodiments of the present disclosure, it is possible to provide a mechanism for automatically adjusting the motion of a head in a user-friendly manner.

According to at least one of the embodiments of the present disclosure, it is possible to provide a structure capable of firmly coupling a cradle for placing a terminal such as a smartphone to a head.

According to at least one of the embodiments of the present disclosure, it is possible to provide a structure capable of wirelessly charging a terminal such as a smartphone placed on a cradle.

Any or other embodiments of the present disclosure described above are not mutually exclusive or distinct. Any or other embodiments of the present disclosure described above may be used jointly or combined in each configuration or function.

For example, it means that configuration A described in a specific embodiment and/or drawings may be combined with configuration B described in other embodiments and/or drawings. That is, even if the coupling between the components is not directly described, it means that the coupling is possible except for the case where it is described that the coupling is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A display device comprising:
   a display panel;
   a frame disposed at a rear of the display panel;
   a fixing member disposed at a rear of the frame and coupled to the frame, the fixing member including upper openings and lower openings;
   a connector including upper protruding portions that are inserted into the upper openings and including lower protruding portions aligned with the lower openings; and
   a locking unit coupled to a rear surface of the frame, the locking unit including engaging portions passing through the lower openings and elastic members extending and pressing the engaging portions,
   wherein the lower protruding portions are engaged with and press against the engaging portions exposed through the lower openings, and the upper protruding portions are engaged with the fixing member,
   wherein the locking unit includes:
   a coupling body coupled to the rear surface of the frame and supporting a first end of the elastic member, the coupling body including guide pins protruding rearward from a rear surface of the coupling body; and
   a support body disposed at a rear of the coupling body, and including the engaging portions contacting a second end of the elastic member, the support body including guide holes guiding the placement of the support body onto the guide pins, and
   wherein a width of a guide hole is greater than an outer diameter of a guide pin corresponding to the guide hole.

2. The display device of claim 1, wherein the locking unit further includes fastening members coupled to the guide pins inserted into the guide holes, the fastening members having a head in contact with a rear surface of the support body.

3. The display device of claim 1, wherein the frame includes a coupling portion having a threaded coupling hole and a protruding portion, and
   wherein the coupling body of the locking unit further includes:
   a lower hole through which a fastening member passes into the threaded coupling hole of the frame; and
   an upper hole into which the protruding portion of the frame is inserted.

4. The display device of claim 1, wherein the fixing member comprises:
   a first recessed portion comprising a fixing plate; and
   a second recessed portion comprising a fixing ring, and
   wherein the upper and lower openings are formed through the fixing plate.

5. The display device of claim 4, wherein the engaging portions of the locking unit are spaced rearward from a rear surface of the second recessed portion,
   wherein the lower protruding portion of the connector is engaged with the engaging portion of the locking unit, and
   wherein the upper protruding portion of the connector is engaged with a lateral wall of the second recessed portion.

6. The display device of claim 4, wherein the support body of the locking unit includes a release protrusion for release the connector.

7. The display device of claim 6, wherein the fixing ring includes a pin hole through which the release protrusion passes, and
   wherein a width of the pin hole is greater than an outer diameter of the release protrusion.

* * * * *